(12) United States Patent
Hoshino et al.

(10) Patent No.: US 8,010,793 B2
(45) Date of Patent: Aug. 30, 2011

(54) DATA COMMUNICATION METHOD AND SYSTEM

(75) Inventors: Kazuyoshi Hoshino, Komae (JP);
Keisuke Takeuchi, Kunitachi (JP);
Osamu Takata, Tokyo (JP); Tadashi Kaji, Yokohama (JP); Takahiro Fujishiro, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1640 days.

(21) Appl. No.: 11/258,418

(22) Filed: Oct. 26, 2005

(65) Prior Publication Data

US 2006/0095768 A1    May 4, 2006

(30) Foreign Application Priority Data

Oct. 26, 2004    (JP) ................................. 2004-310455

(51) Int. Cl.
*H04L 29/00*    (2006.01)

(52) U.S. Cl. ......... 713/168; 713/165; 713/166; 713/167

(58) Field of Classification Search .................. 709/229; 726/3, 8, 14; 713/168
See application file for complete search history.

(56) References Cited

U.S. PATENT DOCUMENTS

| | | | | |
|---|---|---|---|---|
| 6,032,175 | A * | 2/2000 | Fletcher et al. | 709/200 |
| 6,154,777 | A * | 11/2000 | Ebrahim | 709/227 |
| 6,374,300 | B2 * | 4/2002 | Masters | 709/229 |
| 7,143,193 | B1 * | 11/2006 | Abbott et al. | 709/248 |
| 7,149,892 | B2 * | 12/2006 | Freed et al. | 713/151 |
| 7,188,175 | B1 * | 3/2007 | McKeeth | 709/227 |
| 2003/0014628 | A1 * | 1/2003 | Freed et al. | 713/155 |
| 2003/0105981 | A1 * | 6/2003 | Miller et al. | 713/202 |
| 2004/0221061 | A1 * | 11/2004 | Chavez | 709/245 |

FOREIGN PATENT DOCUMENTS

| | | |
|---|---|---|
| JP | 2002-152805 | 5/2002 |
| JP | 2003-298618 | 10/2003 |

OTHER PUBLICATIONS

J. Peterson, Network Working Group, Jul. 2004.*
Deb Shinder, Windows OS Security, Feb. 17, 2003.*
RFC 2401 "Security Architecture for the Internet Protocol".
RFC 2246 "The TLS Protocol Version 1.0".
RFC 2409 "The Internet Key Exchange (IKE)".
RFC 2406 "Internet Security Association and Key Management Protocol".
RFC 3261 "SIP: Session Initiation Protocol".
RFC 3263 "Session Initiation Protocol (SIP): locating SIP Servers".
RFC 2327 "SDP: Session Description Protocol".
Yasuhumi Chimura, The eighth seminar of Latest Network Technical System: IP Phone (Sequel), "Understanding new technology of SIP, H.323 and ENUM-IP phone", Nikkei Byte Aug. 2002 (Published by Nikkei Byte Corp. Jul. 22, 2002).

* cited by examiner

*Primary Examiner* — Nasser Moazzami
*Assistant Examiner* — Ghazal Shehni
(74) *Attorney, Agent, or Firm* — Antonelli, Terry, Stout & Kraus, LLP.

(57) ABSTRACT

A data communication method for forwarding a session control message designating a destination server with an IP address to the destination server via a session management server, wherein, when an application program or encrypted communication software on a client issues a connection request designating a destination server with an IP address, the client or the session management server automatically converts the IP address into a desired resource identifier identifiable a domain, thereby to determine the domain to which the received connection request message should be forwarded.

21 Claims, 55 Drawing Sheets

LOCATION SERVICE TABLE 60

| AOR ~61 | IP ADDRESS ~62 | |
|---|---|---|
| cl1@aaa.com | 192.0.2.1 | ~ EN-1 |
| cl2@aaa.com | ..... | ~ EN-2 |
| sv1@aaa.com | ..... | ~ EN-3 |
| sv2@aaa.com | ..... | ~ EN-4 |
| cl1@bbb.com | ..... | ~ EN-5 |
| cl2@bbb.com | ..... | ~ EN-6 |
| sv1@bbb.com | 192.0.2.4 | ~ EN-7 |
| sv2@bbb.com | ..... | ~ EN-8 |

SIP PROXY PRa

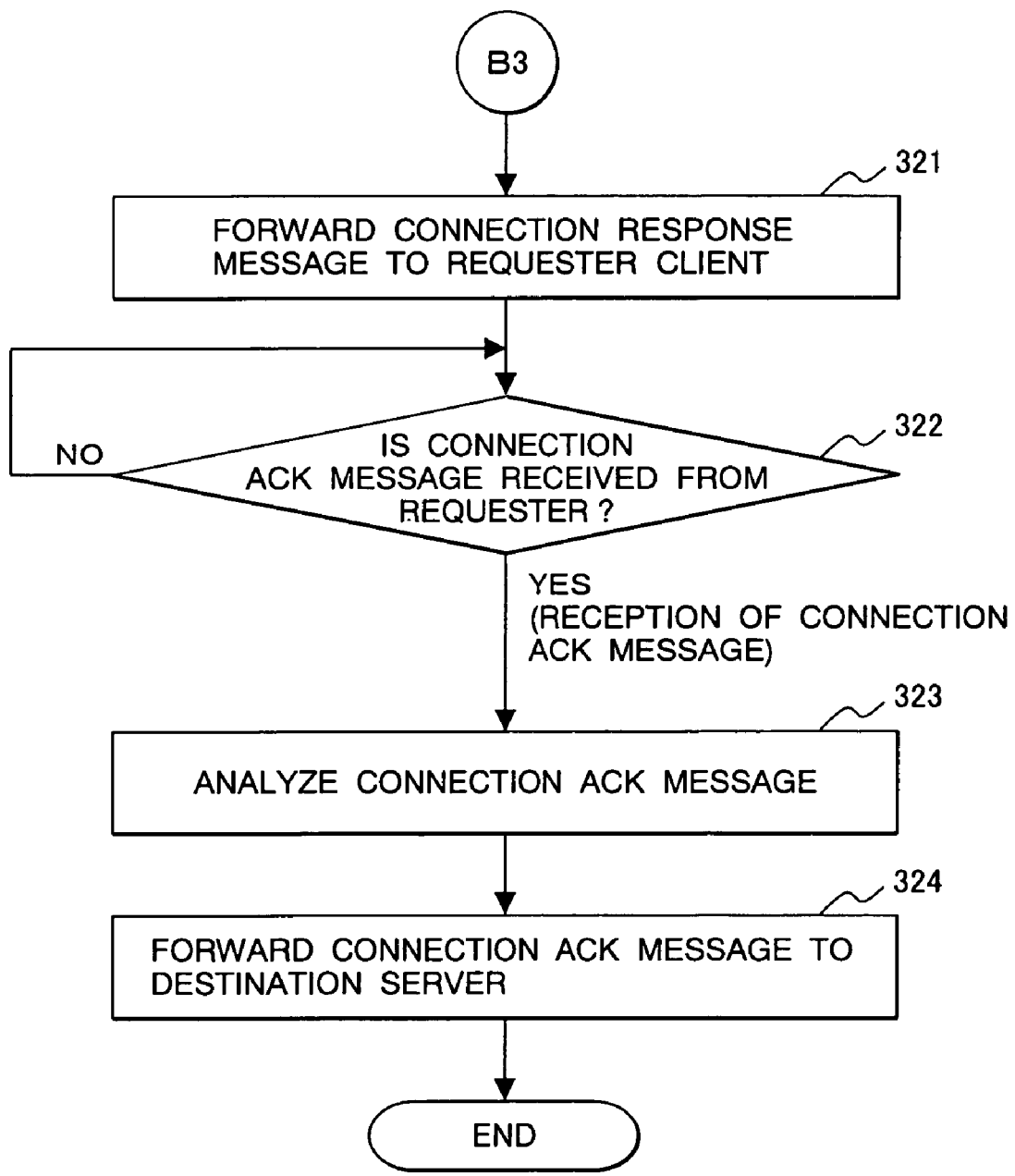

FIG. 62

LOCATION TABLE 70

| AOR | IP ADDRESS |
|---|---|
| sv1@bbb.com | 192.0.2.4 |

71 72

DATA COMMUNICATION METHOD AND SYSTEM

CLAIM OF PRIORITY

The present application claims priority from Japanese patent application serial No. 2004-310455, filed on Oct. 26, 2004, the content of which is hereby incorporated by reference into this application.

BACKGROUND OF THE INVENTION (1) Field of the Invention

The present invention relates to a data communication method and system for enabling encrypted data communication between a client and a server and, more particular, to a data communication method and system making it easy to perform a client-to-server authentication procedure, using a session management server.

(2) Description of Related Art

In a method of encrypted communication in a network, a client and a server carry out a peer device authentication procedure to prevent communication with an unintended peer for each other and, upon a successful peer device authentication, exchange encryption parameters for communication. Public key certificates are applied in Internet Protocol Security (IPsec) described in RFC 2401 "Security Architecture for the Internet Protocol" (non-patent document 1) of the Internet Engineering Task Force (IETF) and Transport Layer Security (TLS) described in RFC 2246 "The TLS Protocol Version 1.0" (non-patent document 2).

In the case of authentication using public key certificates, it is necessary for each node which may be a client or a server to verify that a public key certificate provided by its peer is the one issued from a reliable certificate authority by any method. For example, one method of verifying a public key certificate is to obtain in advance a reliable certificate authority's root certificate for authenticating the certificate authority that issued the public key certificate offered by the peer by any method and verify the certificate authority's signature attached to the public key certificate offered by the peer by the public key of the certificate authority's root certificate. According to this verification method, a server and a client have to prepare in advance the root certificates of certificate authorities in association with public key certificates of all peer devices with which the server/client may communicate.

As FIG. 1 shows, for example, assume a system where a plurality of clients (terminal devices) CL1, CL2, and CL3 have secret keys SK1, SK2, and SK3 and public key certificates PK1, PK2, and PK3 issued by different certificate authorities (CA1, CA2, and CA3), respectively, and servers SV1, SV2, and SV3 also have secret keys SK11, SK12, and SK13 and public key certificates PK11, PK12, and PK13 issued by different certificate authorities (CA1, CA2, and CA3), respectively. To enable each client to communicate with one of the servers SV1, SV2, and SV3 at any time, each server must have in advance a plurality of root certificates RT1, RT2, and RT3 for the certificate authorities (CA1, CA2, and CA3) that issued the public key certificates (PK1, PK2, PK3), respectively, each being held by each of the clients CL1, CL2, and CL3 that can be a peer to the server, as shown. Likewise, each client also must prepare in advance the plurality of root certificates RT1, RT2, and RT3 for the certificate authorities (CA1, CA2, and CA3) that issued the public key certificates (PK11, PK12, PK13), respectively, each being held by each of the servers SV1, SV2, and SV3 that can be a peer to the client. In this system architecture, each client and each server must repeat an authentication process each time when initiating communication with its peer.

FIG. 2 shows a block diagram of a basic configuration of software that a client arms to carry out IPsec-encrypted communication described in the above-mentioned RFC 2401.

Here, reference numeral 20 denotes a network interface card (NIC) module, 30 denotes a TCP/IP layer software module, 40 denotes an application layer software module, and 50 denotes a software module for Internet Key Exchange (IKE) process as a key management process described in RFC 2409 "The Internet Key Exchange (IKE)" (non-patent document 3). An IPsec engine 31 is provided as a part of the TCP/IP layer software, equipped with a Security Policy Data Base (SPDB) 32 storing information (SP information) for determining whether encryption should be applied to transmission packets and a Security Association Data Base (SADB) 33 storing information (SA information) such as encryption schemes and encryption keys which are used for encrypted communication.

A server that can be a peer to the client also arms the same software as shown in FIG. 2, so that the client's application layer will communicate with the server's application layer and the client's key management process will communicate with the server's key management process.

When the IPsec engine 31 detects an IP packet transmission request issued by a program in the application layer 40, it checks the header information of the IP packet against the SPDB 32 and determines whether IPsec should be applied to this IP packet. Having determined that IPsec should be applied to the IP packet, the IPsec engine 31 retrieves Security Association (SA) information to be used for the IP packet from the SADB 33. At this time, if the SA information for the IP packet has not been registered in the SADB 33, the IPsec engine 31 requests the IKE (key management) process 50 to exchange SA information including an encryption key with the peer (destination server).

The IKE process 50 exchanges SA information with the peer in accordance with an Internet Security Association and Key Management Protocol (ISAKMP) described in RFC 2406 "Internet Security Association and Key Management Protocol (ISAKMP)" (non-patent document 4). In the ISAKMP, after establishing an encrypted communication path between itself and its peer, each communication node carries out an authentication procedure to verify whether the peer is a true device permitted for communication. Upon verifying that the peer is a true device permitted for encrypted communication by the above authentication procedure, the IKE process 50 starts to exchange SA information with the peer device through the communication path set up by ISAKMP. Upon completing the exchange of SA information with the peer, the IKE process 50 notifies the IPsec engine 31 of the SA information and related Security Policy (SP) information.

After storing the SP information and SA information notified from the IKE process 5 into the SPDB 32 and SADB 33, respectively, the IPsec engine 31 encrypts the IP packet in accordance with the SA information and transmits it to the peer. Upon receiving the encrypted IP packet, a server as the peer decrypts the received IP packet in accordance with the SA information agreed upon by the IKE process and notifies the server's application layer of the IP packet reception.

Meanwhile, RFC 3261 "SIP: Session Initiation Protocol" (non-patent document 5) describes a method in which mutual authentication between a client (user agent client) and a Session Initiation Protocol (SIP) proxy which is a session management server and mutual authentication between the SIP proxy and a server (user agent server) are performed by Transport Layer Security (TLS) and encrypted communication is performed between the client and the SIP proxy and between the SIP proxy and the server. According to the SIP model of RFC 3261, the client and the server are initially verified to be true peers by the SIP proxy and encrypted SIP messages are communicated between the client and the server. Thus, it is difficult for a device other than the client, server, and SIP proxy to intercept messages communicated between the client and the server.

The SIP is a text-based protocol and a SIP message is comprised of a header and a message body indicating the contents of session. Details on the SIP are described in RFC 3263 "Session Initiation Protocol (SIP): Locating SIP Servers" (non-patent document 6). Moreover, RFC 2327 "SDP: Session Description Protocol" (non-patent document 7) discloses a Session Description Protocol (SDP) that is used for session descriptions and a method of describing encryption parameters to be exchanged between a client and a server. The client and server in the SIP model exchange session descriptions and encryption parameters by SIP messages through encrypted communication paths established between the client and the SIP proxy and between the SIP proxy and the server. Then, communication of encrypted packets using the encryption parameters can be performed between the client and server.

FIG. 3 shows an example of an authentication system using the above described SIP proxy. Here, "PR" denotes a ship proxy connected to a plurality of clients CL1, CL2, and CL3 and a plurality of servers SV1, SV2, and SV3. The SIP proxy PR uses a secret key SK 30 and a public key certificate PK30 issued by a certificate authority CA4 and has in advance a plurality of root certificates RT1, RT2, and RT3 corresponding to certificate authorities (CA1, CA2, and CA3) that issued public key certificates to be used by the servers SV1, SV2, and SV3, respectively, in order to authenticate these servers.

In the authentication system using the SIP proxy, each of servers and clients is solely required to have only a root certificate RT4 for the certificate authority that issued the public key certificate PK30 to be used by the SIP proxy, as the root certificate for authenticating its peer, as shown in FIG. 3. When each client wishes to connect to another server after terminating a communication with one server via the SIP proxy, the client can communicate with the SIP proxy through the already established encrypted communication path between itself and the SIP proxy. Thus, the client is solely required to exchange encryption parameters with a new peer before initiating encrypted communication with the new peer. In other words, in the authentication system using the SIP proxy, it is advantageous that each client does not have to perform a new authentication process each time connecting to another server.

Nevertheless, in the SIP framework, the session management server (SIP proxy) determines the forwarding destination of a received SIP message by an identifier (SIP-URI) in a form of "user-name@domin-name" which is termed Address-of-Record (AOR). Thus, in a network system requiring session set up via a session management server like the above SIP proxy, an application to be executed on a client has to use, as the identifier for designating a destination server, SIP-URI (Uniform Resource Identifier) capable of identifying a domain to which the server belongs.

More specifically, in the SIP framework, a client creates a connection request SIP message, in which SIP-URI in the form of AOR to specify a destination server is described as a Request-URI included in a start line, and transmits an IP packet including the SIP message in the payload to a home SIP proxy located in the domain to which the client belongs.

Having received the IP packet, the SIP proxy executes, for example, NATPR Record search and SRV Record search in a Domain Name System (DNS), based on the domain name given from the AOR described as the Request-URI, thereby determining the IP address or Full Qualified Domain Name (FQDN) of a SIP proxy (forwarding destination SIP proxy) located in a domain to which the server to be the forwarding destination of the received message belongs. If the result of the SRV Record search gives FQDN, the IP address of the forwarding destination SIP proxy can be obtained by executing A Record search in the DNS. A procedure for obtaining the IP address of the forwarding destination SIP proxy from a domain name is described in RFC 3263 (non-patent document 6).

If the destination server belongs to the home domain to which the SIP proxy having received the SIP message belongs, the SIP proxy obtains the IP address (or FQDN) of the destination server from a location service DB (database), using the SIP-URI described in the Request-URI of the received message as a search key, assigns this IP address to the destination address of the IP packet, and forwards the SIP message to the destination server. If the destination serve belongs to a domain different from the home domain to which the SIP proxy (or the source client) belongs, the SIP message is forwarded to a SIP proxy located in a domain to which the destination server belongs. This forwarding destination SIP proxy obtains an IP address or FQDN of the destination server from the location service DB and forwards the SIP message to the destination server.

As described above, in the network system requiring session set up via a session management server (SIP proxy), the session management server having received a SIP message determines the domain to which the destination server belongs from the requested resource identifier (SIP-URL: Uniform Resource Locator) included in the received SIP message and forwards the received message to the destination server or destination session management server. However, each of general application programs that are executed on a client terminal connected to an IP network uses an identifier like an IP address that identifies only a destination server, rather than an identifier including a domain name like the above SIP-URI in the AOR form, to specify the destination server.

If an application program or software for encrypted communication issues a connection request designating the destination server with an IP address and a client transmits a connection request SIP message including the IP address for designating the destination server, a session management server (SIP proxy) having received this connection request message cannot identify a domain to which the received message must be forwarded. In this case, clients cannot take profit from the advantage of the authentication system shown in FIG. 3.

SUMMARY OF THE INVENTION

An object of the present invention is to provide a data communication method and system for making it possible to forward a session control message, which designates a destination server with an IP address, to the destination server via a session management server.

Another object of the present invention is to provide a data communication method and system making it possible to forward a connection request, which is issued from a client and designates a destination server with an IP address, to the destination server via a session management server.

A further object of the present invention to provide a data communication method and system enabling encrypted data communication between a client and a server and making it easy to perform a client-to-server authentication procedure required prior to the encrypted data communication.

To achieve the above objects, the present invention is characterized in that, when an application program or encrypted communication software on a client issues a connection request designating a destination server with an IP address, the client or the session management server automatically converts the IP address into a desired resource identifier identifiable a domain.

According to a first embodiment of the present invention, a data communication method for communication between a client and a server via a communication network to which session management servers are connected is comprised of: a first step of sending from the client to first one of the session management servers a query, in which an IP address of a destination server is specified, to search for a resource identifier including a domain name assigned to the destination server; a second step of retrieving by the first one of the session management servers a resource identifier corresponding to the IP address of the destination server from a location table indicating the correspondence of IP addresses to resource identifiers, and notifying the client of the resource identifier; a third step of transmitting a connection request message from the client to the first one of the session management servers, the connection request message designating a request resource with the resource identifier of the destination server; and a fourth step of determining, by the first one of the session management servers having received the connection request message, a forwarding destination of the received message based on a domain name included in the resource identifier specified in the received message, and forwarding the received message to the destination server or second one of the session management servers managing a domain to which the destination server belongs.

According to a second embodiment of the present invention, a data communication method for communication between a client and a server via a communication network is comprised of: a first step of transmitting a connection request message from the client to first one of session management servers connected to the communication network, the connection request message specifying a request resource with an IP address of a destination server; a second step of retrieving, by the first one of the session management servers having received the connection request message, a resource identifier corresponding to the IP address of the destination server from a location table indicating the correspondence of IP addresses to resource identifiers; a third step of changing by the first one of the session management servers the IP address specifying the request resource in the received message to the resource identifier retrieved from the location table; and a fourth step of determining by the first one of the session management servers a forwarding destination of the received message based on a domain name included in the resource identifier, and forwarding the received message to the destination server or second one of the session management servers managing a domain to which the destination server belongs.

According to a third embodiment of the present invention, a data communication method for communication between a client and a server via a communication network is comprised of: a first step of sending from the client to a destination server a query for a resource identifier including a domain name assigned to the server; a second step of sending the resource identifier from the server to the client; a third step of transmitting a connection request message from the client to first one of the session management servers connected to the communication network, the connection request message designating a request resource with the resource identifier of the destination server; and a fourth step of determining, by the first one of the session management servers having received the connection request message, a forwarding destination of the received message based on a domain name included in the resource identifier specified in the received connection request message, and forwarding the received message to the destination server or second one of the session management servers managing a domain to which the destination server belongs.

More specifically, the data communication method of the present invention further comprises: a fifth step of replying from the destination server to the client via the first or second one of the session management servers, in response to receiving the connection request message, a connection response message including parameters required for encrypted data communication; and a sixth step of communicating packets of messages encrypted in accordance with the parameters specified in the connection response message between the client and the destination server.

The session management servers are, for example, Session Initiation Protocol (SIP) servers. In this regard, messages to be communicated between a client and a session management server are encrypted according to Transport Layer Security (TLS) defined in RFC 3261. Data to be communicated between the client and the destination server is encrypted, for example, according to Internet Protocol Security (IPsec) defined in RFC 2401.

A session management server according to the present invention is comprised of: first means for retrieving, when a connection request message designating a request resource with an IP address of a destination server is received from a client, a resource identifier of the destination server corresponding to the IP address from a location table indicating the correspondence of IP addresses to resource identifiers, and changing the IP address designating the request resource in the received message to the resource identifier; and second means for determining a forwarding destination of the received message based on a domain name included in the resource identifier, and forwarding the received message to the destination server or another session management server managing a domain to which the destination server belongs.

In particular, the session management server further comprises: a network interface connected to the communication network; a message processing module for processing session control messages; and a security module for decrypting an encrypted message received from the network interface to transfer a decrypted message to the message processing module and for encrypting a session control message received from the message processing module to output an encrypted message to the network interface, wherein the message processing module is provided with the functions of the first means for changing the description of the request resource and the second means for forwarding the received message.

A client terminal according to the present invention is comprised of: a network interface connected to a communication network; a message processing module for processing session control messages; a first security module for encrypting a transmission message generated by an application program and addressed to a destination server to output an encrypted message to the network interface and decrypting an encrypted message received from the network interface to transfer a decrypted message to the application program; and a security information control module for outputting, when a request to exchange encryption parameters with a destination server occurs, a connection request message designating the destination server with an IP address to the message processing module and for transferring, when a connection response message is received from the message processing module, encryption parameters extracted from the received message to the first security module, wherein the message processing module obtains, when the connection request message is received from the security information control module, a resource identifier of the destination server from a session management server or the destination server based on the IP address, and transmits the connection request message, in which a request resource is specified with the resource identifier, to the session management server.

For practical application, the client terminal of the present invention further comprises a second security module for decrypting an encrypted session control message received from the network interface to transfer a decrypted message to the message processing module and encrypting a session control message received from the message processing module to output an encrypted message to the network interface module, wherein data to be communicated with the destination server is encrypted by the first security module and messages to be communicated with the session management server are encrypted by the second security module.

According to the present invention, even if a connection request message designating the request resource (destination sever) with an IP address is issued from an application program or encrypted communication software on a client, the IP address of the request resource in the connection request message can be automatically converted to a resource identifier by which a domain is identifiable. Thus, a session management server that controls forwarding of a connection request message can determine a domain, to which the message should be forwarded, from the resource identifier in the received message and forward the received message to the destination server or a session management server located in a domain to which the destination server belongs.

According to the present invention, even a client that executes general application programs can easily carry out encrypted data communication with a destination server by taking advantage of authentication facilities provided by a session management server.

BRIEF DESCRIPTION OF THE DRAWINGS

FIG. 41D is a fourth part of the flowchart illustrating control operation to be performed by the SIP message processing module 53P on the SIP proxy PRa, when receiving the connection request message.

FIG. 62 shows contents of a location table provided in a server SV1b.

DETAILED DESCRIPTION OF THE PREFERRED EMBODIMENTS

Figure 1:
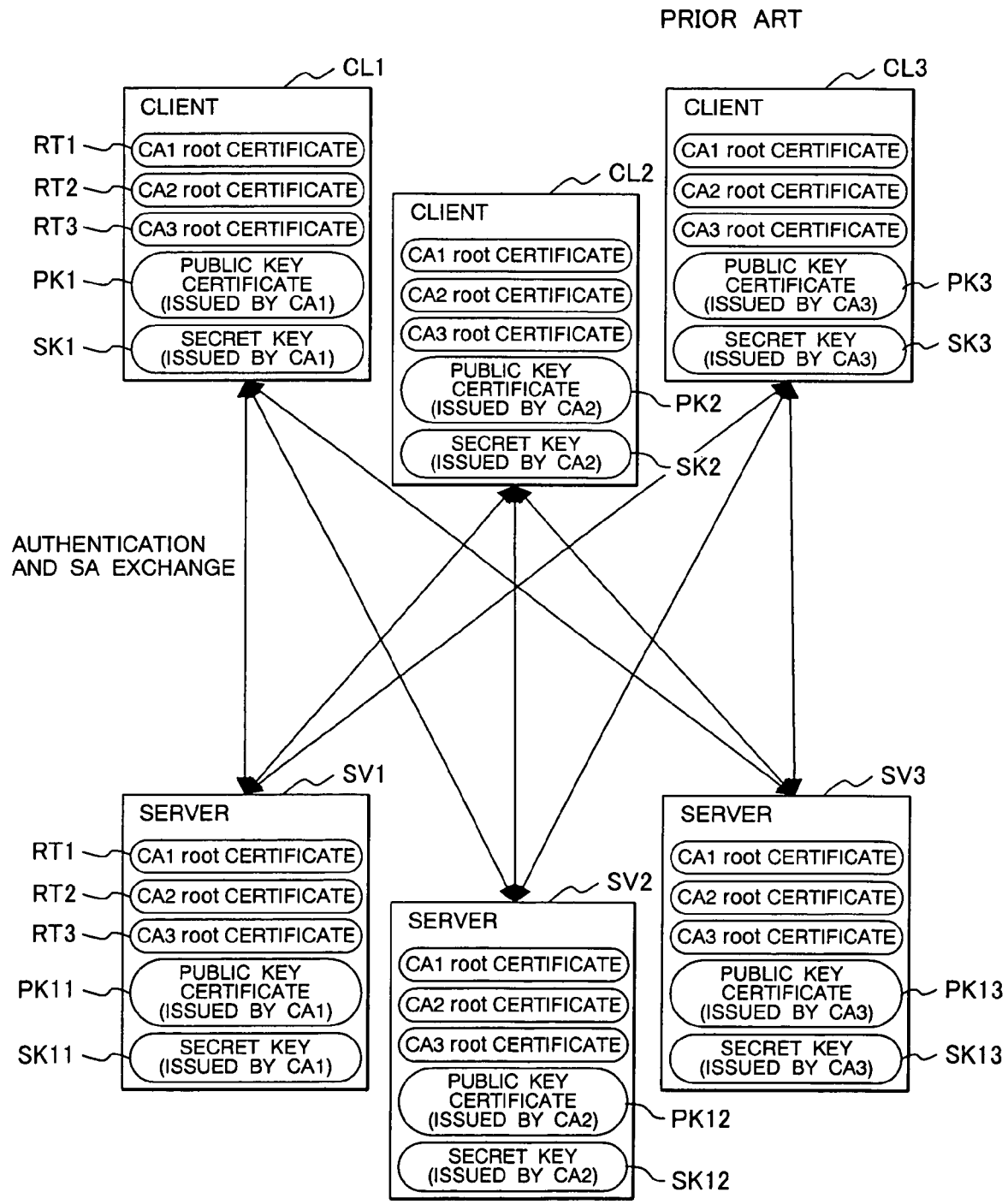
FIG. 1 is a diagram for explaining a prior art authentication procedure in public key encrypted communication.
Figure 2:
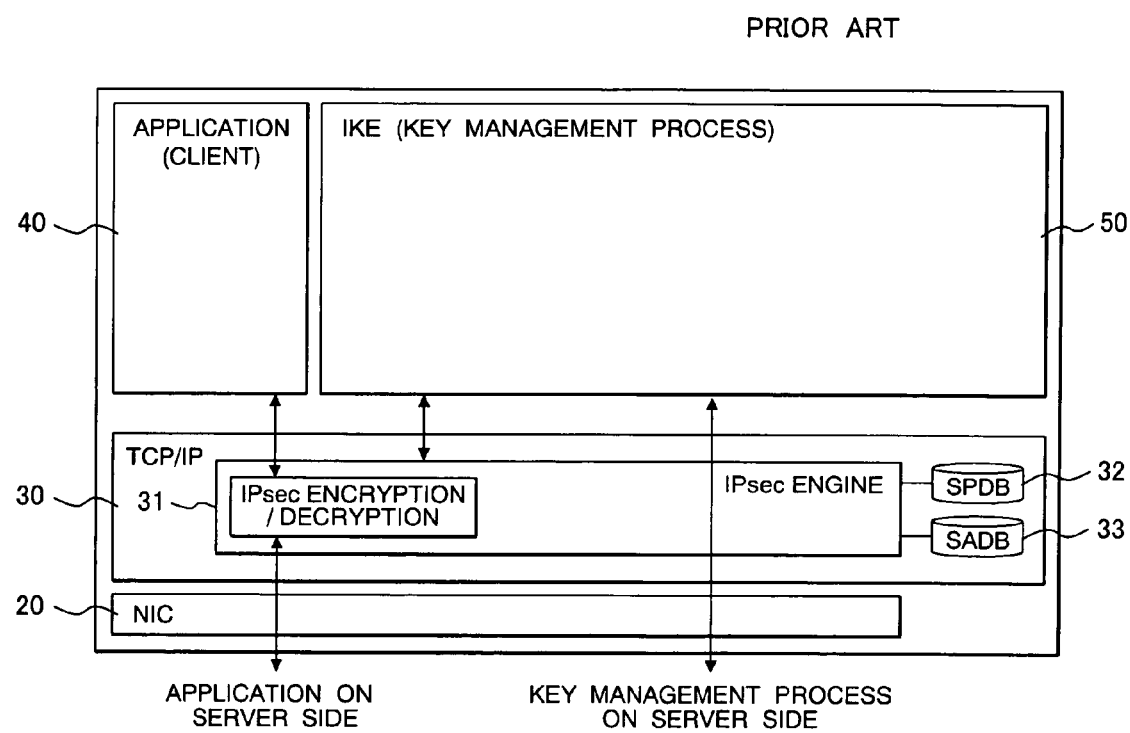
FIG. 2 is a block diagram for explaining a basic configuration of software that a client arms to carry out IPsec-encrypted communication according to prior art.
Figure 3:
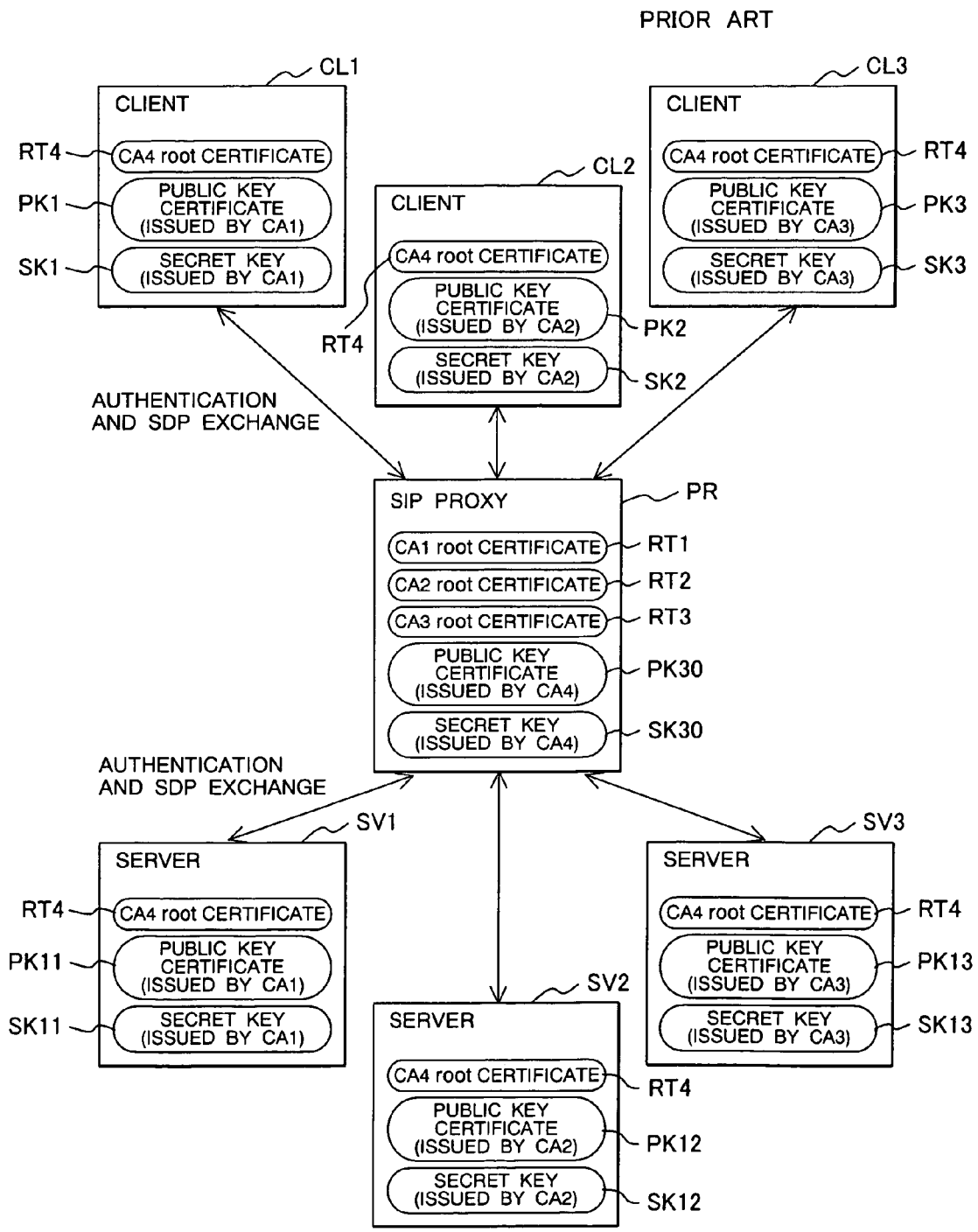
FIG. 3 is a diagram for explaining an authentication system using a SIP proxy relevant to the present invention.

Embodiments of the present invention will be described hereinafter by referring to the drawings.

Figure 4:
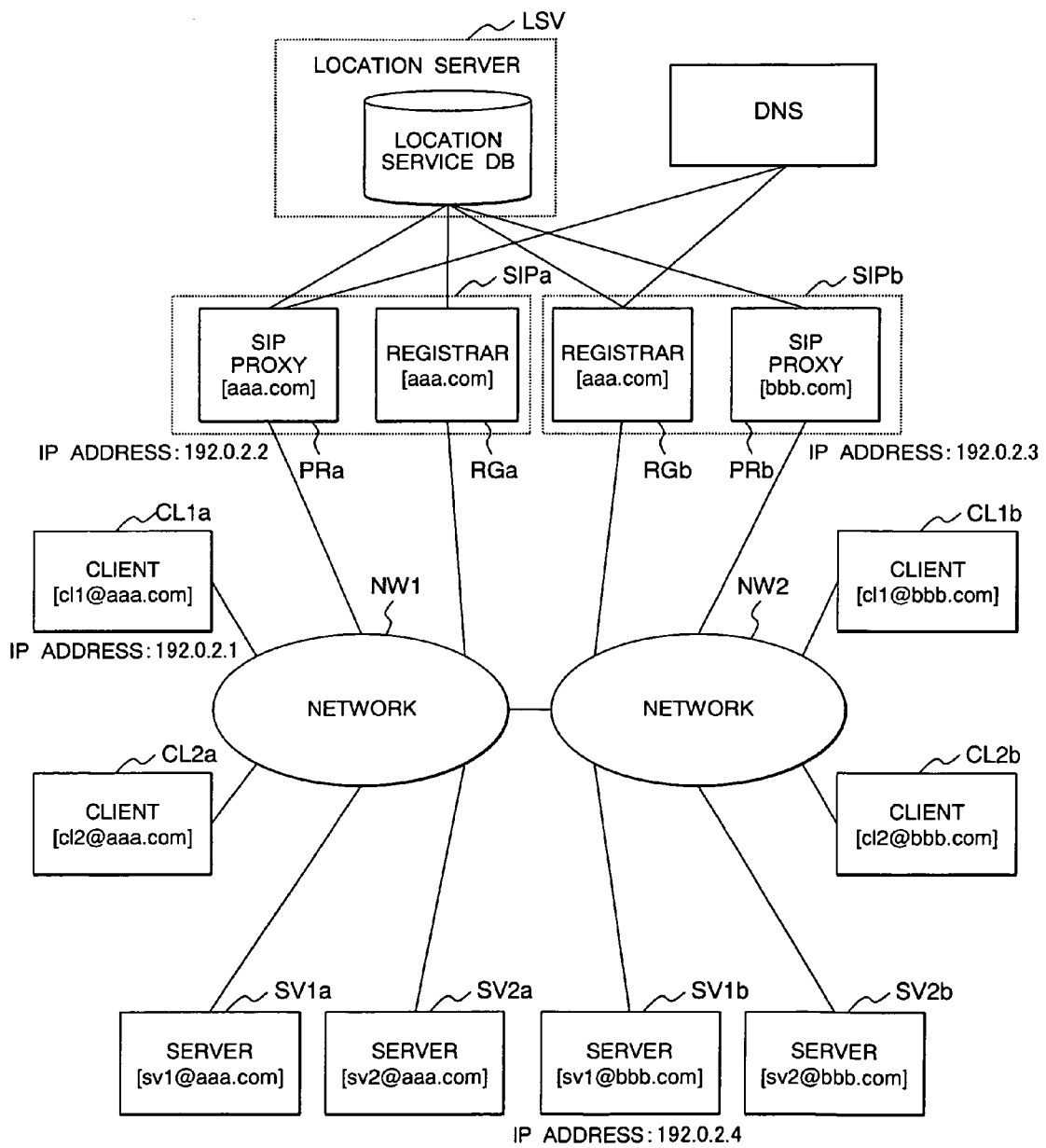
FIG. 4 is a diagram showing an example of a network configuration including session management servers (SIP servers) according to the present invention.

FIG. 4 is an example of a network configuration to which the present invention is applied.

The network shown here is composed of a location server LSV, a Domain Name System (DNS), a first network NW1 forming a first domain managed by a SIP server SIPa, and a second network NW2 forming a second domain managed by a SIP server SIPb. To the first network NW1, clients CL1a, CL2a and servers SV1a, SV2a are connected. To the second network NW2, clients CL1b, CL2b and servers SV1b, SV2b are connected. The SIP server SIPa is comprised of a SIP proxy PRa and a registrar RGa. The SIP server SIPb is comprised of a SIP proxy PRb and a registrar RGb.

Here, a character string specified in parentheses attached to each client and each server denotes a value of SIP-URI in the Address-of-Record (AOR) form, corresponding to a forwarding destination identifier (resource identifier) of a SIP message. The clients and servers connected to the first network NW1 are respectively assigned AORs including the domain identifier "aaa.com" of the SIP server SIPa. The clients and servers connected to the second network NW2 are respectively assigned AORs including the domain identifier "bbb.com" of the SIP server SIPb.

Upon receiving a SIP message designating a destination server with an IP address from a client under management, the SIP server SIPa or SIPb according to the present invention requests the location server LSV to search for an AOR (resource identifier) corresponding to the IP address of the destination. Upon receiving a SIP message designating a destination server with an AOR from the other SIP server, the SIP server SIPa or SIPb requests the location server LSV to search for an IP address corresponding to the AOR of the destination.

Figures 5, 6:
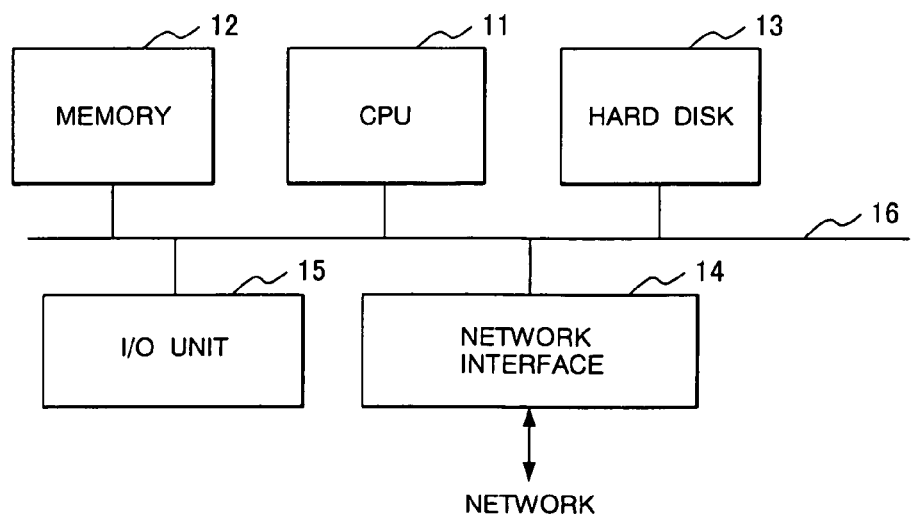
FIG. 5 shows an example of a location service table provided in a location server shown in FIG. 4
FIG. 6 is a block diagram showing a hardware configuration of a SIP proxy PRa shown in FIG. 4.

The location server LSV has a location service database (DB) in which a location service table 60 is stored. As shown in FIG. 5, the location service table 60, for example, is comprised of a plurality of entries EN-1, EN-2, and so on, each corresponding to each of the clients and servers under the management of the SIP servers SIPa and SIPb. Each entry indicates the correspondence of a client's or server's AOR 61 to an IP address 62. In response to a location data search request from a SIP server, the location server LSV searches the location service table 60 for an AOR (or IP address) corresponding to the IP address (or AOR) specified as a search key and returns the search result to the requester SIP server.

FIG. 6 shows a hardware configuration of a SIP proxy PRa.

The SIP proxy PRa is comprised of a processor (CPU) 11, a memory 12 and a hard disk 13 for storing a variety of software to be executed by the processor and related data, a network interface 14 for connecting to the network NW1 (NW2), and an I/O unit 15. These elements are interconnected by an internal bus 16. The SIP proxy PRb, registrars RGa, RGb, clients CL1a to CL2b, and servers SV1a to SV1b are basically composed of the same components of the SIP proxy PRa shown in FIG. 6.

In the following, a first embodiment of the present invention will be described, taking as an example a communication procedure to be performed in an instance where the client CL1a belonging to the first domain shown in FIG. 4 communicates encrypted data with the server SV1b belonging to the second domain.

Figure 7:
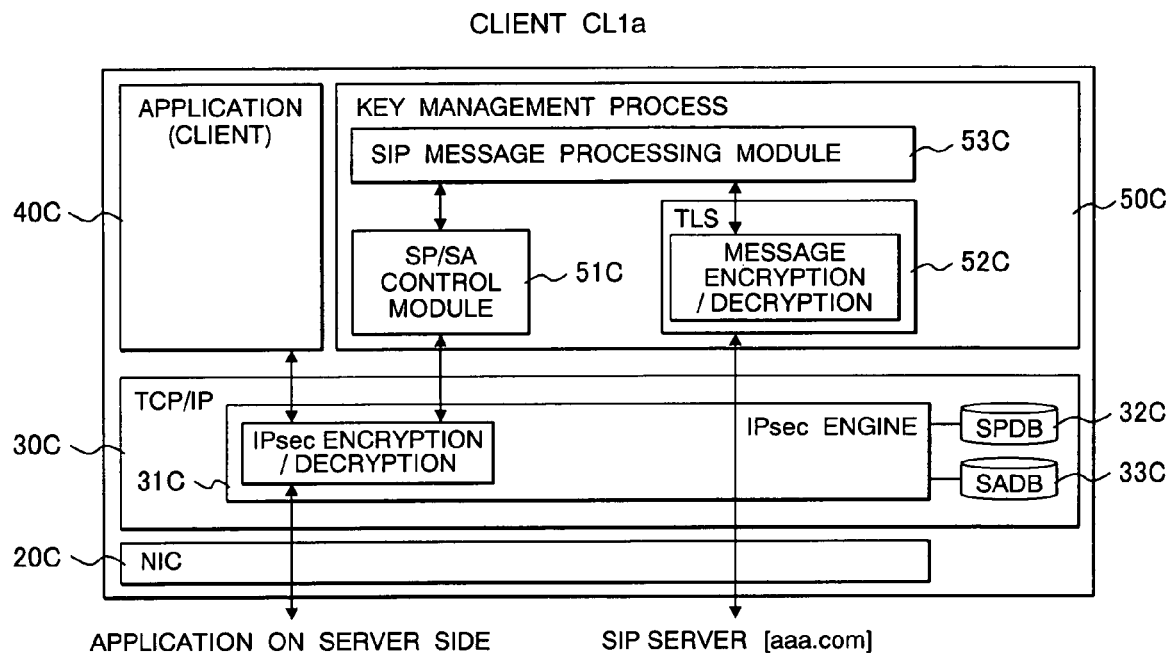
FIG. 7 is a diagram showing a basic configuration of software on a client VL1a shown in FIG. 4.

FIG. 7 shows a basic configuration of software on the client CL1a. Software on other clients CL1b to CL2b is also organized like this.

The software on the client CL1a is comprised of a network interface card (NIC) module 20C, a TCP/IP layer module 30C including an IPsec engine 31C provided with IPsec encryption/decryption functions, application programs 40C, and a key management process module 50C. The first embodiment is characterized in that the key management process module 50C comprises a Security Policy/Security Association (SP/SA) control module 51C, a Transport Layer Security (TLS) module 52C, and a SIP message processing module 53C.

Figure 8:
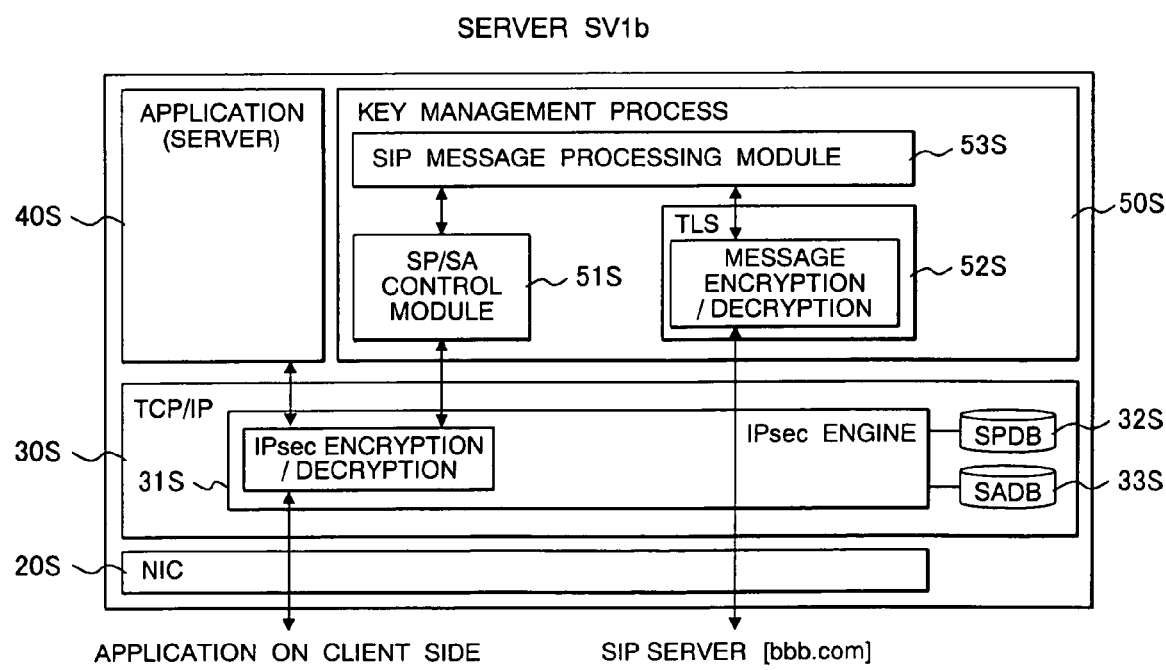
FIG. 8 is a diagram showing a basic configuration of software on a server SV1b shown in FIG. 4.

FIG. 8 shows a basic configuration of software on the server SV1b. Software on other servers SV1a, SV2a, and SV2b is also organized like this.

The software on the server SV1b is comprised of a network interface card (NIC) module 20S, a TCP/IP layer module 30S including an IPsec engine 31S provided with IPsec encryption/decryption functions, an application program 40S, and a key management process module 50S. The key management process module 50S comprises an SP/SA control module 51S, a TLS module 52S, and a SIP message processing module 53S.

One of the application programs 40C on the client CL1a and the application program 40S on the server SV1b communicates encrypted data with each other, using the IPsec encryption/decryption functions of the IPsec engines 31C, 31S provided on the client and the server. On the other hand, the SIP message processing module 53C on the client CL1a communicates encrypted SIP messages with a SIP message processing module on a SIP server SIPa (SIP proxy PRa, registrar RGa) which will be described later, using message encryption/decryption functions of the TLS modules provided on the client and the SIP server. Similarly, the SIP message processing module 53S on the server SV1b communicates encrypted SIP messages with the SIP message processing module on the SIP server SIPa (SIP proxy PRa, registrar RGa), using the message encryption/decryption functions within the TLS modules provided on the server and the SIP server.

Figure 9:
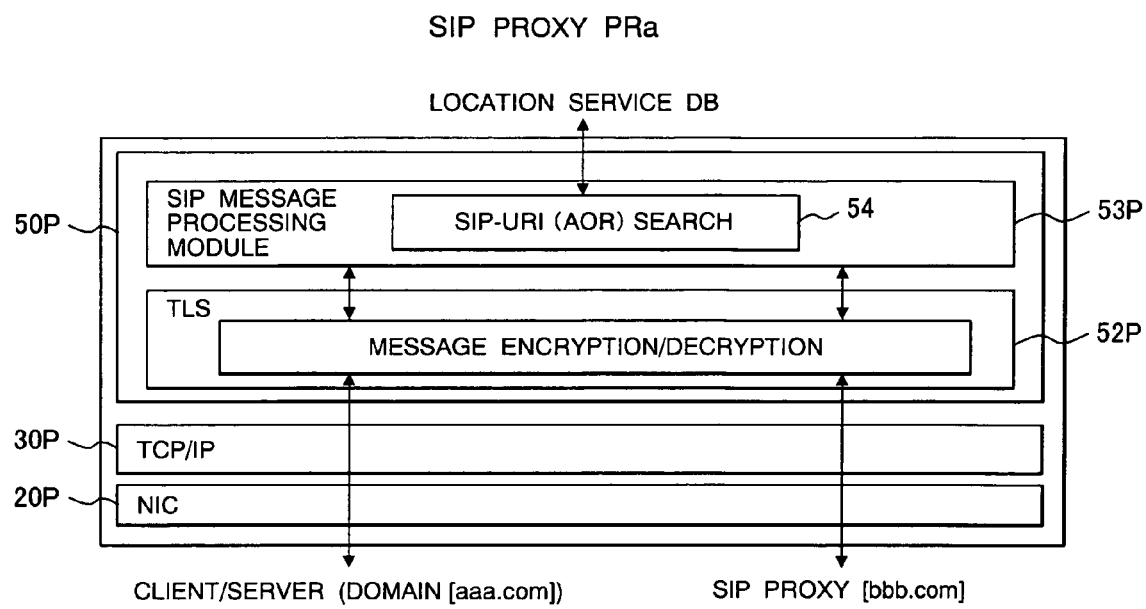
FIG. 9 is a diagram showing a basic configuration of software on a SIP proxy PRa shown in FIG. 4.

FIG. 9 shows a basic configuration of software on a SIP proxy PRa. Software on a SIP proxy PRb is also organized like this.

The software on the SIP proxy PRa is comprised of a network interface card (NIC) module 20P, a TCP/IP layer module 30P, and a key management process module 50P. The key management process module 50P comprises a TLS module 52P and a SIP message processing module 53P. The SIP message processing module 53P is provided with a SIP-URL (AOR) search function 54 which will be described later. The SIP message processing module 53P on the SIP proxy PRa communicates encrypted messages with each of clients and servers belonging to the domain managed by the SIP proxy and with each of the other SIP proxies each managing individual domain, for example, the SIP proxy PRb, using the message encryption/decryption functions of the TLS module 52P.

Figure 10:
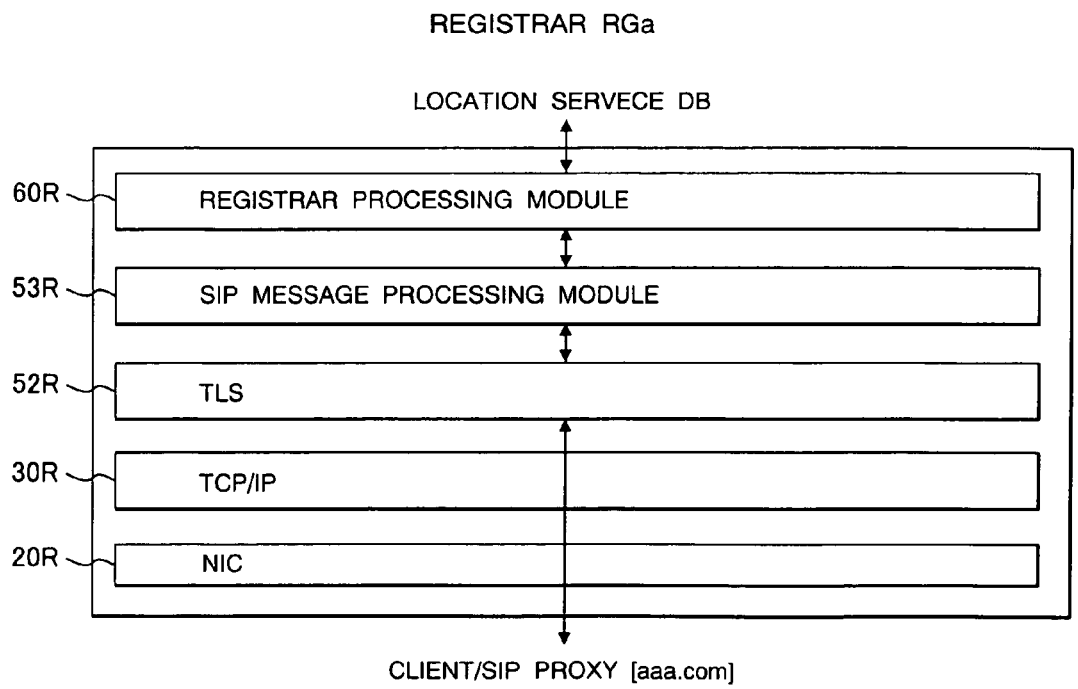
FIG. 10 is a diagram showing a basic configuration of software on a registrar PGa shown in FIG. 4.

FIG. 10 shows a basic configuration of software on a registrar RGa. Software on a registrar RGb is also organized like this.

The software on the registrar RGa is comprised of a network interface card (NIC) module 20R, a TCP/IP layer module 30R, a TLS module 52R provided with message encryption/decryption functions, a SIP message processing module 53R, and a registrar processing module 60R. Upon receiving an AOR request issued from a client or the SIP proxy PRa, the SIP message processing module 53R requests the registrar processing module 60R to execute location data search. In response to the request from the SIP message processing module 53R, the registrar processing module 60R accesses the location service DB provided on the location server LSV. Encryption does not apply to communication between the registrar RGa and SIP proxy PRa.

Figure 11:
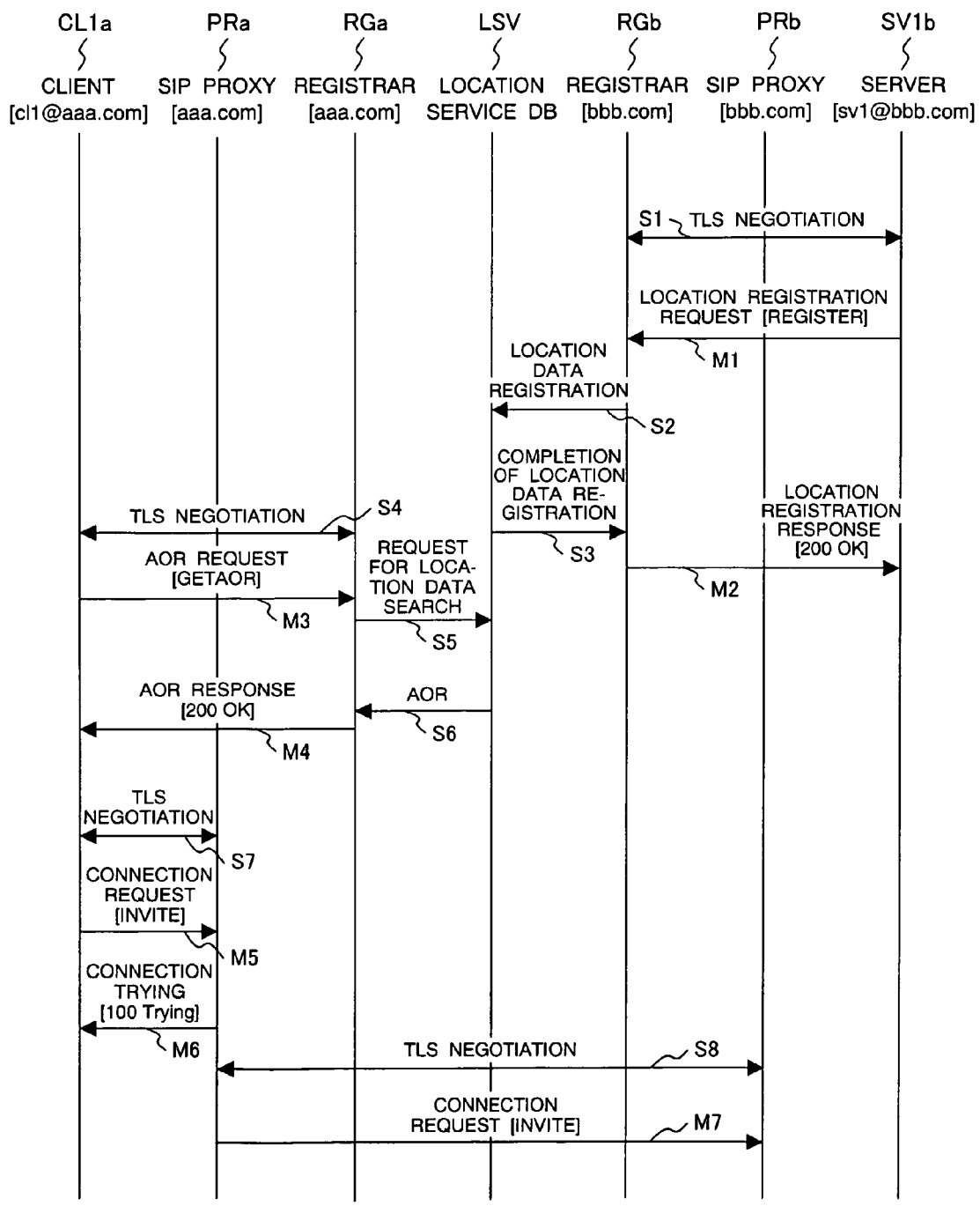
FIG. 11 is a part of a sequence chart for illustrating a first embodiment of encrypted communication according to the present invention.
Figure 12:
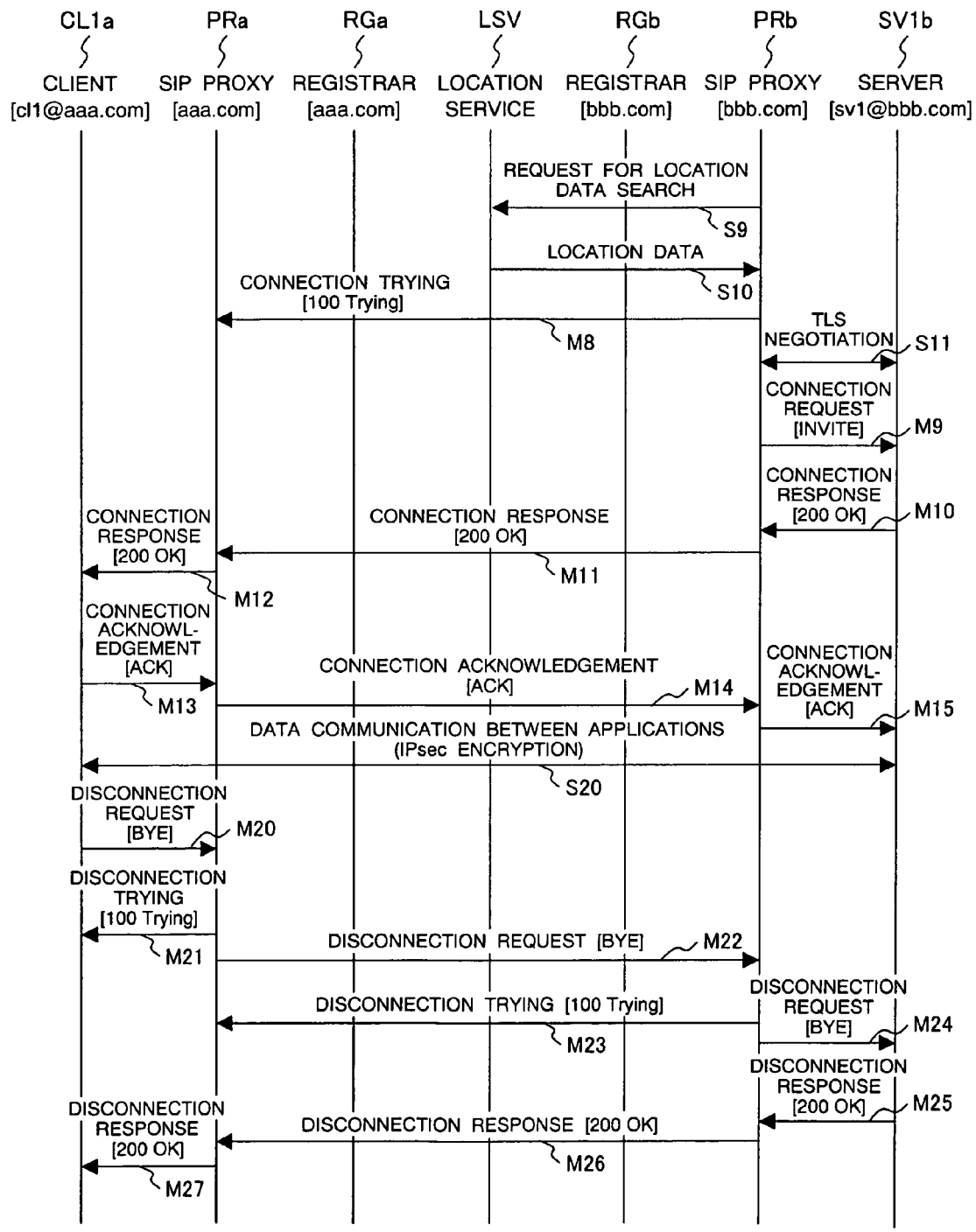
FIG. 12 is a remaining part of the sequence chart for illustrating the first embodiment of encrypted communication according to the present invention.

FIGS. 11 and 12 show a sequence chart illustrating the first embodiment of encrypted data communication according to the present invention. In the first embodiment, the client CL1a issues an AOR request.

In this embodiment, the server SV1b connected to the second network, which is the destination of a connection request issued from the client CL1a, performs TLS negotiation (S1) with the registrar RGb of the SIP server SIPb to get authentication of the server SV1b and set parameters for encrypted communication prior to the connection request from the client CL1a. After that, the server SV1b transmits a location registration request (SIP: REGISTER) message M1 to the registrar RGb.

Figure 13:
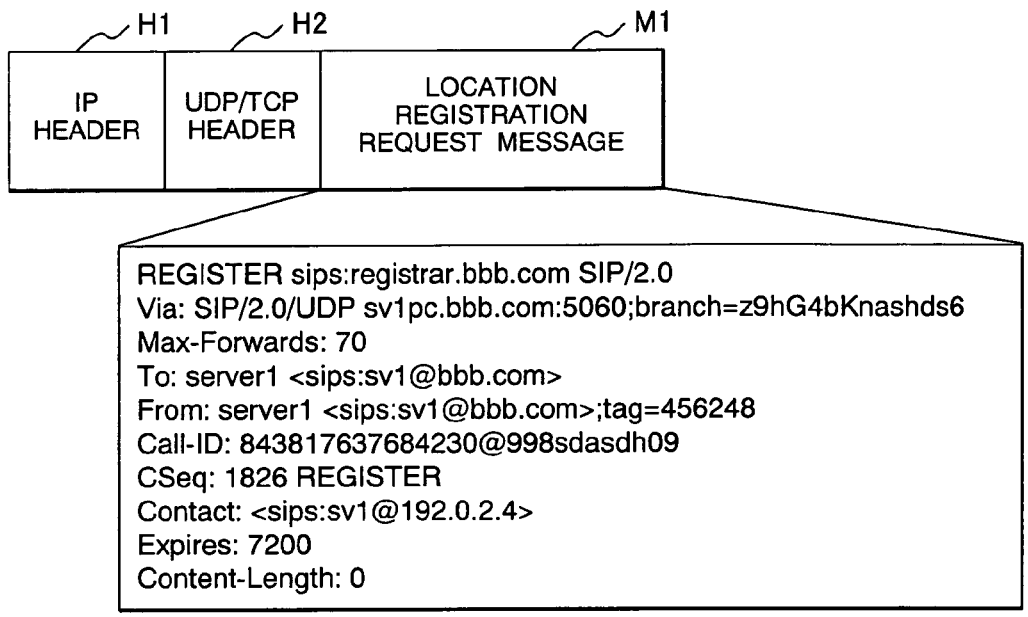
FIG. 13 shows an example of a format of a location registration request [REGISTER] message M1 shown in FIG. 11.

The location registration request message M1 is transmitted, for example, in the form of an IP packet with an IP header H1 and an UDP/TCP header H2 as shown in FIG. 13. The IP header H1 includes the IP address of the registrar RGb (Sip server SIPb) as a destination address and the IP address of the server SV1b as a source address.

A SIP message is comprised of a start line indicating the type of the SIP message (Request-Method), a header part in which information about a request or response is described, and a message body as required. The message body includes session descriptions for indicating the contents of a session. The start line includes a resource identifier (Request-URI) to identify the message destination depending on the message type. Session Description Protocol (SDP) standardized in RFC 3266 applies to writing the session descriptions in the message body.

In the case of the location registration request message M1 issued from the server SV1b, the start line includes "REGISTER" as the type of the SIP message and "registrar.bb.com" indicating the SIP-URI of the registrar RGb as the resource identifier specifying the message destination. The header part following the start line includes a Via header specifying the route of the SIP message, a To header specifying the destination of the message, a From header specifying the source of the message, a Call-ID header specifying the session identifier designated at the source, a CSeq header specifying the request method, a Contact header including the IP address "sv1@192.0.2.4" of the server SV1b to be registered into the location service table, an Expires header specifying the time-to-live of the message, a Content-Length header indicating the length of the message body that follows, and other header information. In the case of the location registration request message M1, since the message body is omitted, a value "0" is set in the Content-Length header, and the URI value of the requester server SV1b, "sv1@bbb.com" is set in both the To header and the From header.

Figure 14:
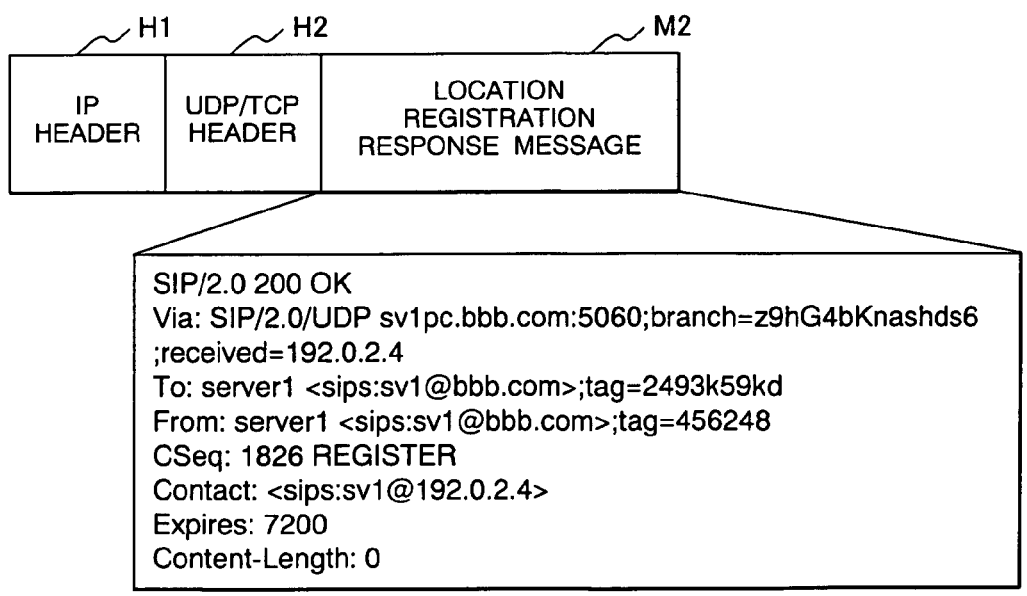
FIG. 14 shows an example of a format of a location registration response [200 OK] message M2 shown in FIG. 11.

Upon receiving the location registration request message M1, the registrar RGb registers location data indicating the relation between the requester URI "sv1@bbb.com" specified in the From header of the received message and the requester IP address "sv1@192.0.2.4" specified in the Contact header into the location service table 60 of the location service DB (S2) Upon the completion of location data registration (S3), the registrar RGb transmits a location registration response [200 OK] message M2 shown in FIG. 14 to the requester server SV1b. The start line of the location registration response message M2 includes "200 OK" indicating a response and the header part includes substantially the same descriptions as that of header information of the location registration request message M1.

In this state, it is assumed that after starting an application program, the user of the client CL1a performs the operation to transmit a packet to the IP address of the server SV1b. In this case, the client CL1a performs TLS negotiation (S4) with the SIP server SIPa (registrar RGa) to get authentication of the client and to set parameters for encrypted communication. After that, the client CL1a transmits an AOR (Address-of-Record) request (SIP: GET AOR) message M3 to the SIP server SIPa (registrar RGa).

Figure 15:
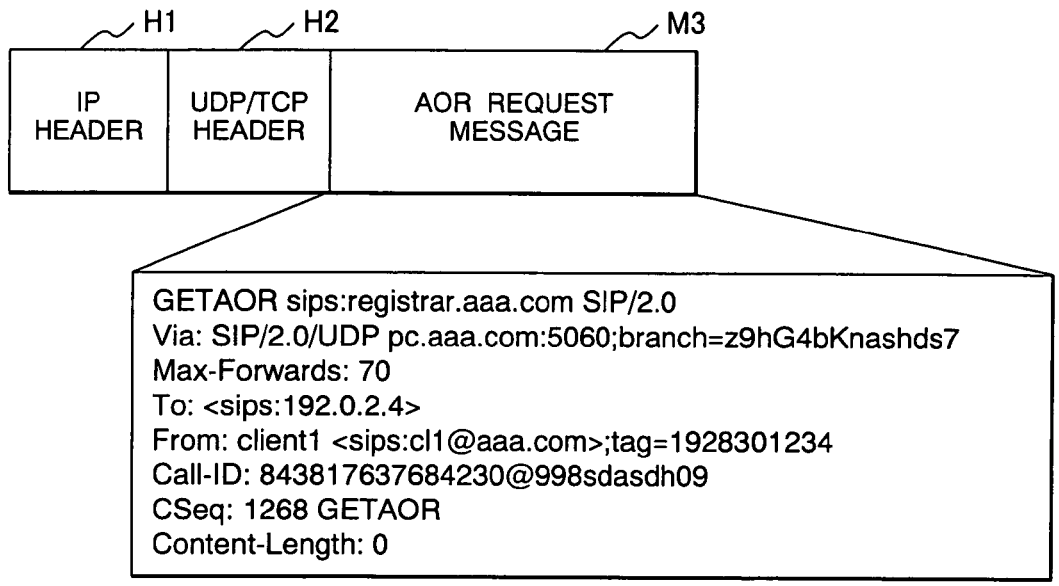
FIG. 15 shows an example of a format of an AOR request [GET AOR] message M3 shown in FIG. 11.

The AOR request message M3 includes, for example, as shown in FIG. 15, "GET AOR" indicating the type of the SIP message and "registrar.aaa.com" indicating the URI of the registrar RGa in the start line. The AOR request message M3 includes a Via header specifying the URI value to be the identifier of the SA/SP processing module 51C on the client CL1a, and a To header indicating the IP address "192.0.2.4" of the server SV1b to be the peer of the client CL1a. In the From header, "cl1@aa.com" indicating the URI of the client CL1a is set.

Upon receiving the AOR request message M3, the registrar RGa refers to the location service table 60 on the location service DB to search for the value of AOR (the URI of the server SV1b) corresponding to the IP address "192.0.2.4" specified in the To header of the received message (S5). When the location data AOR has been searched out (S6), the registrar RGa transmits an AOR response message M4 to the requester client CL1a.

Figure 16:
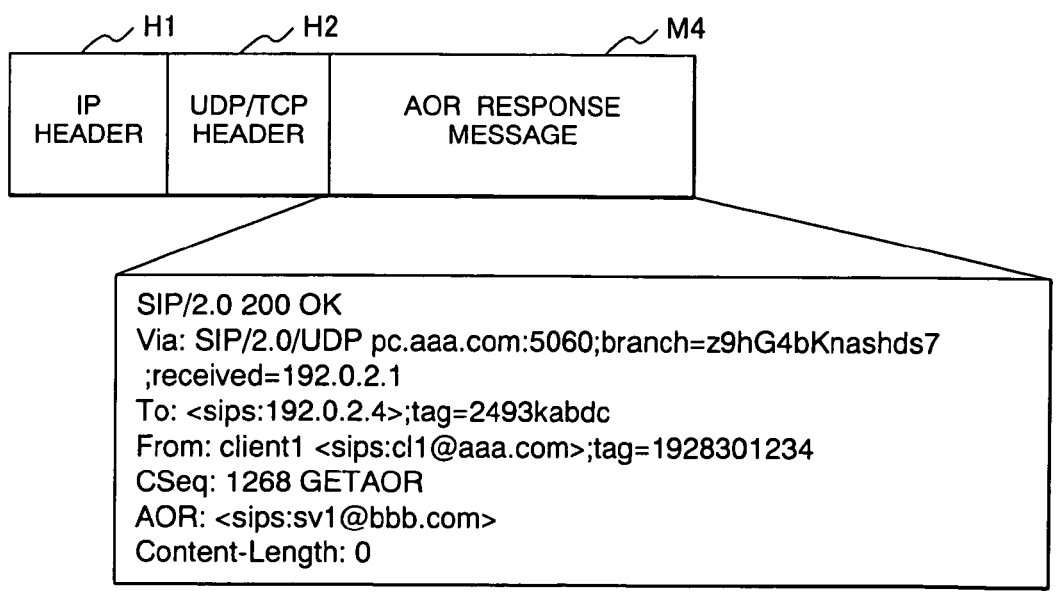
FIG. 16 shows an example of a format of an AOR response message M4 shown in FIG. 11.

The start line of the AOR response message M4 includes, as shown in FIG. 16, "200 OK" indicating that the message type is a response. The header part includes substantially the same descriptions as that of header information of the AOR request message M3 and an AOR header indicating the URI value "sv1@bbb.com" of the server SV1b retrieved from the location service table 60.

By receiving the AOR response message M4, the client CL1a can obtain the URI of the destination server SV1b. Then, the client CL1a performs TLS negotiation (S7) with the SIP proxy PRa of the SIP server SIPa to get authentication of the client and to set parameters for encrypted communication. After that, the client CL1a transmits to the SIP proxy PRa a connection request [INVITE] message M5 for the server SV1b.

Figure 17:
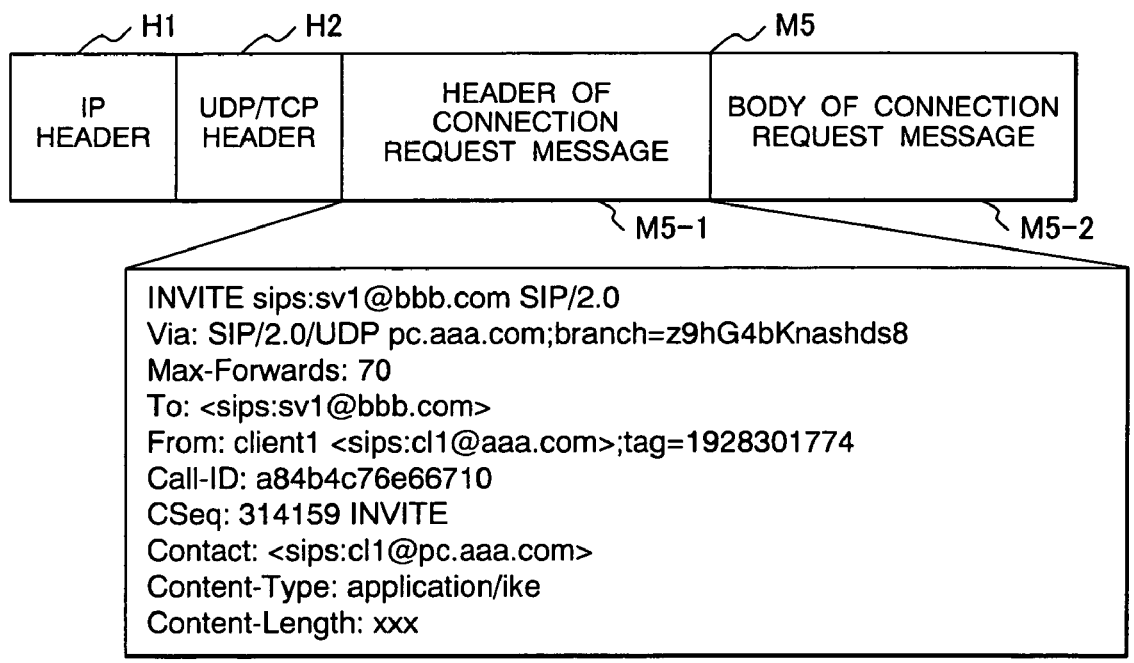
FIG. 17 shows an example of a format of a connection request [INVITE] message M5 shown in FIG. 11.

The connection request message M5 is comprised of a message header part M5-1 and a message body M5-2 as shown in FIG. 17. The message header part M5-1 begins with the start line including the message type "INVITE" and the SIP-URI "sv1@bbb.com" of the server SV1b to be the destination of the message as the Request-URI. The header part includes, as header information, a Via header specifying the SIP-URI of the SIP message processing module 53C on the client CL1a, To header including the SIP-URI "sv1@bbb.com" of the server SV1b, From header including the SIP-URI "cl1@aaa.com" of the client CL1a, Content-Type header, Content-Length header, and other information. The Content-Type header specifies the application program to which the message body M5-2 pertains and the Content-Length header specifies the length of the message body M5-2.

Figure 18:
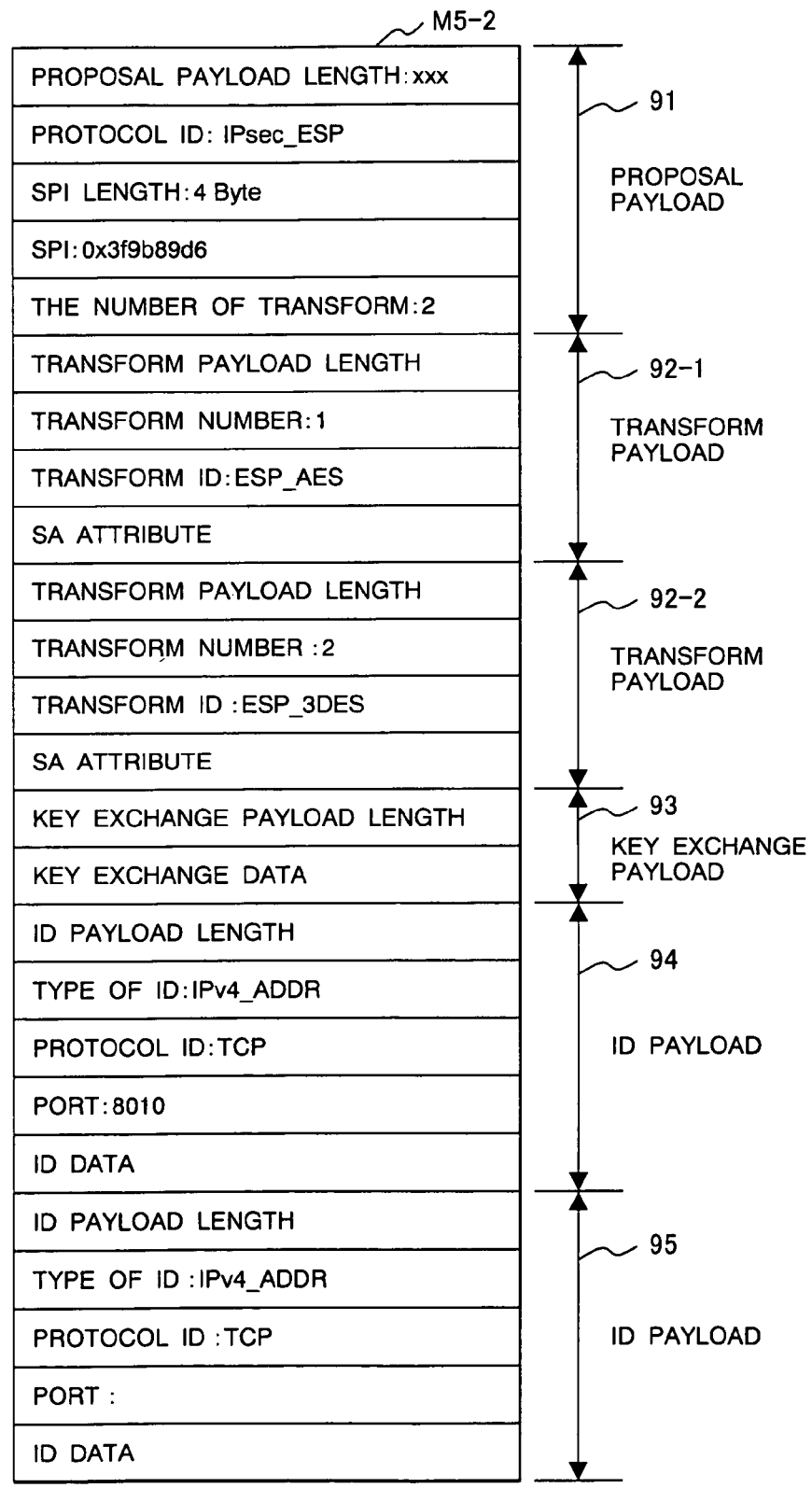
FIG. 18 shows an example of a format of a message body of the connection request message M5.

As is shown in FIG. 18, the body M5-2 of the connection request message M5 includes as SA information to be used for encrypted communication between the client CL1a and the server SV1b, for example, a proposal payload 91 indicating encryption protocol identifying information, transform payloads 92 indicating transform identifying information, a key exchange payload 93, a first ID payload 94 indicating source-of-request identifying information, and a second ID payload 95 indicating destination identifying information, in similar to the case of normal establishing SA for IPsec in IKE.

In this example, the client CL1a proposes two transform IDs of "ESP_AES" and "ESP_3DES" in two transform payloads 92-1, 92-2. The destination server SV1b will select one of these transform IDs and notify the client of the selected transform ID by a connection response message. The ID data in the first ID payload 94 indicates the IP address of the requester client CL1a and the ID data in the second ID payload 95 indicates the IP address of the destination server SV1b.

Figure 19:
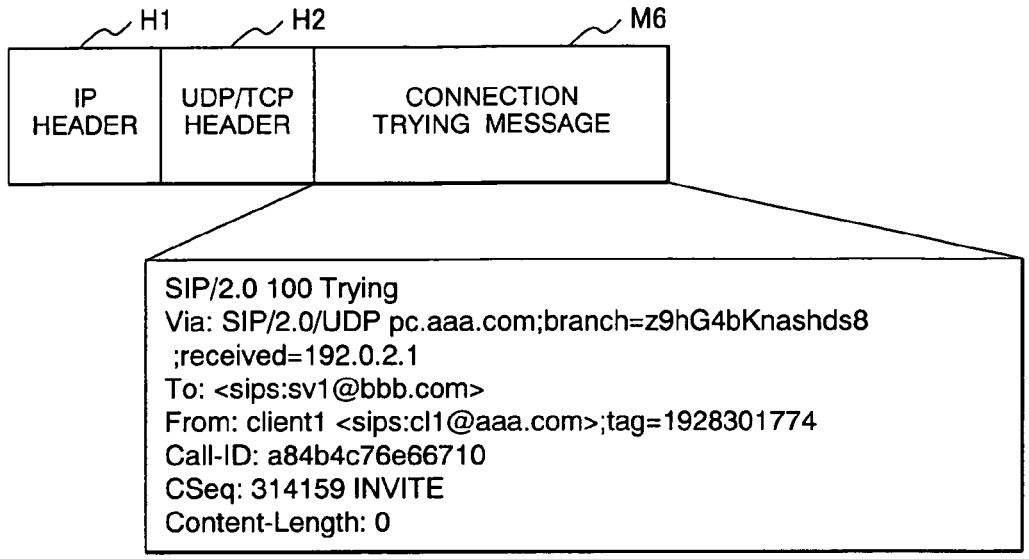
FIG. 19 shows an example of a format of a connection trying [100 Trying] message M6 shown in FIG. 11.

Upon receiving the connection request message M5, the SIP proxy PRa transmits to the requester client CL1a a connection trying [100 Trying] message M6 shown in FIG. 19 to notify the client that it is trying to connect to the server SV1b. After that, the SIP proxy PRa performs TLS negotiation (S8) with the SIP proxy PRb in a domain, to which the destination server SV1b belongs, to get mutual authentication and to set parameters for encrypted communication. The connection trying message M6 begins with the start line including, as the message type, "100 Trying" indicating that the request is being processed. The message M6 has a header part including several items of header information such as Via, To, From, Call-ID, and CSeq extracted from the connection request message M5 and its message body is omitted.

Figure 20:
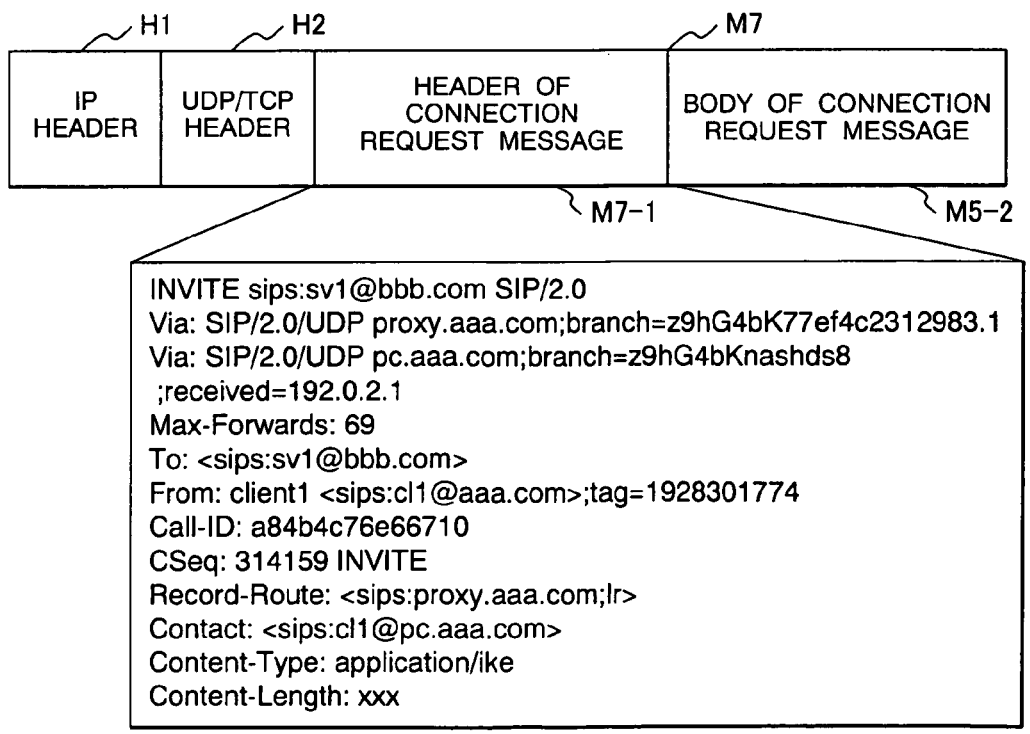
FIG. 20 shows an example of a format of a connection request message M7 shown in FIG. 11.

After completing the TLS negotiation with the SIP proxy PRb, the SIP proxy PRa composes a connection request message M7 which is shown in FIG. 20 by adding a new Via header including its own SIP-URI "proxy.aaa.com" and a Record-Route header specifying that the connection request passed via the URI "proxy.aaa.com" to the connection request message M5 received from the client and transmits the connection request message M7 to the SIP proxy PRb.

Figure 21:
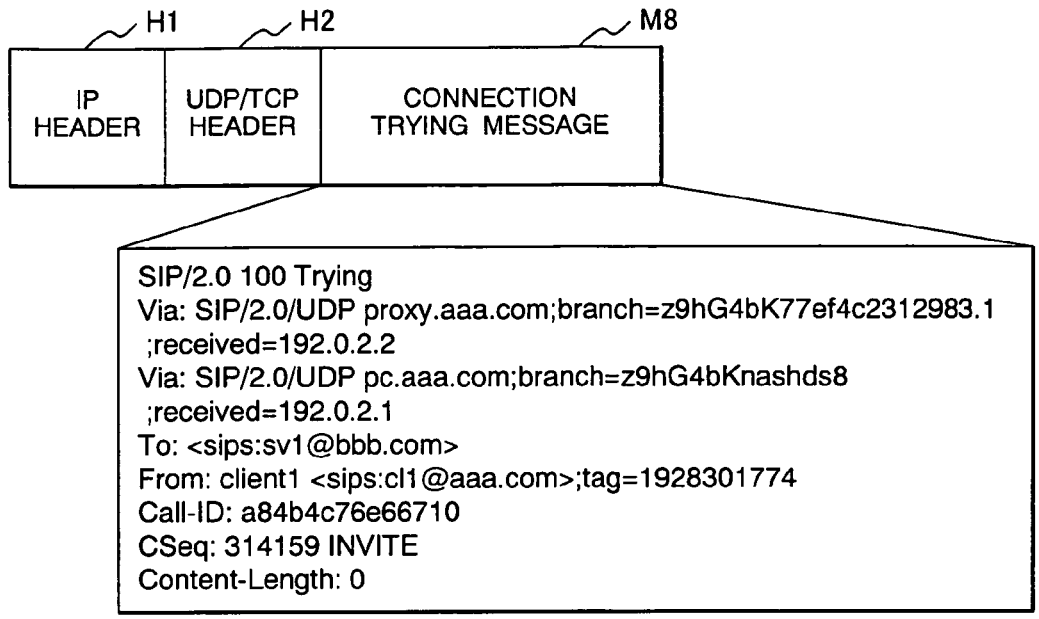
FIG. 21 shows an example of a format of a connection trying [100 Trying] message M8 shown in FIG. 12.

Upon receiving the connection request message M7, the SIP proxy PRb extracts the destination URI "SV1@aaa.com" from the start line of the received message and requests the location server LSV to search the location service DB (location data search) for the IP address corresponding to the above destination URI (S9), as show in FIG. 12. As the result of the search in the location service DB, the SIP proxy PRb receives location data (IP address "sv1@192.0.2.4") (S10) and transmits a connection trying [100 Trying] message M8 which is shown in FIG. 21 to the SIP proxy PRa that issued the connection request message M7. After that, the SIP proxy PRb performs TLS negotiation (S11) with the destination server SV1b identified by the IP address "sv1@192.0.2.4" for mutual authentication and setting parameters for encrypted communication.

Figure 22:
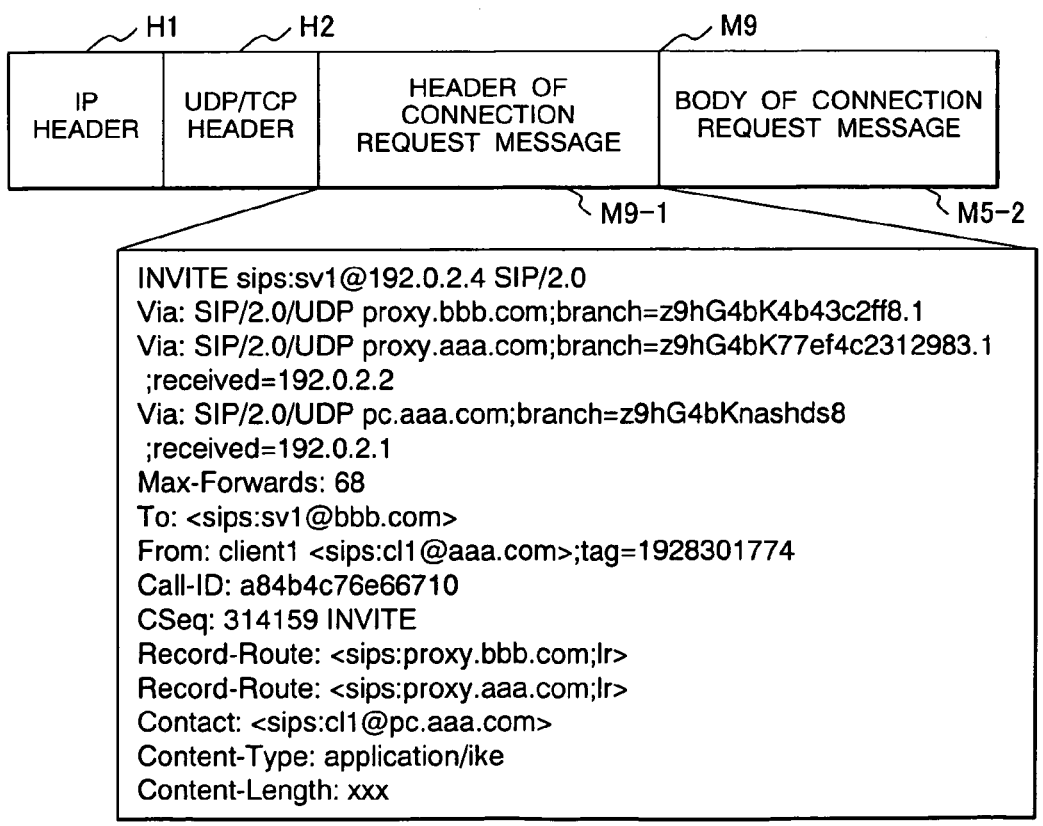
FIG. 22 shows an example of a format of a connection request [INVITE] message M9 shown in FIG. 12.

After completing the TLS negotiation with the destination server SV1b, the SIP proxy PRb composes a connection request [INVITE] message M9 which is shown in FIG. 22 by changing the Request-URI of the connection request message M7 to the IP address "sv1@192.0.2.4" and adding a new Via header including its own SIP-URI "proxy.bbb.com" and a Record-Route header specifying that the connection request passed via the URI "proxy.bbb.com" to the message M7 and transmits the connection request message M9 to the destination server SV1b.

Figure 23:
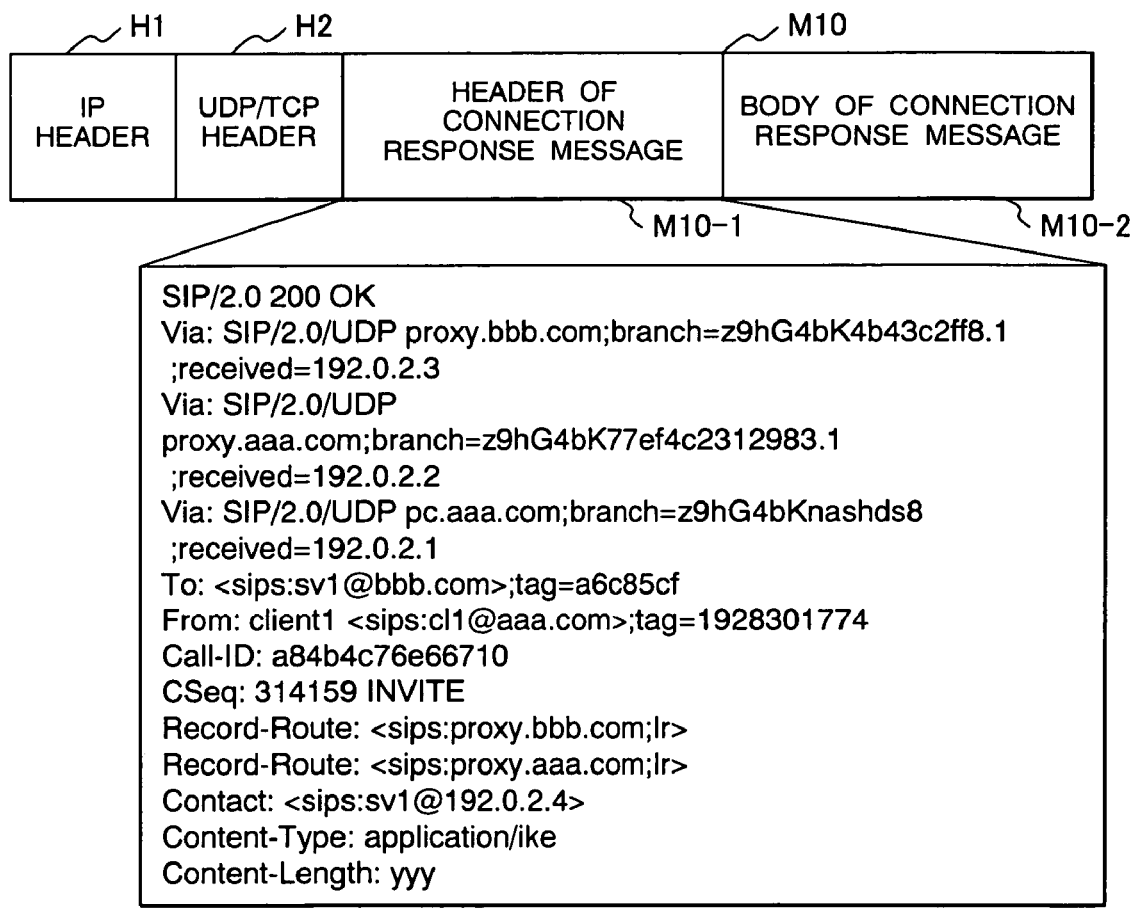
FIG. 23 shows an example of a format of a connection response message M10 shown in FIG. 12.
Figure 24:
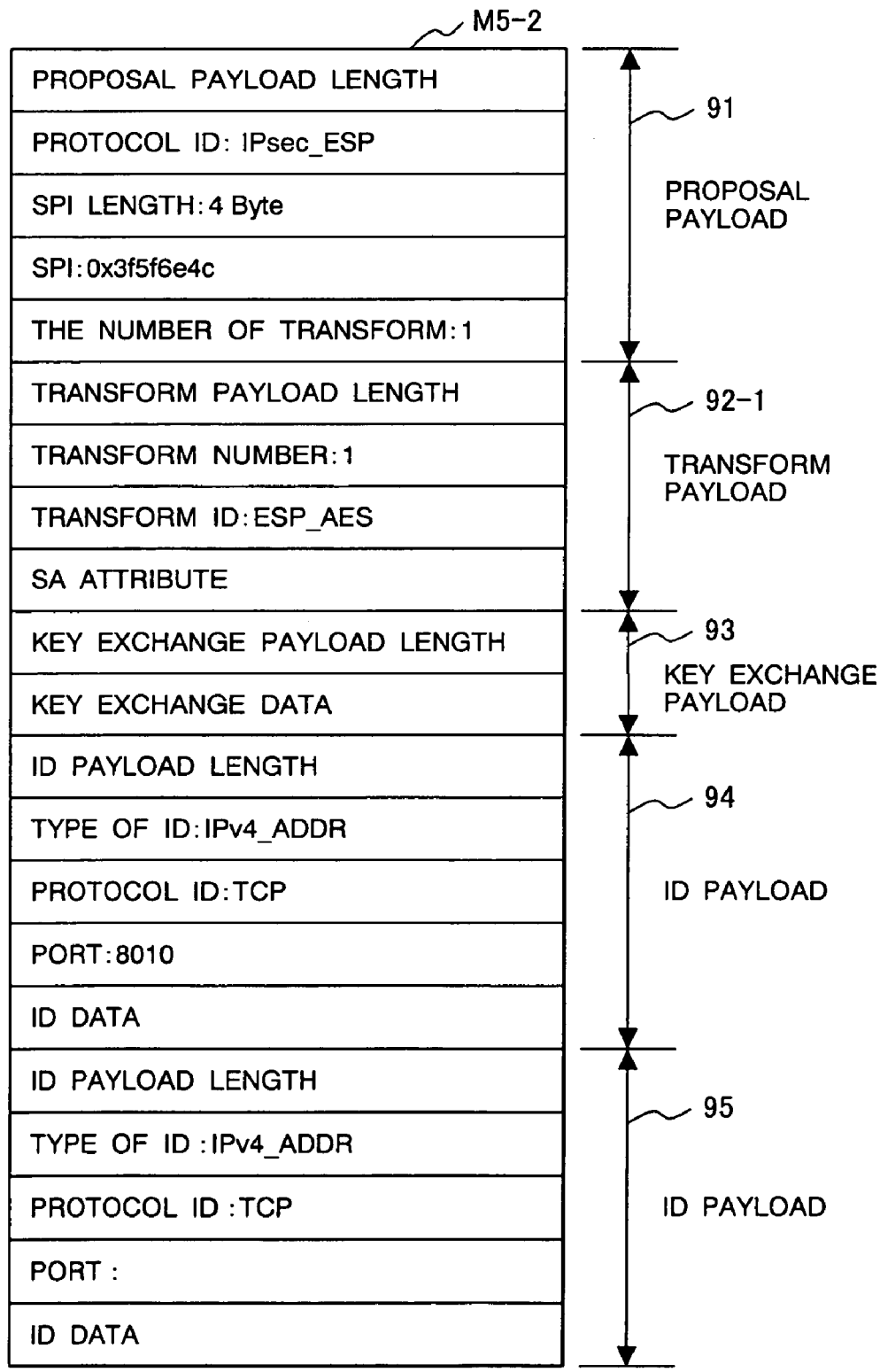
FIG. 24 shows an example of a format of a message body of the connection response [200 OK] message M10.

In response to the connection request message M9, the destination server SV1b returns a connection response [200 OK] message M10. As shown in FIG. 23, the connection response message M10 is comprised of a message header part M10-1 and a message body M10-2. The message header part M10-1 begins with the start line including "200 OK" indicating a response as the type of the message and includes a plurality of items of header information similar to those provided in the connection request message M9, following the start line. In the message body 10-2, for example, as shown in FIG. 24, one transform payload (ESP_AES in this example) remains as the one selected by the server SV1b out of the two transform payloads 92-1 and 92-2 proposed in the message body M5-2 of the connection request message M10.

Figure 25:
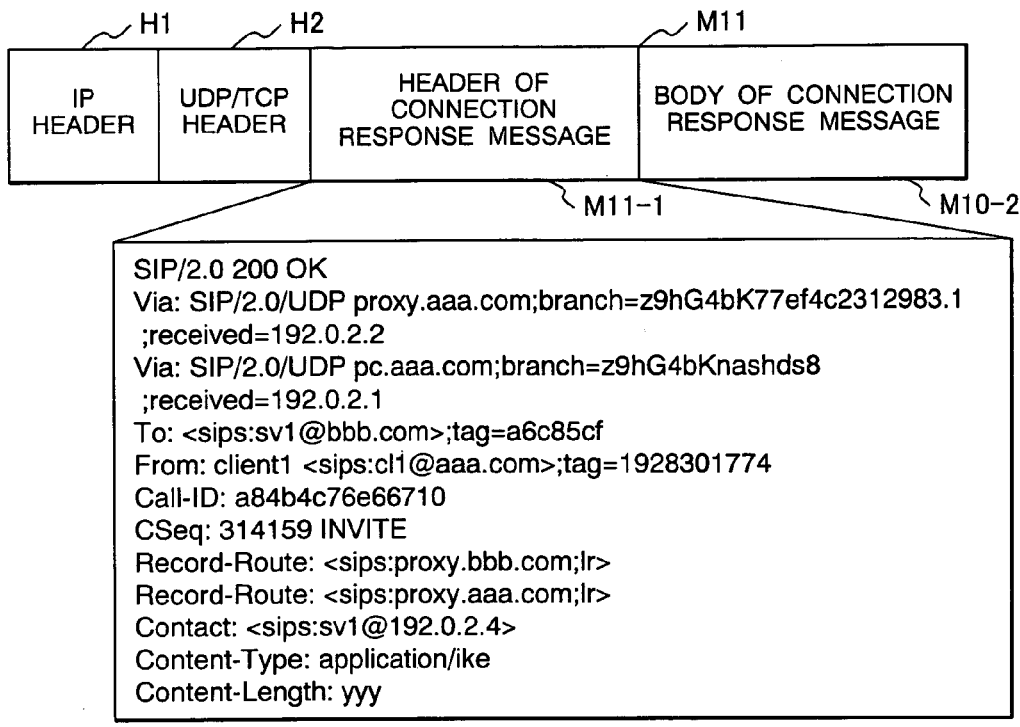
FIG. 25 shows an example of a format of a connection response [200 OK] message M11 shown in FIG. 12.
Figure 26:
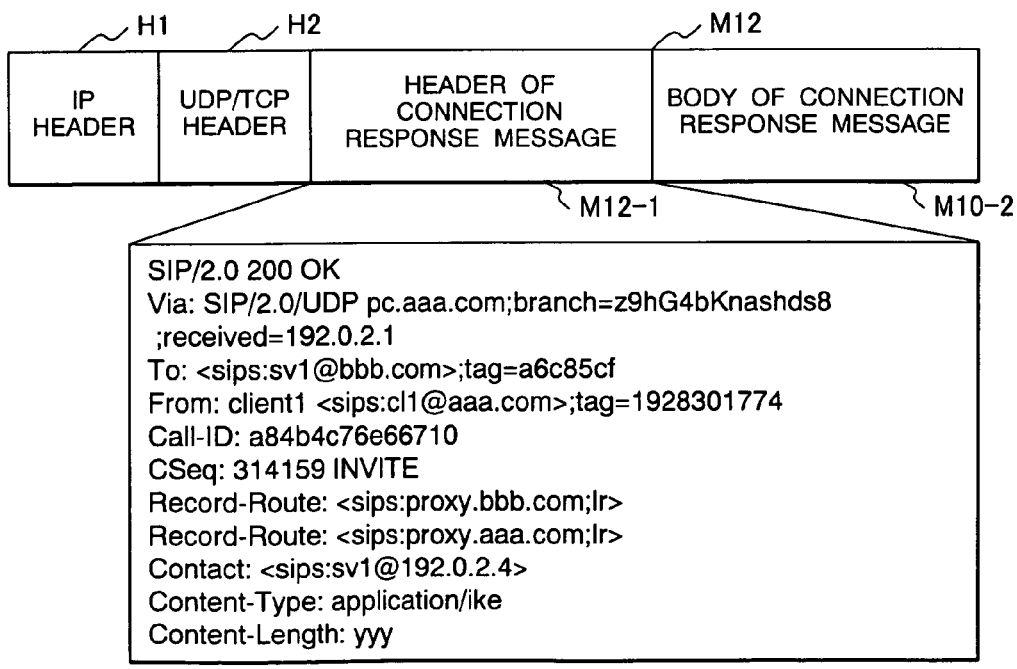
FIG. 26 shows an example of a format of a connection response [200 OK] message M12 shown in FIG. 12.

Upon receiving the connection response message M10, the SIP proxy PRb eliminates the Via header including its own URI from the header part of the received message to convert the received message M10 into a connection response [200 OK] message M11 which is shown in FIG. 25, and transmits the message M11 to the SIP proxy PRa. Upon receiving the connection response message M11, the SIP proxy PRa also eliminates the Via header including its own URI from the header part of the received message to convert the received message M1 into a connection response [200 OK] message M12 which is shown in FIG. 26, and transmits the message M12 to the requester client CL1a.

Figure 27:
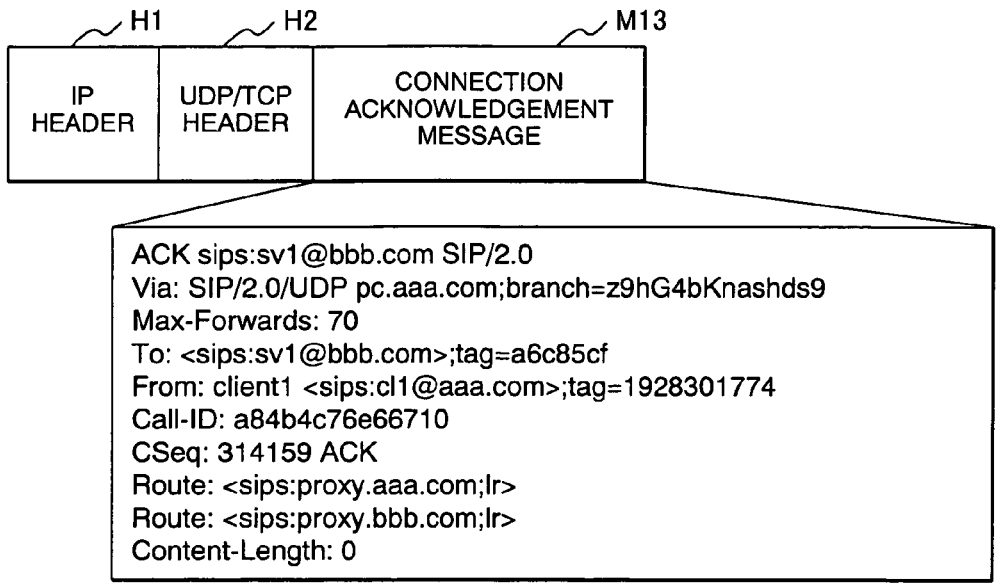
FIG. 27 shows an example of a format of a connection acknowledgment [ACK] message M13 shown in FIG. 12.

Upon receiving the connection response message M12, the requester client CL1a analyzes the body M10-2 of received message and determines SA information to be used for IPsec communication with the destination server SV1b. After registering this SA information into the SADB 33, the client CL1a transmits a connection acknowledgement [ACK] message M13 which is shown in FIG. 27 to the SIP proxy PRa. The connection acknowledgement message M13 begins with the start line including the message type "ACK" and the SIP-URI of the server SV1b as the Request-URI. The message M13 includes Via, To, From, Call-ID, CSeq, and Route headers as header information, and has no message body. In the Route header, the URI value extracted from the Record-Route header of the connection response message M12 is set.

Figure 28:
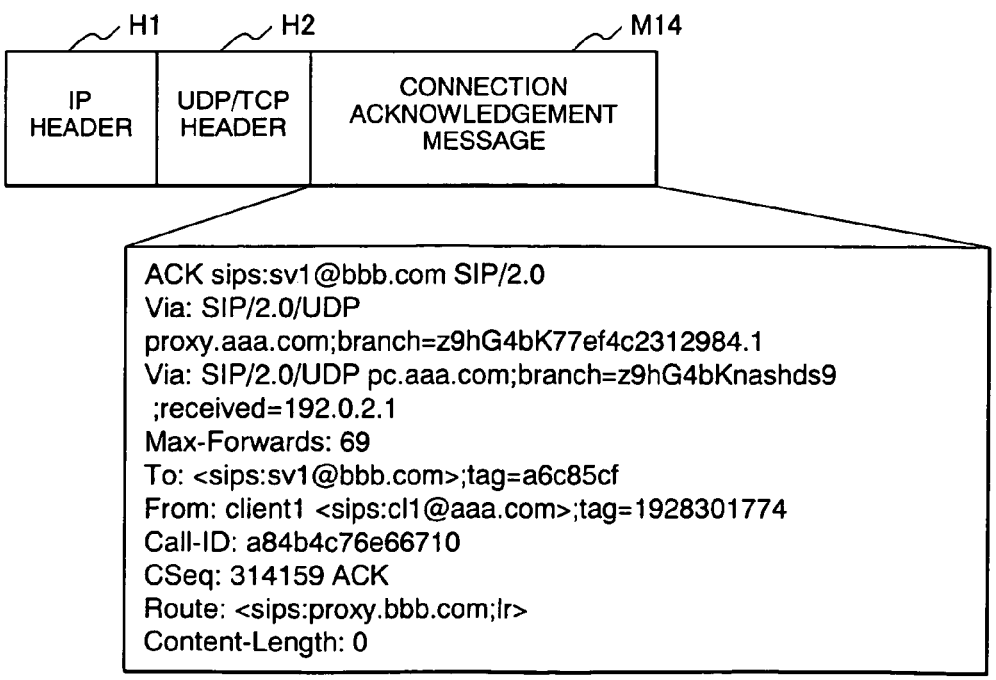
FIG. 28 shows an example of a format of a connection acknowledgment [ACK] message M14 shown in FIG. 12.
Figure 29:
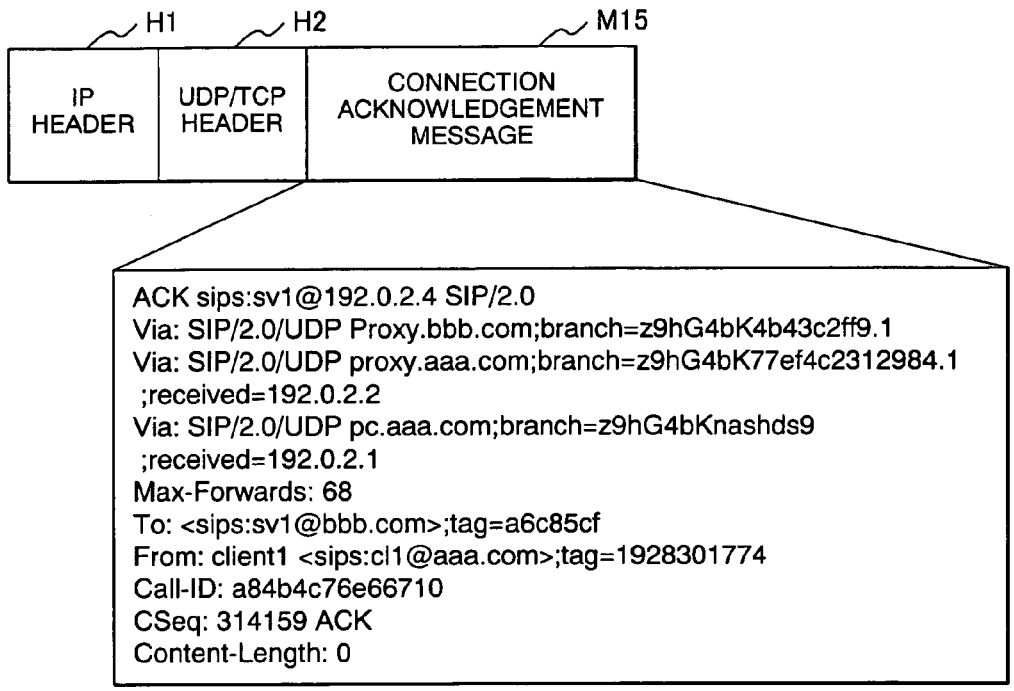
FIG. 29 shows an example of a format of a connection acknowledgment [ACK] message M15 shown in FIG. 12.

The SIP proxy PRa converts the connection acknowledgement message M13 into a connection acknowledgement [ACK] message M14 shown in FIG. 28 by adding a new Via header and eliminating the Route header corresponding to the SIP proxy PRa and forwards the message M14 to the SIP proxy PRb. The SIP proxy PRb converts the connection acknowledgement message M14 into a connection acknowledgement [ACK] message M15 shown in FIG. 29, by adding a new Via header and eliminating the Route header corresponding to the SIP proxy PRb, and forwards the message M15 to the destination server SV1b.

Once the server SV1b has received the connection acknowledgement message M15, the client CL1a and the server SV1b become able to perform application-to-application data communication (S20) to which IPsec encryption applies. That is, the client CL1a encrypts transmission data in accordance with SA information registered in the SADB 33C and transmits the encrypted data in IP packet form. The server SV1b decrypts the data received from the client CL1a in accordance with SA information registered in the SADB 33V. The server SV1b can encrypt transmission data for the client CL1a in accordance with the SA information and transmit the encrypted data in IP packet form.

Figure 31:
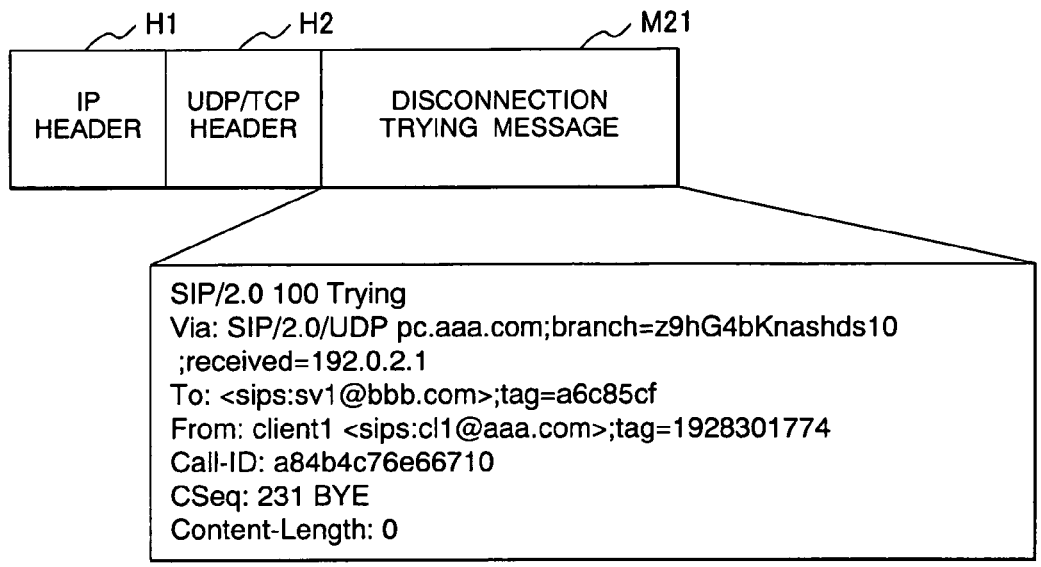
FIG. 31 shows an example of a format of a disconnection trying [100 Trying] message M21 shown in FIG. 12.

When terminating data communication with the server SV1b, the client CL1a transmits a disconnection request [BYE] message M20 which is shown in FIG. 31 to the SIP proxy PRa. The disconnection request message M20 begins with the start line including the message type "BYE" and the SIP-URI of the server SV1b. The message M20 includes Via, To, From, Call-ID, CSeq, and Route headers as header information similarly to the connection acknowledgement message M13, and has no message body.

Figure 32:
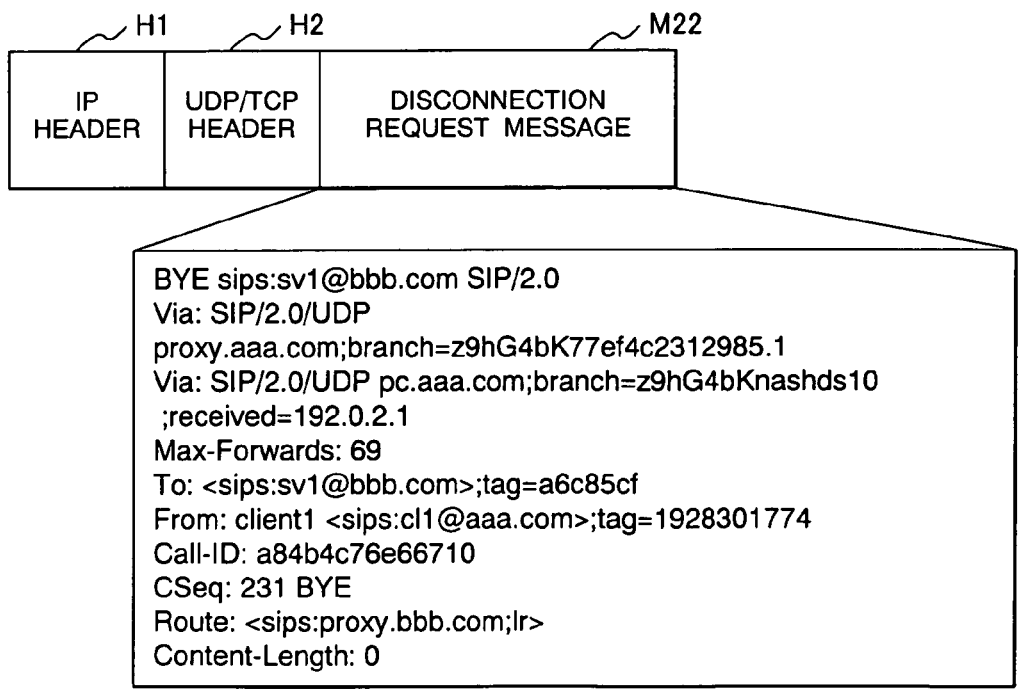
FIG. 32 shows an example of a format of a disconnection request [BYE] message M22 shown in FIG. 12.

Upon receiving the disconnection request message M20, the SIP proxy PRa transmits a disconnection trying [100 Trying] message M21 which is shown in FIG. 31 to the requester client CL1a. After that, the SIP proxy PRa converts the disconnection request message M20 into a disconnection request (BYE) message M22 shown in FIG. 32, by adding a new Via header and eliminating the Route header corresponding to the SIP proxy PRa, and transmits the message M22 to the SIP proxy PRb. The disconnection trying message M21 begins with the start line including, as the message type, "100 Trying" which indicates that the request is being processed. The message M21 has a header part including several items of header information such as Via, To, From, Call-ID, and CSeq extracted from the disconnection request message M20 and has no message body.

Figure 33:
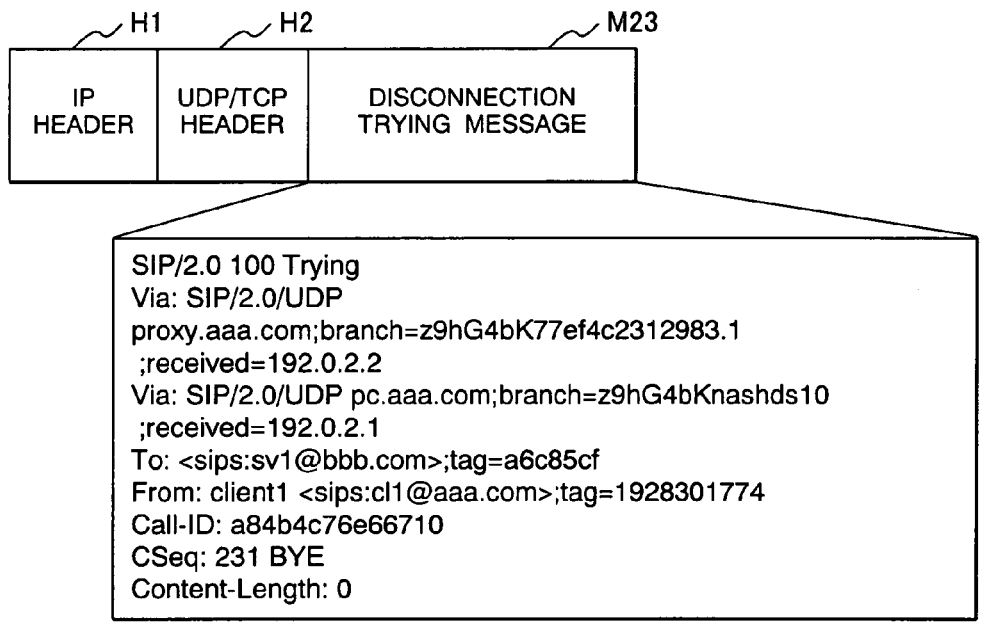
FIG. 33 shows an example of a format of a disconnection trying [100 Trying] message M23 shown in FIG. 12.
Figure 34:
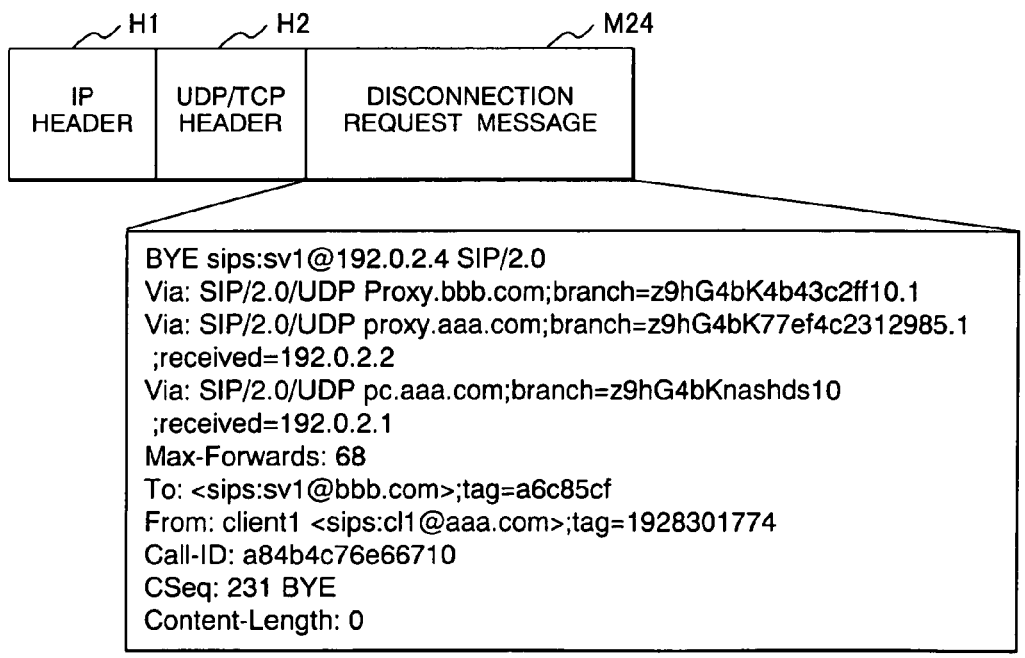
FIG. 34 shows an example of a format of a disconnection request [BYE] message M24 shown in FIG. 12.

Upon receiving the disconnection request message M22, the SIP proxy PRb transmits a disconnection trying [100 Trying] message M23 which is show in FIG. 33 to the SIP proxy PRa. After that, the SIP proxy PRb converts the disconnection request message M22 into a disconnection request [BYE] message M24 shown in FIG. 34, by adding a new header to the message M22 and eliminating the Route header corresponding to the SIP proxy PRb and transmits the message M24 to the server SV1b.

Figure 35:
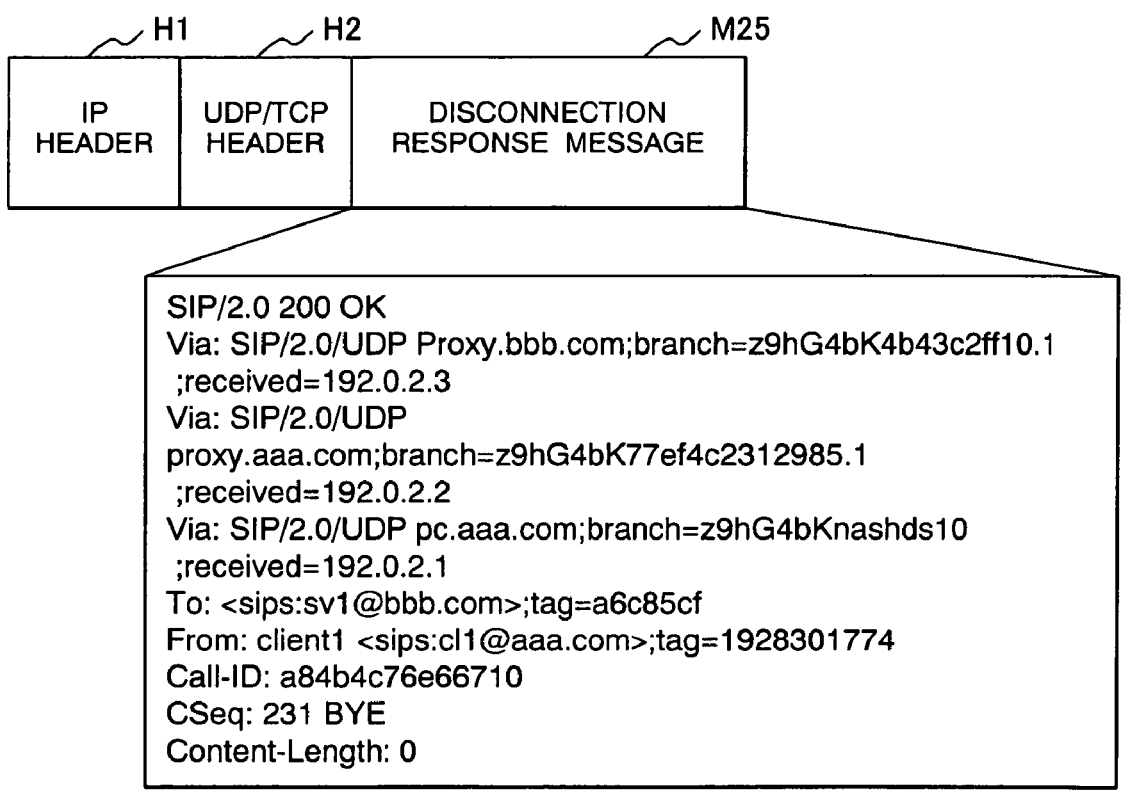
FIG. 35 shows an example of a format of a disconnection response [200 OK] message M25 shown in FIG. 12.

Upon receiving the disconnection request message M24, the server SV1b transmits a disconnection response [200 OK] message M25 which is shown in FIG. 35 to the SIP proxy PRb. The disconnection response message M25 begins with the start line including, as the message type, "200 OK" which indicates a response. The message M25 has a header part including several items of header information such as Via, To, From, Call-ID, and CSeq extracted from the disconnection request message M24 and has no message body.

Figure 36:
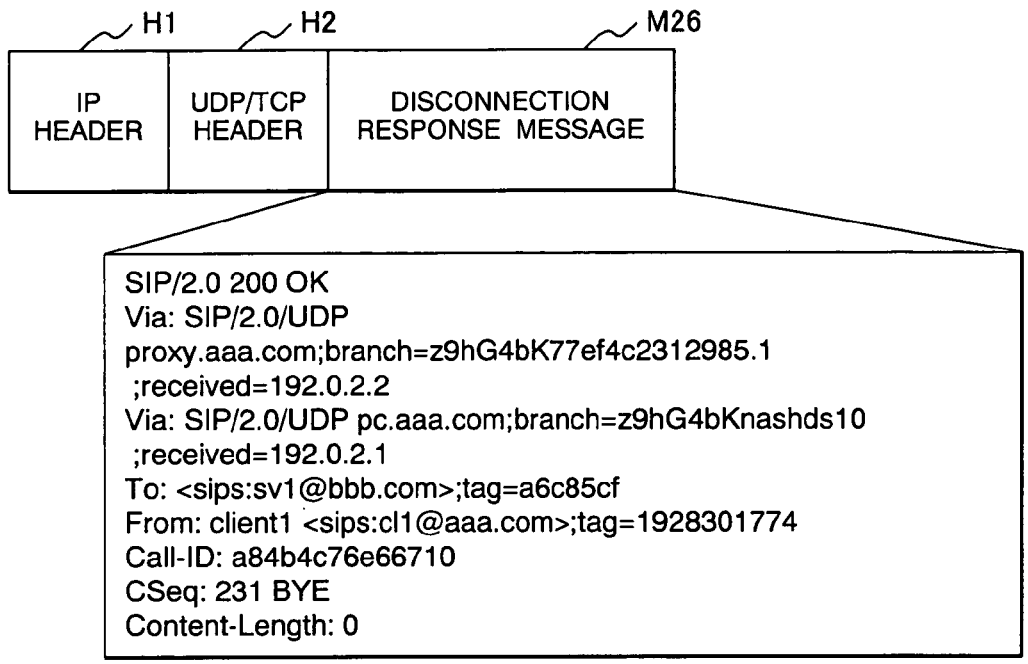
FIG. 36 shows an example of a format of a disconnection response [200 OK] message M26 shown in FIG. 12.
Figure 37:
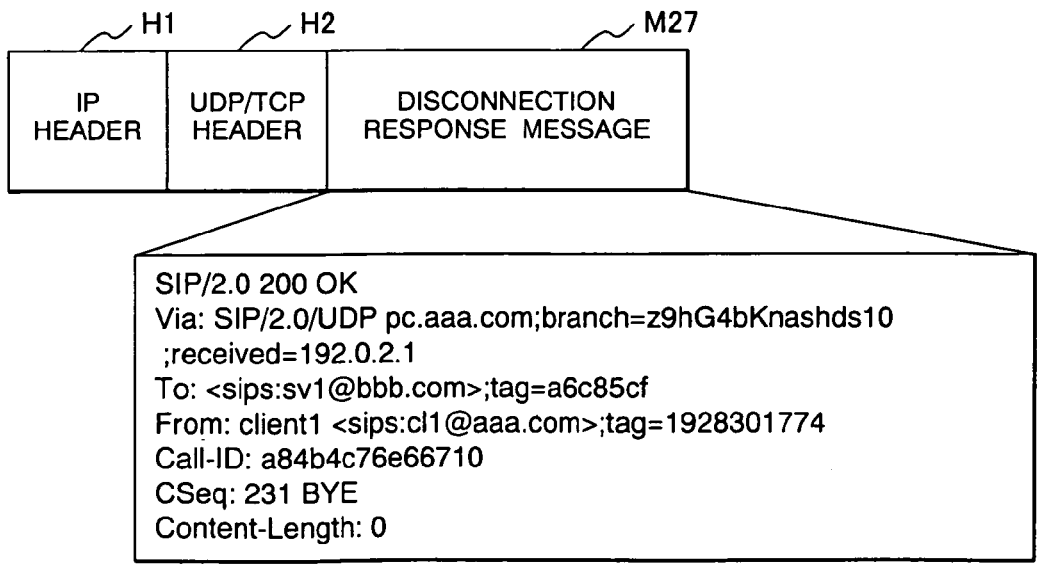
FIG. 37 shows an example of a format of a disconnection response [200 OK] message M27 shown in FIG. 12.

Upon receiving the disconnection response message M25, the SIP proxy PRb converts the message M25 into a disconnection response [200 OK] message M26 shown in FIG. 36, by eliminating the Via header including its own URI from the header part of the received message and transmits the message M26 to the SIP proxy PRa. Upon receiving the disconnection response message M26, the SIP proxy PRa converts the message M26 into a disconnection response [200 OK] message M27 shown in FIG. 37, by eliminating the Via header including its own URI from the header part of the received message and transmits the message M27 to the requester client CL1a. Upon receiving the disconnection response message M27, the requester client CL1a terminates IPsec encryption/decryption and waits for a new packet transmission request from the same or another application.

Next, by referring to FIGS. 38 through 48, a series of control operations on the client CL1a, SIP server SIPa (SIP proxy PRa, registrar RGa), and server SV1b to enable the above-described encrypted data communication of the first embodiment of the present invention will be described.

Figure 38:
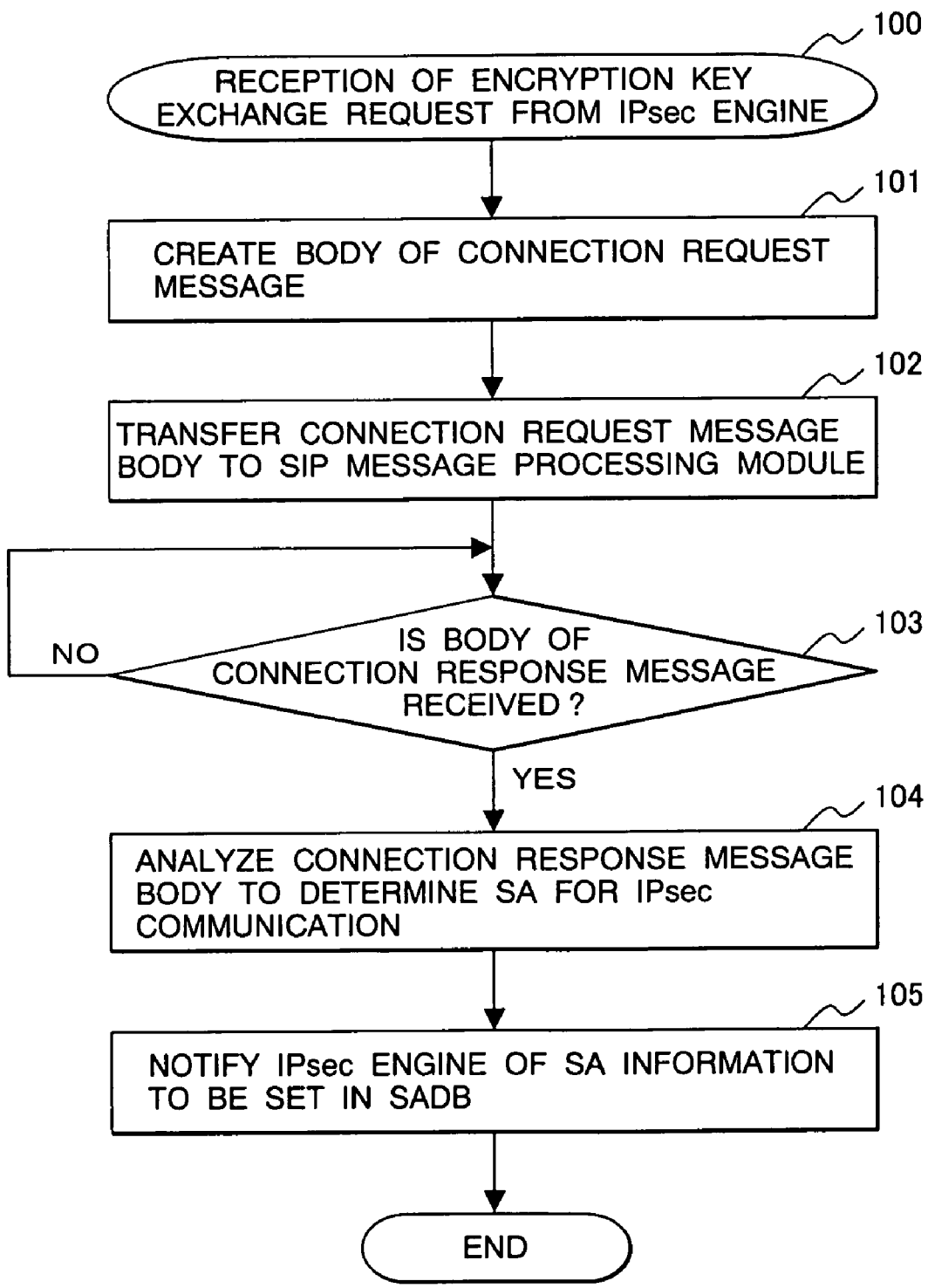
FIG. 38 is a flowchart illustrating control operation to be performed by an SP/SA control module 51C on a client CL1a, when receiving a key exchange request.

FIG. 38 shows a flowchart 100 of control operation to be performed by the SP/SA control module 51C on the client CL1a in response to a request to exchange encryption keys which is issued by the IPsec engine 31.

When the IPsec engine 31 on the client CL1a detects an IP packet transmission request from the application 40C, it determines whether IPsec encryption must apply to the IP packet, by referring to the Security Policy Data Base (SPDB) 32C. If having determined that IPsec encryption should be applied to the IP packet, the IPsec engine 31C searches the Security Association Data Base (SADB) 33C for Security Association (SA) information such as an encryption key to be used for the IP packet. Here, if SA information to be used for the IP packet has not been registered in the SADB, the IPsec engine 31C requests the key management process 50C to exchange encryption parameters (exchange keys) with the peer device.

In this embodiment, the request to exchange keys from the IPsec engine 31C is processed by the SP/SA control module 51C. Upon receiving the key exchange request, the SP/SA control module 51C creates the body M5-2 of a connection request message illustrated in FIG. 18, based on TCP/IP communication parameters specified in the key exchange request and available SA information managed by the SP/SA control module 51C (step 101), transfers the connection request message body M5-2 to the SIP message processing module 53C (102), and waits for the body of a connection response message from the SIP message processing module 53C (103).

Upon receiving the body M10-2 of a connection response message illustrated in FIG. 24 from the SIP message processing module 53C, the SP/SA control module 51C analyzes the received connection response message body, determines SA information to be used for the current IPsec communication (104), and notifies the IPsec engine 31c of the SA information to be set in the SADB 33C (105).

Figure 39A:
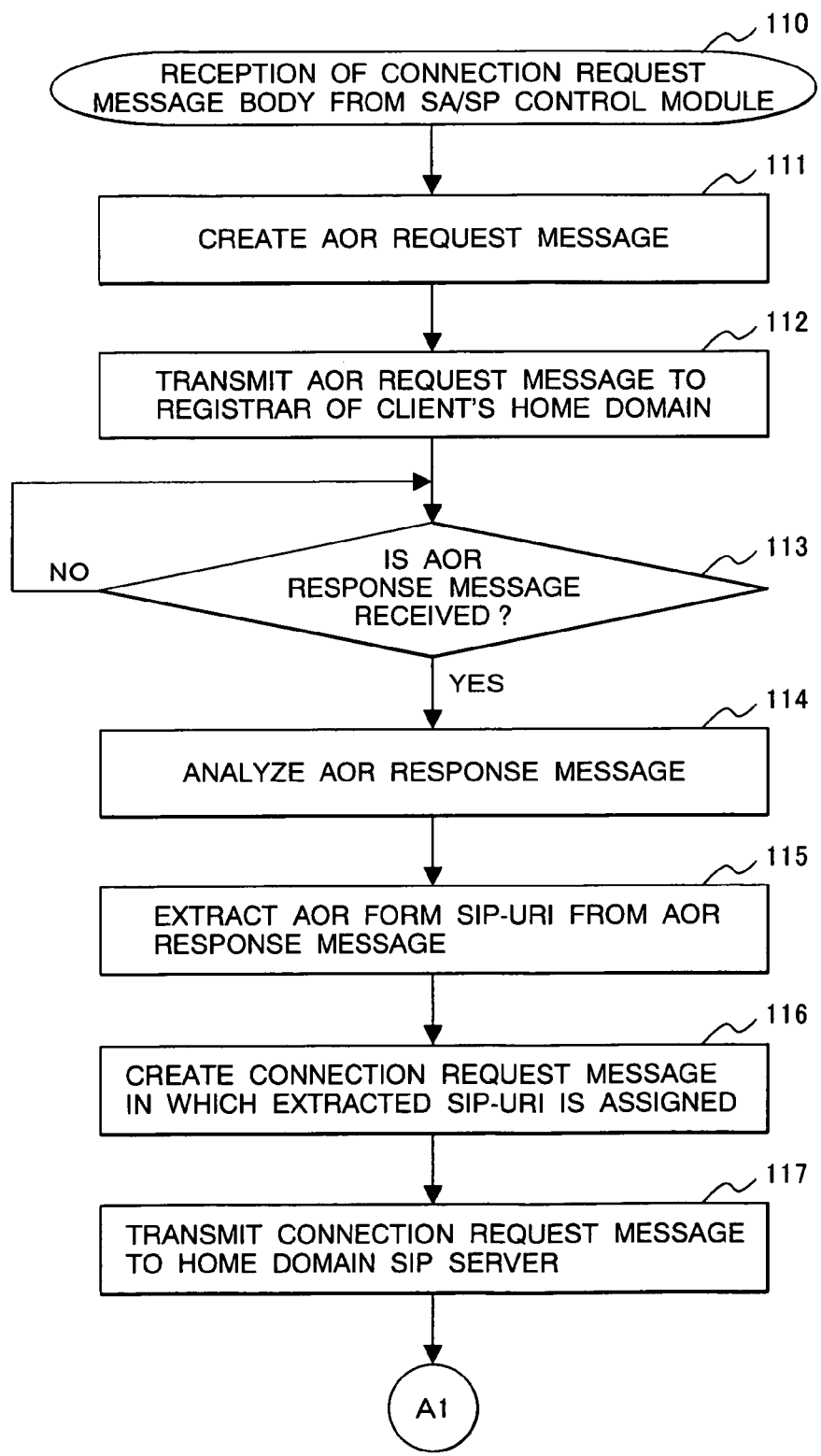
FIG. 39A is a part of a flowchart illustrating control operation to be performed by a SIP message processing module 53C on the client CL1a, when receiving the body of a connection request message.
Figure 39B:
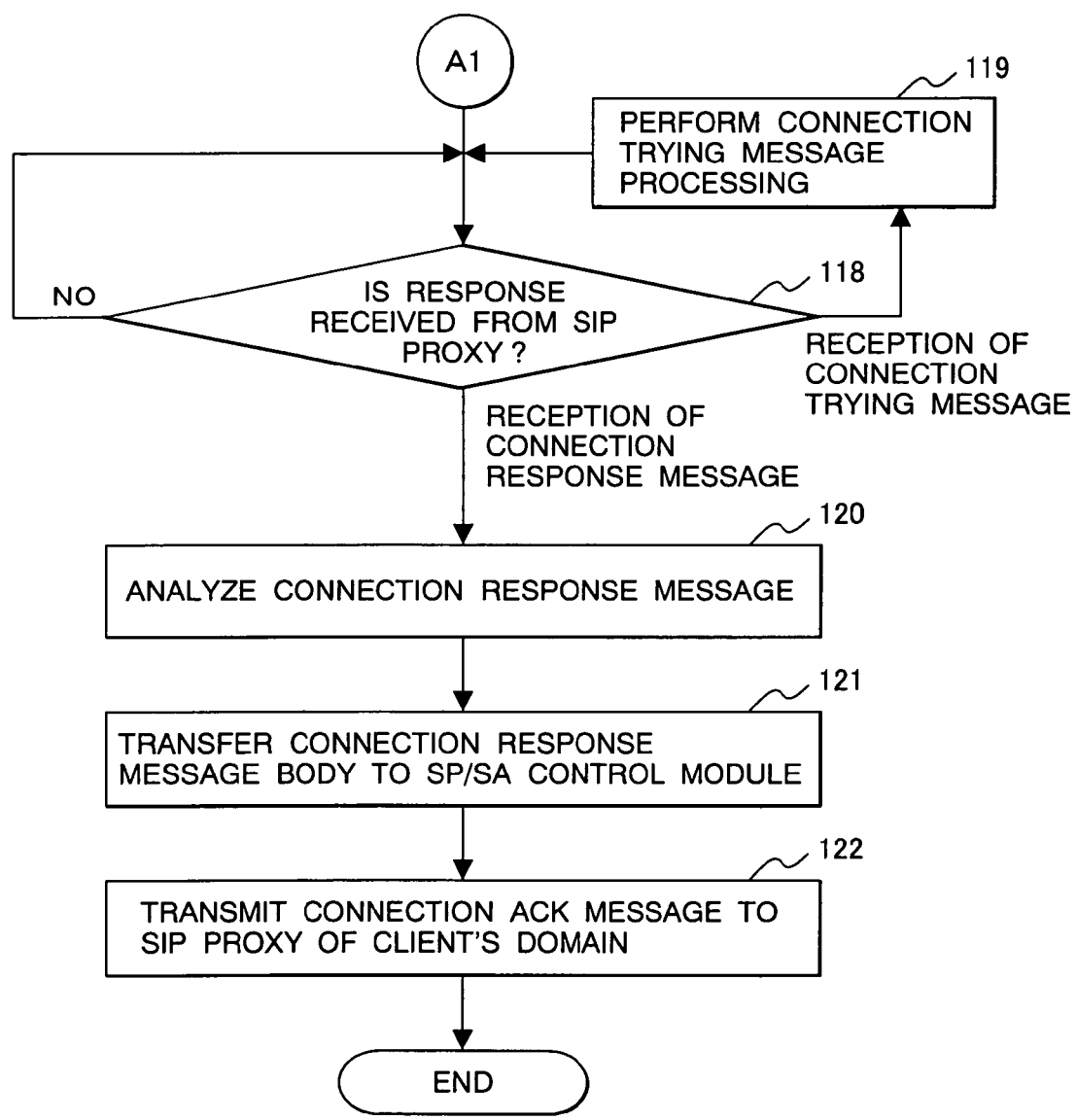
FIG. 39B is the remaining part of the flowchart illustrating the control operation to be performed by the SIP message processing module 53C on the client CL1a, when receiving the body of the connection request message.

FIGS. 39A and 39B show a flowchart 110 of control operation to be performed by the SIP message processing module 53C, when receiving the connection request message body from the SP/SA control module 51C.

Upon receiving the connection request message body from the SP/SA control module 51C, the SIP message processing module 53C creates an AOR request message M3 illustrated in FIG. 15 from the IP address of the destination server specified by ID data in the second ID payload and communication control parameters managed by the SIP message processing module 53C (step 111) and transmits the message addressing to the SIP server SIPa (registrar RGa) located in a domain to which the client CL1a belongs via the TSL module 52C, TCP/IP module 30C, and NIC module 20C (112). At this time, the TLS module 52C performs TLS negotiation (the sequence S5 in FIG. 11) with the registrar RGa and then transmits the TLS-encrypted AOR request message M3 to the registrar RGa via the TCP/IP module 30C and the NIC module 20C. In this case, the TCP/IP module 30C attaches an IP header H1 including the destination IP address of the SIP server SV1 and a UDP/TCP header H2 to the AOR request message M3 and the message is transmitted onto the network NW1 in the form of IP packet.

The SIP message processing module 53C waits for an AOR response message from the registrar RGa (113). Upon receiving the AOR response message, the SIP message processing module 53C analyzes the received message (114) and extracts a SIP-URI in AOR form assigned to the destination server from the AOR header (115). After that, the SIP message processing module 53C creates a connection request message M5 illustrated in FIG. 17 comprising of the header part M5-1, in which the above SIP-URI is assigned to the start line and the To header, and the message body M5-2 received from the SP/SA control module 51C (116).

The SIP message processing module 53C transmits the above connection request message addressing to the SIP proxy PRa of the SIP server SIPa via the TLS module 52C, TCP/IP module 30C, and NIC module 20C (117) and waits for a response from the SIP proxy PRa. When receiving a connection trying message M6 from the SIP proxy PRa, the SIP message processing module 53C performs processing of the connection trying message (119) and waits for the next response from the SIP proxy PRa.

Upon receiving a connection response message M12 from the SIP proxy PRa, the SIP message processing module 53C analyzes the received message (120) and transfers the connection response message body M12-2, illustrated in FIG. 24, extracted from the received message to the SP/SA control module 51C (121). After that, the SIP message processing module 53C creates a connection acknowledgement message M13 illustrated in FIG. 27 and transmits the message M13 addressing to the SIP proxy PRa via the TLS module 52C, TCP/IP module 30C, and NIC module 20C (122), and terminates this routine.

Figure 40:
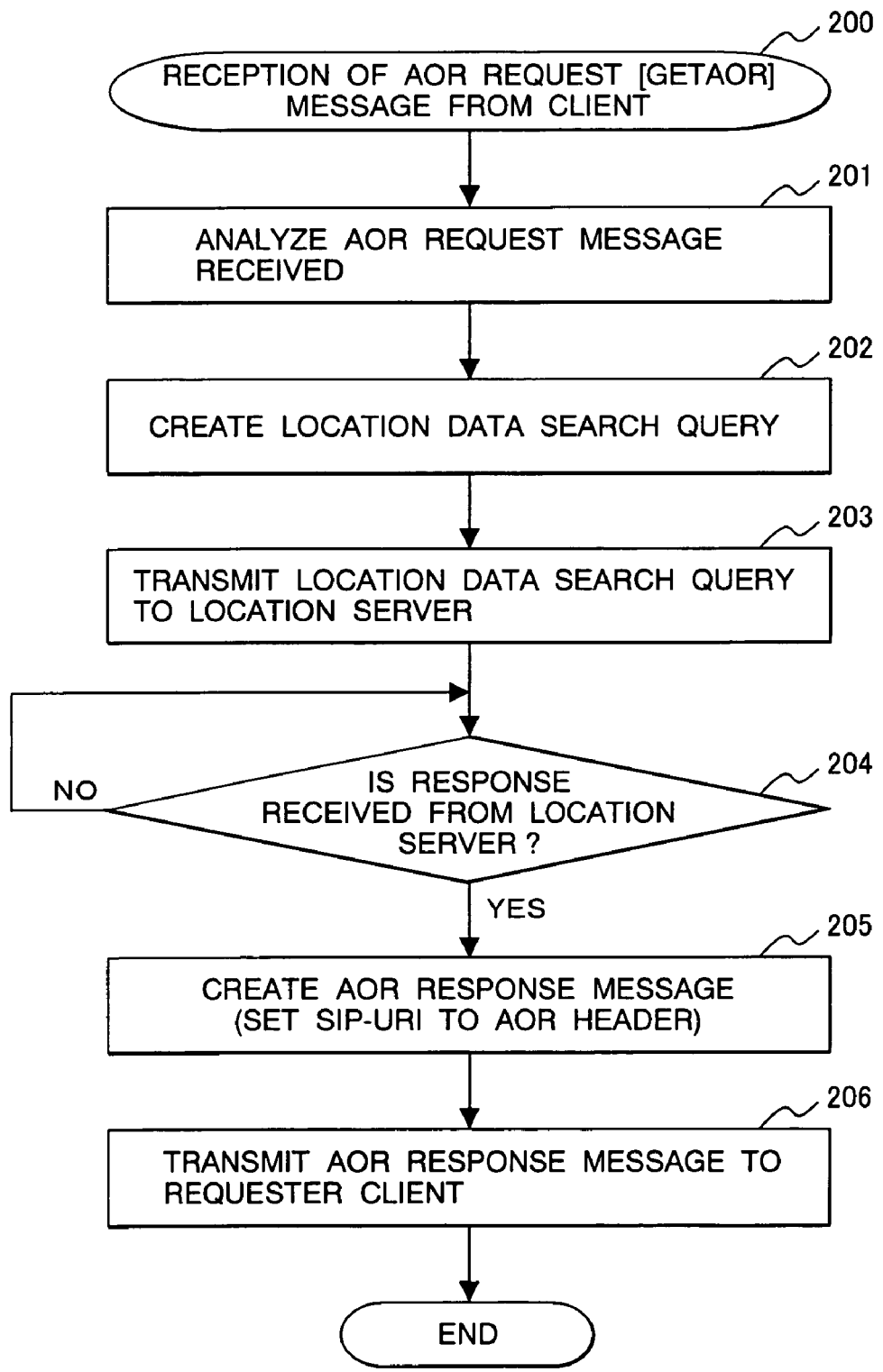
FIG. 40 is a flowchart illustrating control operation to be performed by a SIP message processing module 53R on a registrar RGa, when receiving an AOR request message.
Figure 41A:
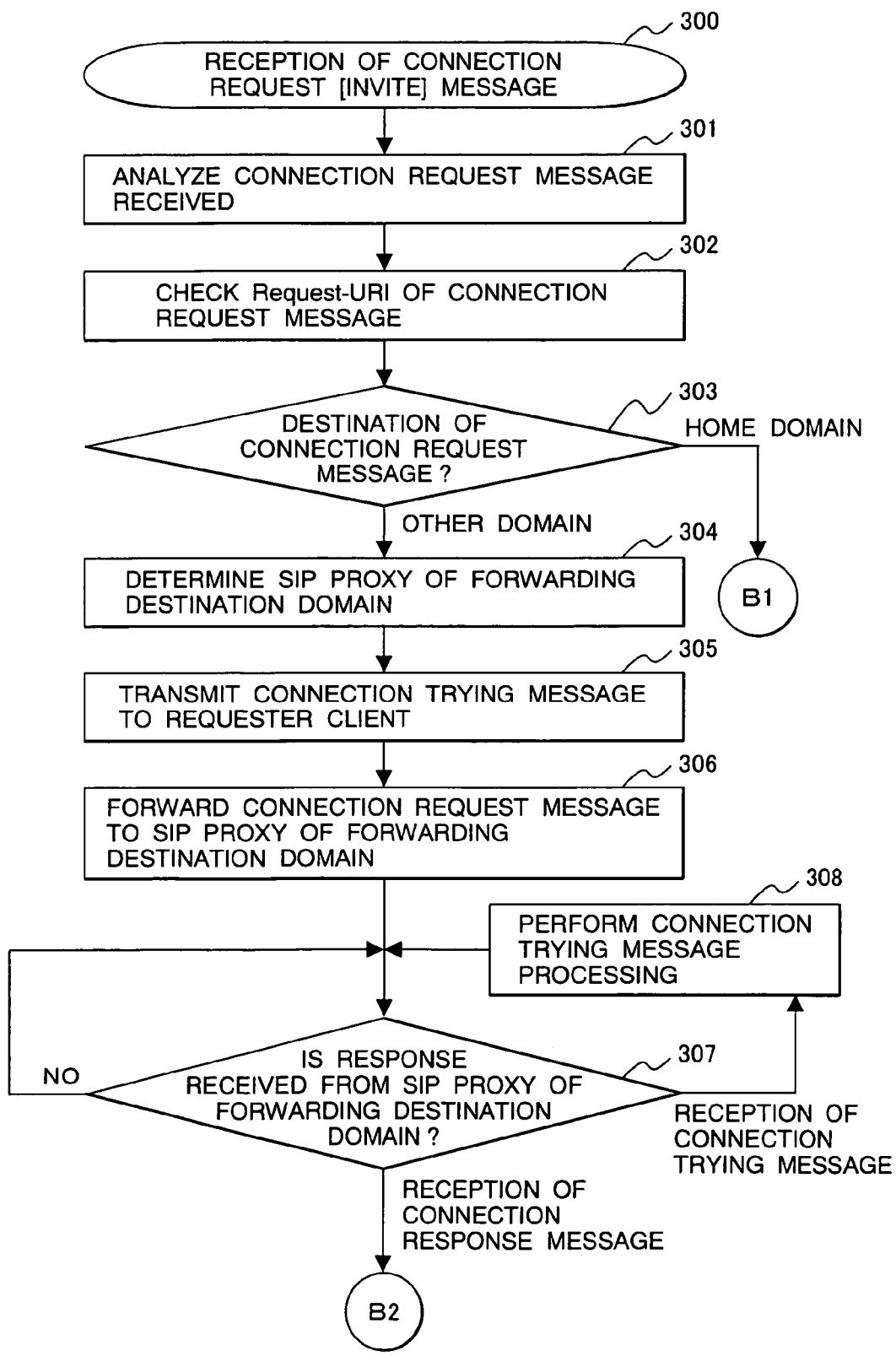
FIG. 41A is a first part of a flowchart illustrating control operation to be performed by a SIP message processing module 53P on the originating SIP proxy PRa, when receiving an connection request message.
Figure 41B:
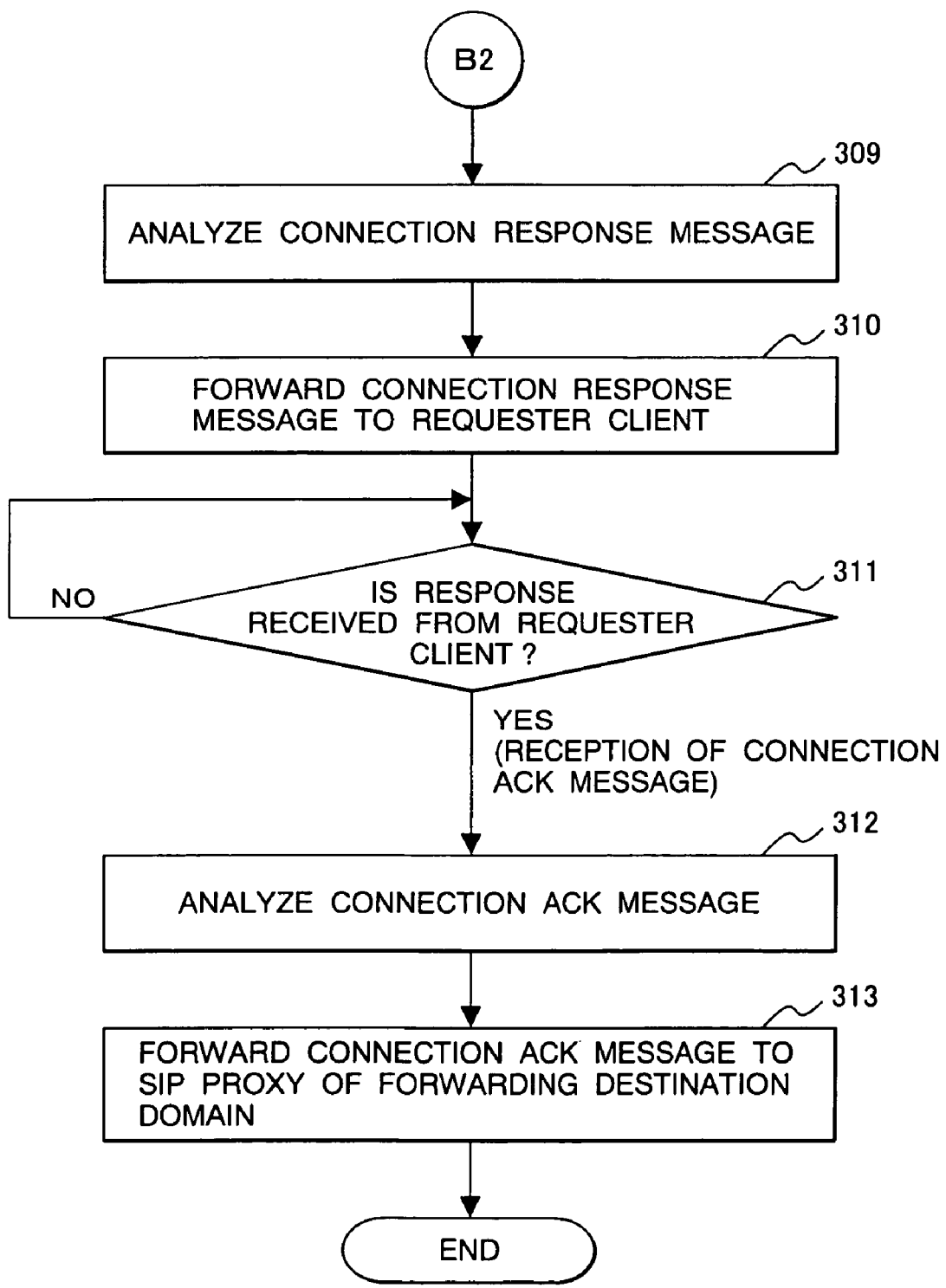
FIG. 41B is a second part of the flowchart illustrating control operation to be performed by the SIP message processing module 53P on the SIP proxy PRa, when receiving the connection request message.
Figure 41C:
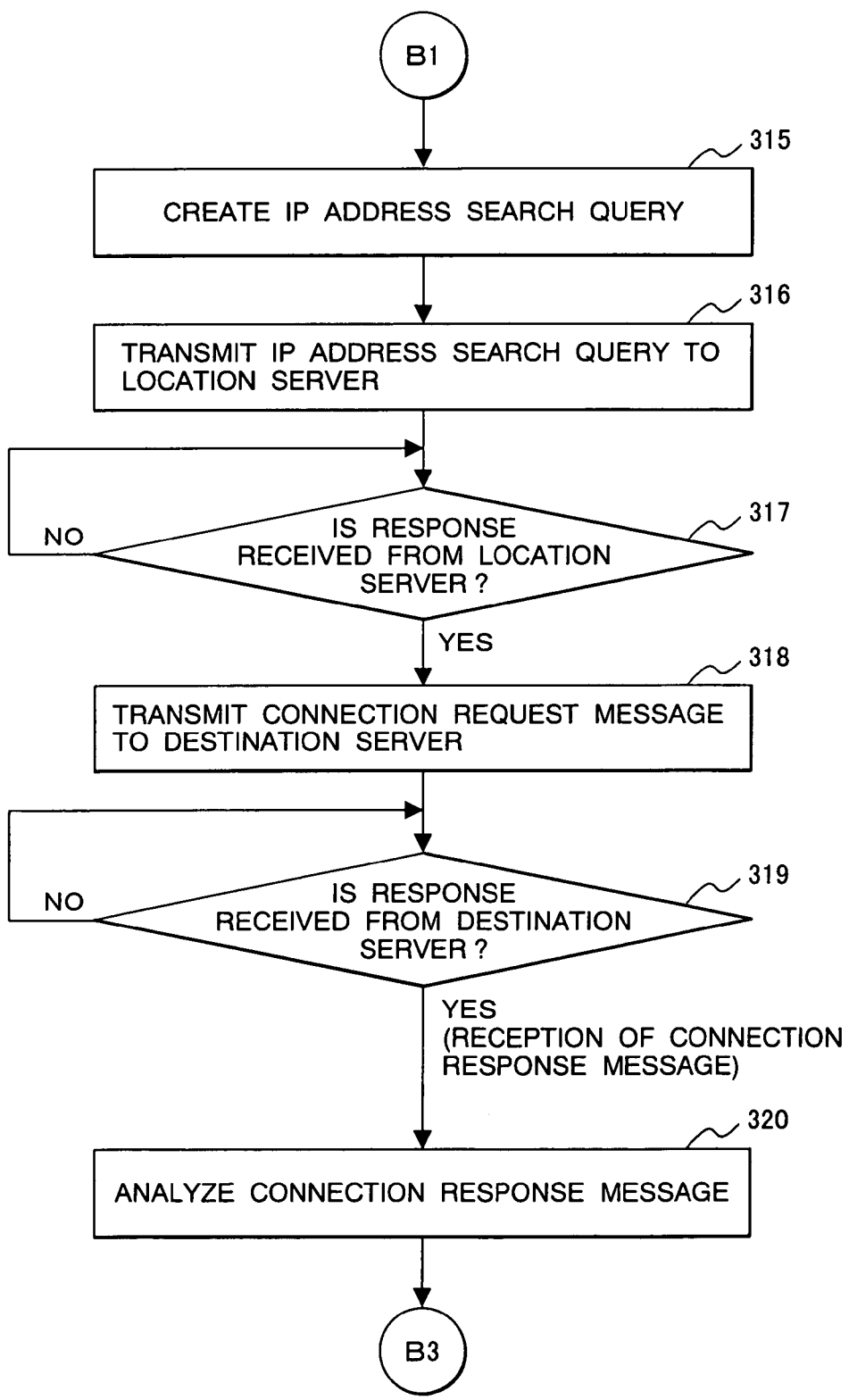
FIG. 41C is a third part of the flowchart illustrating control operation to be performed by the SIP message processing module 53P on the SIP proxy PRa, when receiving the connection request message.

FIG. 40 shows a flowchart 200 of control operation to be performed by the SIP message processing module 53R on the registrar RGa, when receiving an AOR request message M3.

The SIP message processing module 53R on the registrar RGa analyzes the received AOR request message M3 (step 201), creates a location data search query using the IP address of the destination server specified in the To header as a search key (202), transmits the search query to the location server LSV via the registrar processing module 60R (203), and waits for a response from the location server (204).

Upon receiving location data from the location server LSV via the registrar processing module 60R, the SIP message processing module 53R creates an AOR response message M4 illustrated in FIG. 16 including the AOR header specifying the SIP-URI given by the received data (205), transmits the message M4 to the source of the AOR request message M3 (client CL1a in this example) via the TCP/IP module 30R and NIC module 20R (206), and terminates this routine.

FIGS. 41A through 41D show a flowchart 300 of control operation to be performed by the SIP message processing module 53P on the SIP proxy PRa, when receiving a connection request message M5 from the client CL1a.

Upon receiving a connection request message M5 from the client CL1a, the SIP message processing module 53P on the SIP proxy PRa analyzes the received message (step 301), checks the Request-URI specified in the start line of the received message (302), and determines the forwarding destination of the received message from the domain name given by the Request-URI (303).

If having determined that the forwarding destination of the received message belongs to a domain other than the home domain of the SIP proxy PRa, the SIP message processing module 53P determines a SIP server (SIP proxy) in the domain, to which the received message should be forwarded, by DNS search (NAPTR search+SRV search+A search) or the like (304). In the example shown in FIG. 11, the SIP proxy PRb is found as the forwarding destination of the connection request message M5 by the DNS search. In this case, the SIP message processing module 53P transmits a connection trying message M6 illustrated in FIG. 19 to the client CL1a that is the source of the connection request message M5 via the TLS module 52P, TCP/IP module 30P, and NIC module 20P (305). Then, the SIP message processing module 53P forwards to the SIP proxy PRb a connection request message M7 which is composed by adding a new Via header to the connection request message M5 (306) and waits for a response from the SIP proxy PRb (307).

Upon receiving a connection trying message M8 from the SIP proxy PRb, the SIP message processing module 53P performs processing of the connection trying message (308) and waits for the next response from the SIP proxy PRb. Upon receiving a connection response message M11 from the SIP proxy PRb, the SIP message processing module 53P analyzes the received message (309), converts the message M11 into a connection response message M12 by eliminating the Via header including its own SIP-URI from the received message M11, and forwards the message M12 to the connection requester client CL1a (310). Then, the SIP message processing module 53P waits for a response from the connection requester client CL1a (311). Upon receiving a connection acknowledgement message M13, the SIP message processing module 53P analyzes the received message (312), converts the message M13 into a connection acknowledgement message M14 by adding a new Via header including its own SIP-URI to the received message M13, forwards the message M14 to the SIP proxy PRb (313), and terminates this routine.

If, it is determined, by the decision step 303, that the forwarding destination of the connection request message received from the client terminal CL1a belongs to the same domain as for the SIP proxy PRa, for example, like a server SV1a (or SV2a), the SIP message processing module 53P creates a location data (IP address) search query using the SIP-URI given by the Request-URI in the received message as a search key (315), transmits the location data search query to the location server LSV (316), and waits for a location service response (317).

Upon receiving location data from the location server LSV, the SIP message processing module 53P transmits onto the network NW1 a connection request message in the form of IP packet by applying the IP address of the destination server given by the location data to the destination IP address (318) and waits for a response from the destination server (319). To the connection request message, a new Via header including the SIP-URI of the SIP proxy PRa is added.

Upon receiving a connection response message from the destination server, the SIP message processing module 53P analyzes the received message (320), forwards a connection request message, from which the Via header corresponding to its own node was eliminated, to the connection requester (client CL1a) (321), and waits for a response from the connection requester (322). Upon receiving a connection acknowledgement message from the connection requester, the SIP message processing module 53P analyzes the received message (323), forwards a connection acknowledgement message, to which a new Via header was added, to the destination server (324), and terminates this routine.

Figure 42:
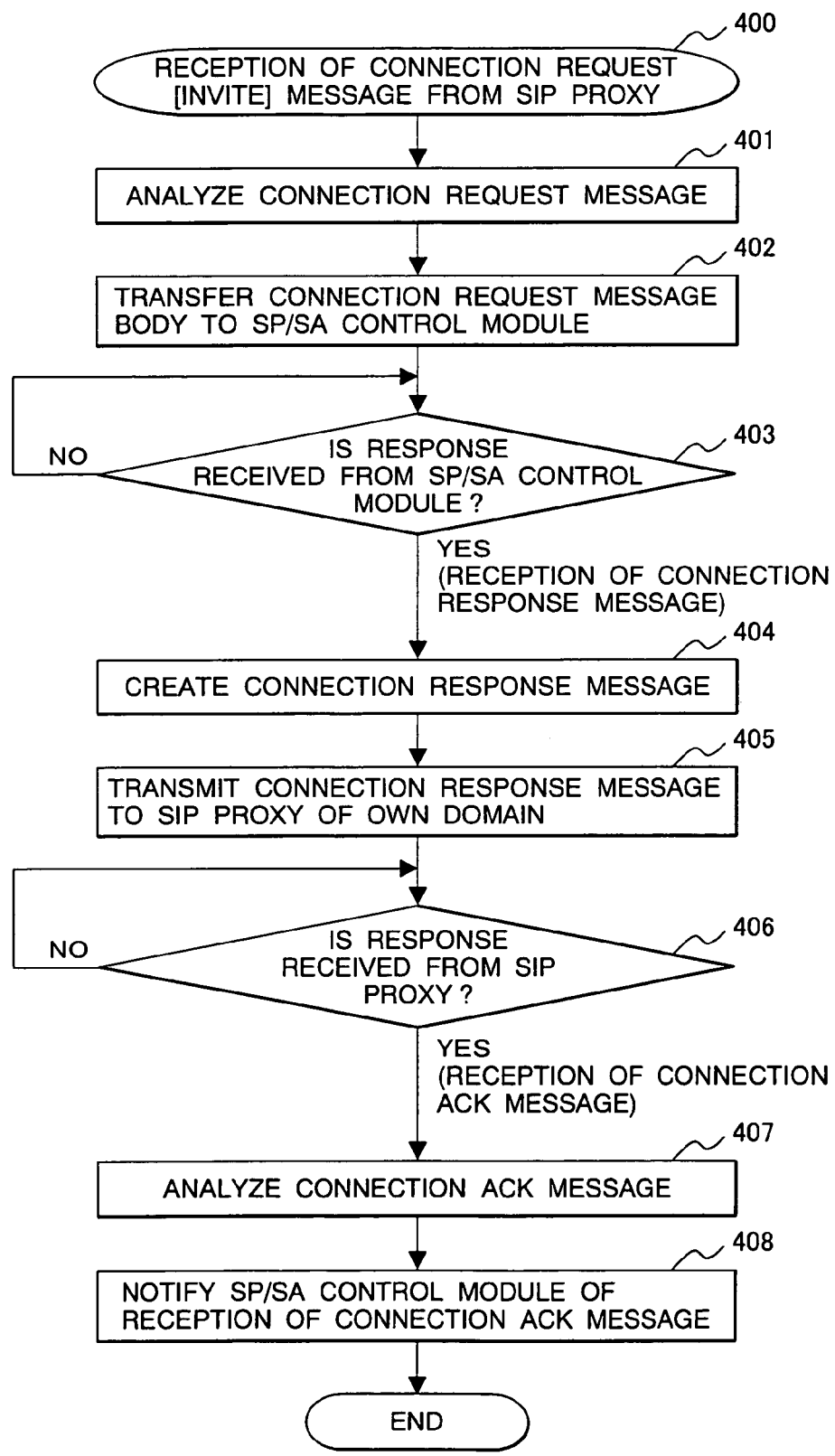
FIG. 42 is a flowchart illustrating control operation to be performed by a SIP message processing module 53S on a server SV1b, when receiving a connection request message.

FIG. 42 shows a flowchart 400 of control operation to be performed by the SIP message processing module 53S on the destination server SV1b, when receiving a connection request message M9 from the SIP proxy PRb.

The connection request message M9 transmitted from the SIP proxy PRb to the destination server SV1b is decrypted by the TLS module 52S and input to the SIP message processing module 53S. Upon receiving the connection request message. M9, the SIP message processing module 53S analyzes the received message (step 401), transfers the connection request message body M5-2 extracted from the received message to the SP/SA control module 51S (402), and waits for a response from the SP/SA control module 51S (403).

Upon receiving a connection response message body M10-2 from the SP/SA control module 51S, the SIP message processing module 53S creates a connection response message M11 illustrated in FIG. 25 (404). The SIP message processing module 53S forwards the connection response message M11 to the SIP proxy PRb via the TLS module, TCP/IP module, and NIC module (405) and waits for a response from the SIP proxy PRb (406). Upon receiving a connection acknowledgment message M15 from the SIP proxy PRb, the SIP message processing module 53S analyzes the received message (407), notifies the SP/SA control module 51S of receiving of the connection acknowledgment message M15 (408), and terminates this routine.

Figure 43:
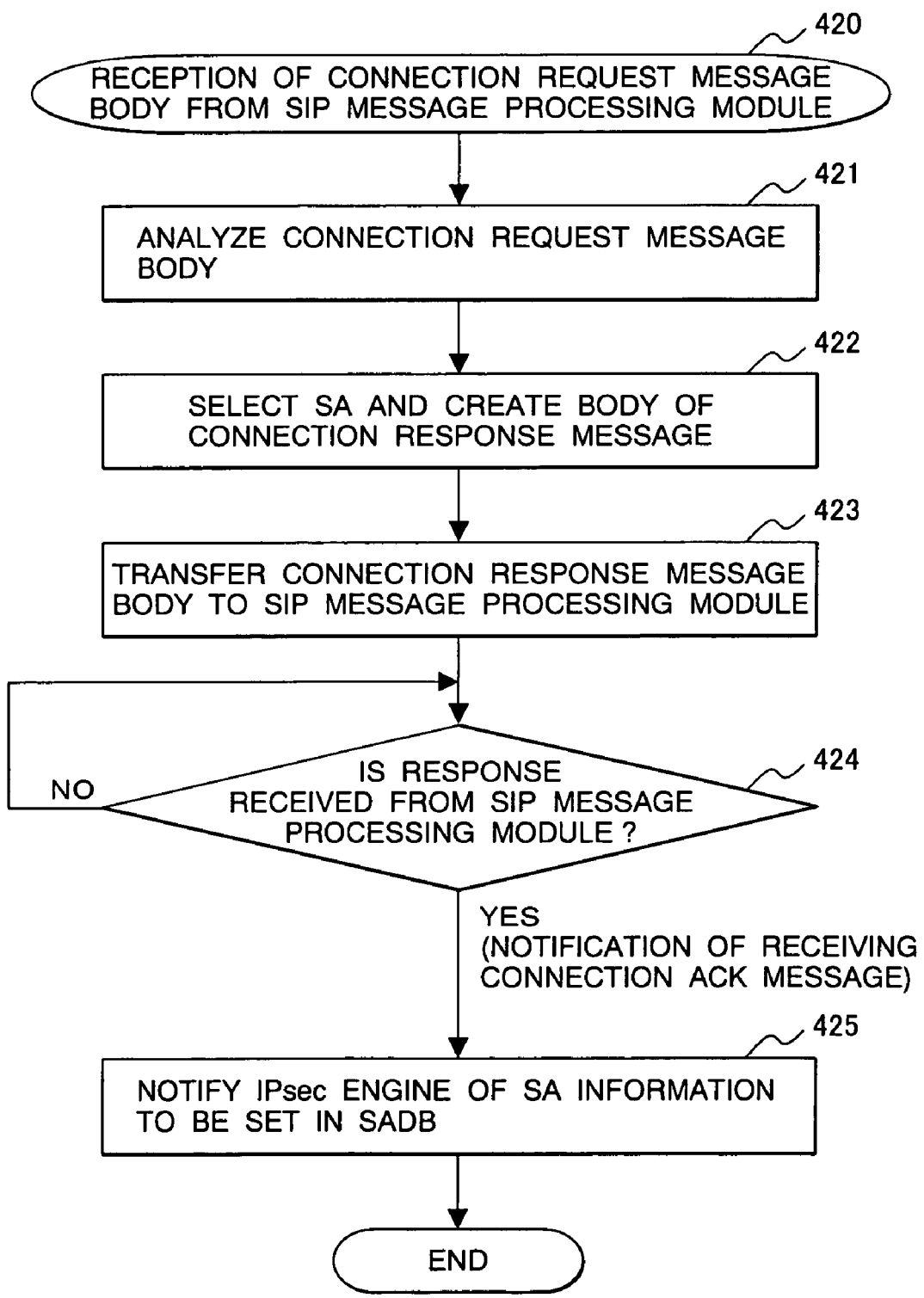
FIG. 43 is a flowchart illustrating control operation to be performed by the SP/SA control module 51S on the server SV1b, when receiving the connection request message body.

FIG. 43 shows a flowchart 500 of control operation to be performed by the SP/SA control module 51S on the server SV1b, when receiving the connection request message body M5-2 from the SIP message processing module 53S.

The SP/SA control module 51S analyzes the connection request message body M5-2 received from the SIP message processing module 53S (step 421), selects SA to be used for encrypted communication with the client out of SA information specified in the connection request message body M5-2 (transform payloads 92-1, 92-2 in the example of FIG. 8), and creates the body M10-2 of the connection response message illustrated in FIG. 24 (422). The SP/SA control module 51S transfers the connection response message body M10-2 to the SIP message processing module 53S (423) and waits for a response from the SIP message processing module 53S (424). Upon receiving the notification of receiving of the connection acknowledgement message from the SIP message processing module 53S, the SP/SA control module 51S notifies the IPsec engine 31S of SA information to be set in the SADB 33S (425), and terminates this routine.

Figure 44:
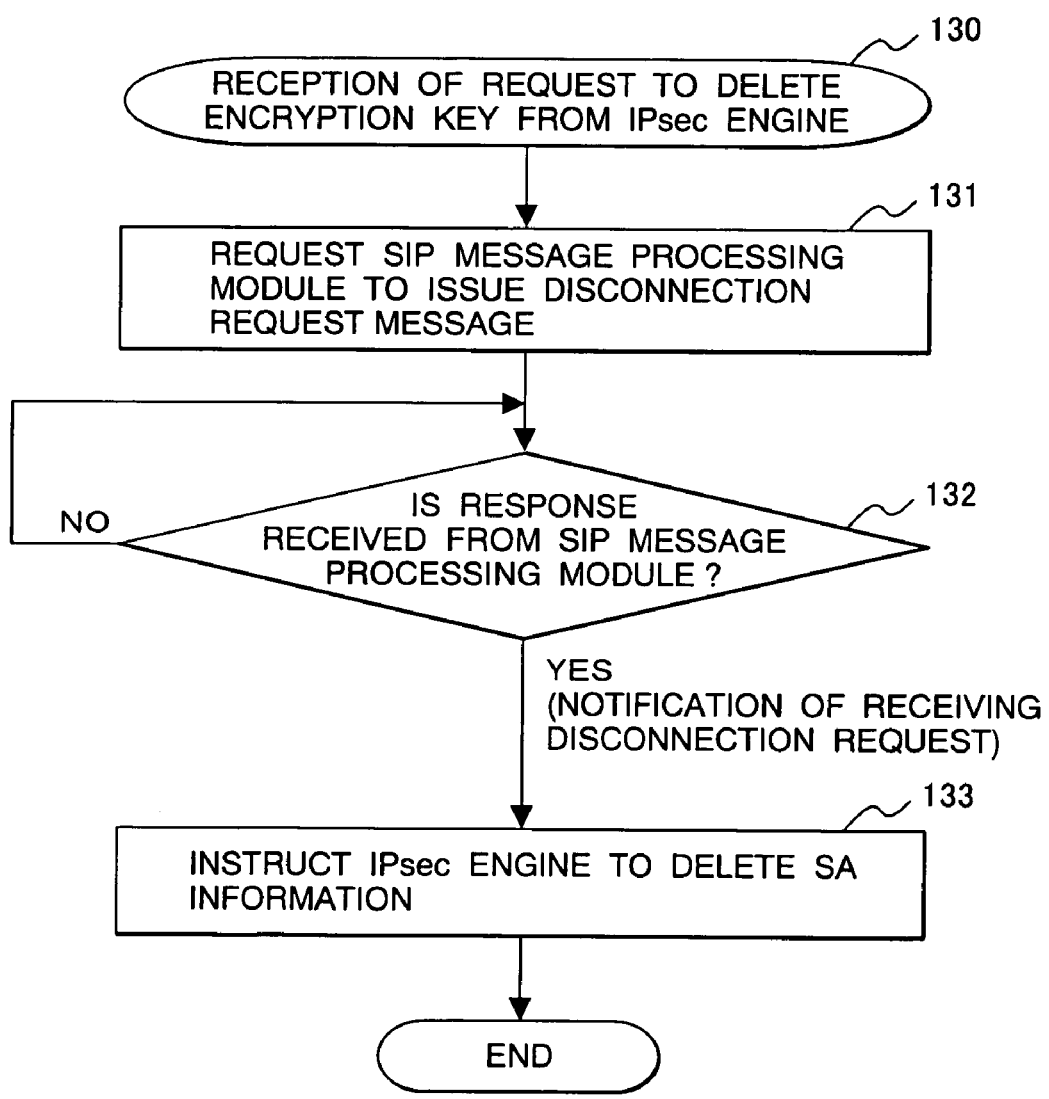
FIG. 44 is a flowchart illustrating control operation to be performed by the SP/SA control module 51C on the client CL1a, when receiving a request to delete key information.

FIG. 44 shows a flowchart 130 of control operation to be performed by the SP/SA control module 51C on the client CL1a in response to a request to delete encryption key issued by the IPsec engine 31C.

When the user of the client CL1a terminates the application for communicating with the server SV1b, a request to delete the encryption key is issued from the IPsec engine 31C to the SP/SA control module 51C. Upon receiving the request to delete encryption key from the IPsec engine 31C, the SP/SA control module 51C requests the SIP message processing module 53C to issue a disconnection request message (131) and waits for a response from the SIP message processing module 53C (132). Upon receiving notification of receiving of a disconnection response message from the SIP message processing module 53C, the SP/SA control module 51C instructs the IPsec engine 31C to delete from the SADB the SA information corresponding to the encryption keys requested to be deleted, and terminates this routine.

Figure 45:
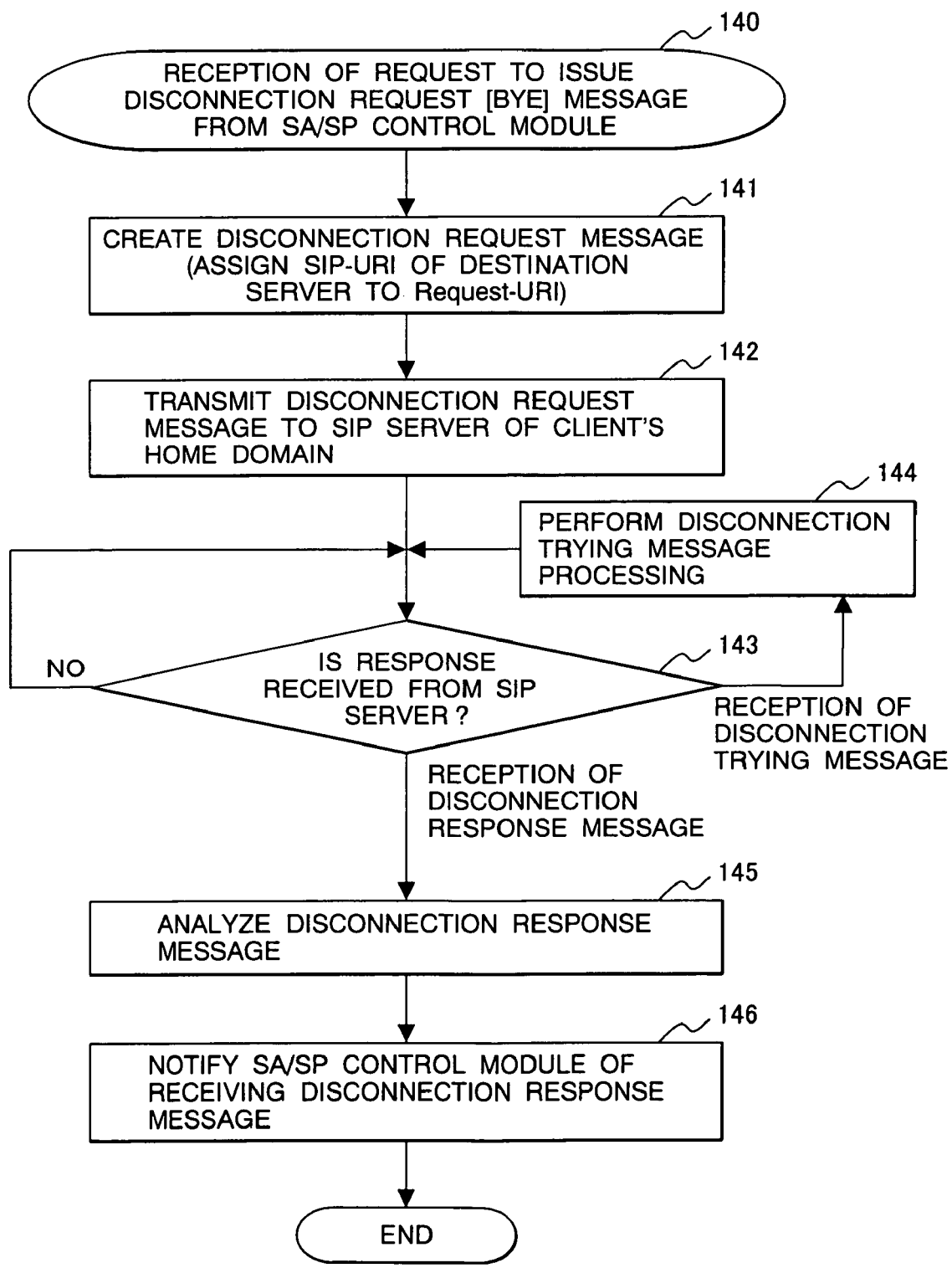
FIG. 45 is a flowchart illustrating control operation to be performed by the SIP message processing module 53C on the client CL1a, when receiving a request to issue a disconnection request message.

FIG. 45 shows a flowchart 140 of control operation to be performed by the SIP message processing module 53C, when receiving the request to issue a disconnection request message from the SP/SA control module 51C.

Figure 30:
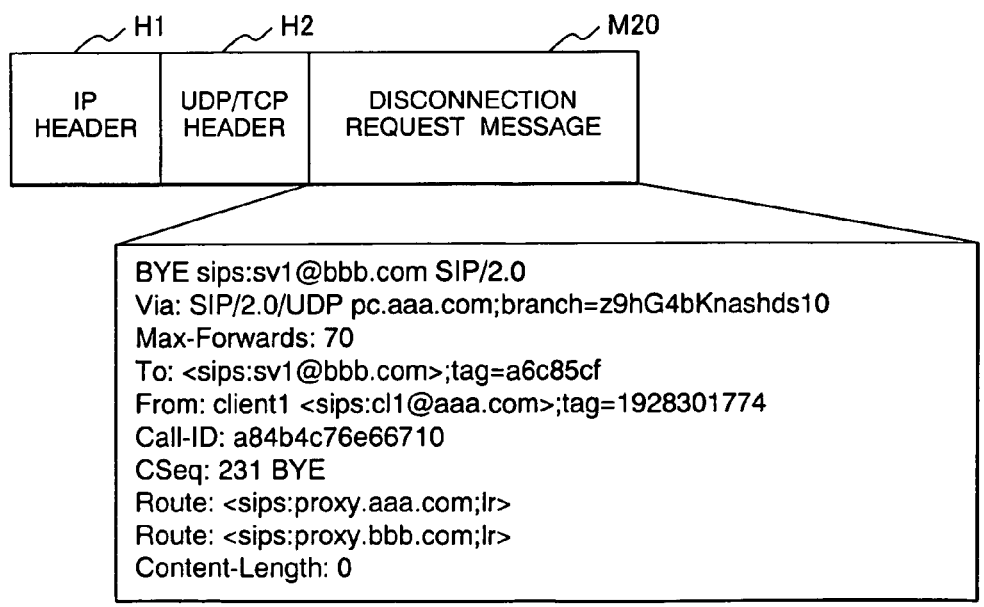
FIG. 30 shows an example of a format of a disconnection request [BYE] message M20 shown in FIG. 12.

Upon receiving the request to issue a disconnection request message from the SP/SA control module 51C, the SIP message processing module 53C creates a disconnection request message M20 illustrated in FIG. 30 (step 141) and transmits an IP packet including the disconnection request message M20 to the SIP server SIPa (SIP proxy PRa) via the TLS module 52C, the IPsec engine 31C in the TCP/IP module 30C, and the NIC module 20C (142).

The SIP message processing module 53C waits for a response from the SIP proxy PRa (143). When receiving a disconnection trying message M21, the SIP message processing module 53C performs processing of the disconnection trying message (144) and waits for the next response from the SIP proxy PRa. When receiving a disconnection response message M27 illustrated in FIG. 37 from the SIP proxy PRa, the SIP message processing module 53C analyzes the received message (145), notifies the SP/SA control module 51C of receiving of the disconnection response message (146), and terminates this routine.

Figure 46A:
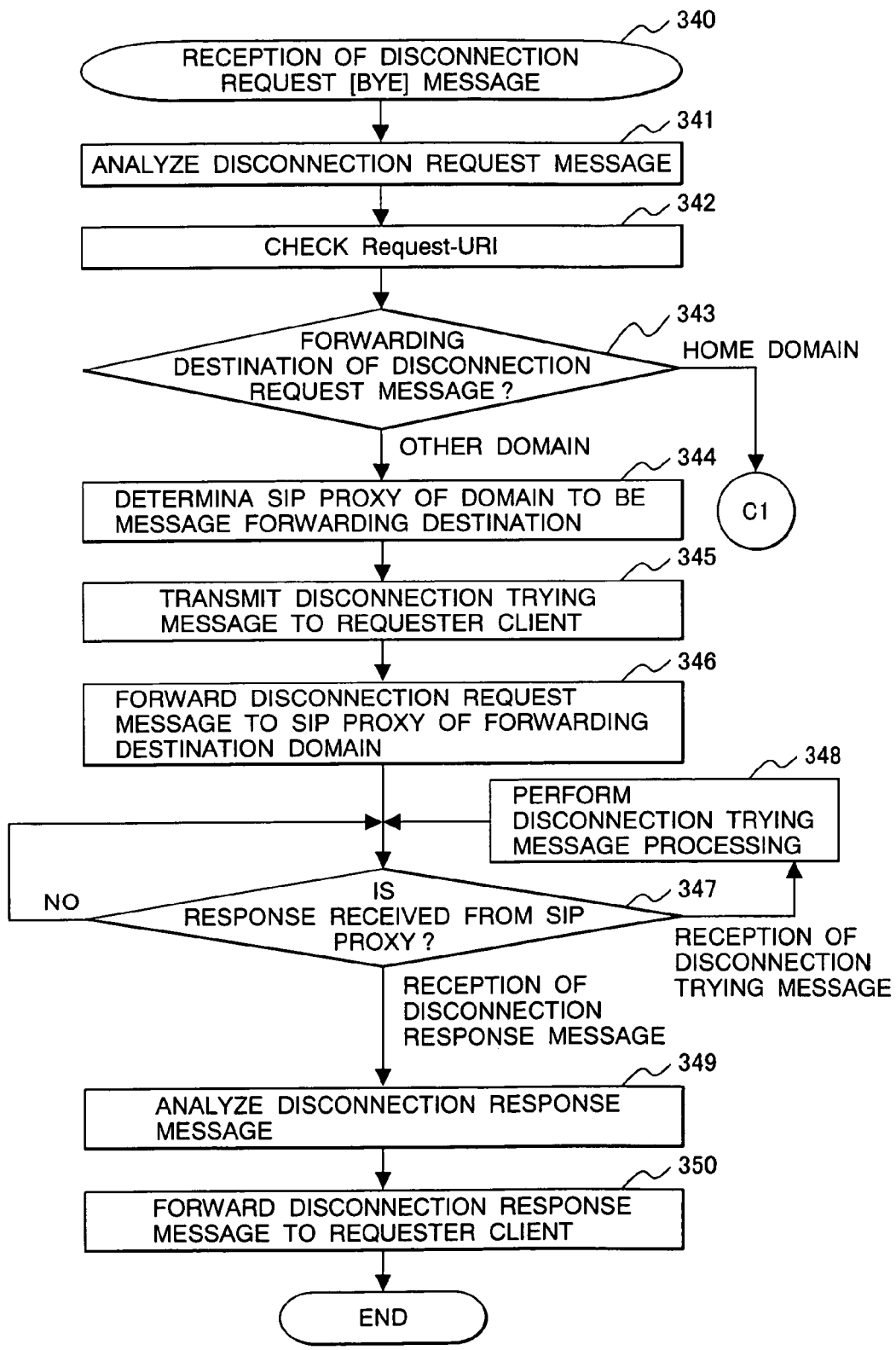
FIG. 46A is a part of a flowchart illustrating control operation to be performed by the SIP message processing module 53P on the SIP proxy PRa, when receiving a disconnection request message.
Figure 46B:
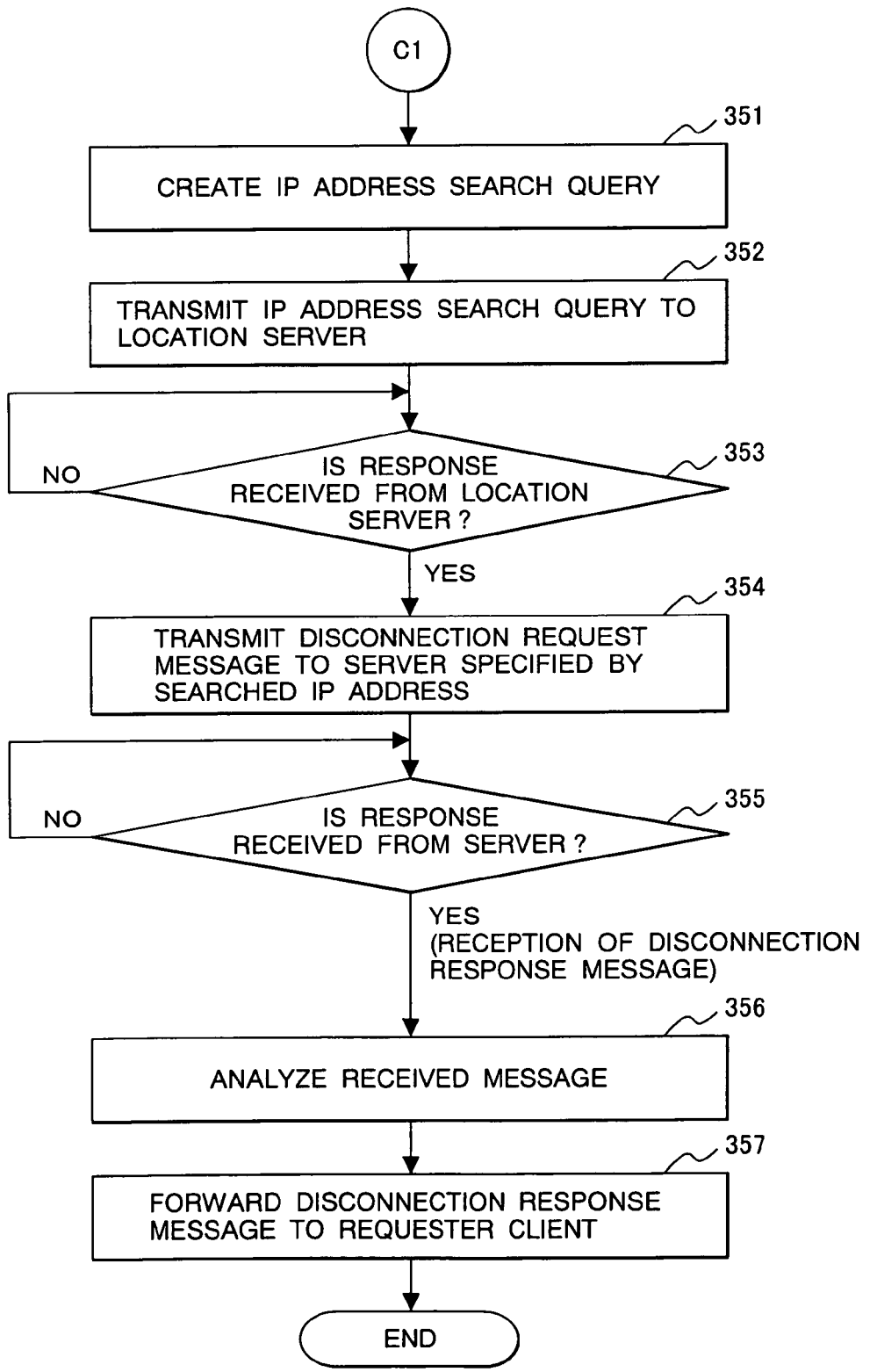
FIG. 46B is the remaining part of the flowchart illustrating control operation to be performed by the SIP message processing module 53P on the SIP proxy PRa, when receiving the disconnection request message.

FIGS. 46A and 46B show a flowchart 340 of control operation to be performed by the SIP message processing module 53P on the SIP proxy PRa, when receiving a disconnection request message M20 from the client.

The SIP message processing module 53P analyzes the received disconnection request message M20 (step 341) and checks the Request-URI in the received message (342). The SIP message processing module 53P determines the forwarding destination of the received message from the domain name specified in the Request-URI (343). If having determined that the forwarding destination belongs to a domain other than the home domain of the SIP proxy PRa, the SIP message processing module 53P determines a SIP server (SIP proxy) in the domain, to which the received message should be forwarded, by DNS search (NAPTR search+SRV search+A search) or the like (344).

In the example shown in FIG. 12, the SIP proxy PRb is found as the forwarding destination of the disconnection request message M20 by the DNS search. In this case, the SIP message processing module 53P transmits a disconnection trying message M21 illustrated in FIG. 31 to the client CL1a that is the source of the disconnection request message M20 via the TLS module 52P, TCP/IP module 30P, and NIC module 20P (345). Then, the SIP message processing module 53P forwards to the SIP proxy PRb a disconnection request message M22 obtained by adding a new Via header to the disconnection request message M20 and eliminating the Route header corresponding to the SIP proxy PRa therefrom (346) and waits for a response from the SIP proxy PRb (347).

Upon receiving a disconnection trying message M23 from the SIP proxy PRb, the SIP message processing module 53P performs processing of the disconnection trying message (348) and waits for the next response from the SIP proxy PRb. Upon receiving a disconnection response message M26 from the SIP proxy PRb, the SIP message processing module 53P analyzes the received message (349), converts the received message into a disconnection response message M27 by eliminating the Via header including its own SIP-URI from the received message, forwards the message M27 to the disconnection requester client CL1a (350), and terminates this routine.

If, it is determined by the decision step 343 that the forwarding destination of the disconnection request message M20 received from the client terminal CL1a belongs to the same domain as for the SIP proxy PRa, the SIP message processing module 53P creates a location data (IP address) search query using the SIP-URI given by the Request URI in the received message as a search key (351), transmits the location data search query to the location server LSV (352), and waits for a location service response (353).

Upon receiving location data from the location server LSV, the SIP message processing module 53P transmits an IP packet of a disconnection request message, in which the IP address of the server given by the location data is assigned to the destination IP address, onto the network NW1 (354) and waits for a response from the server (355). To this disconnection request message, a new Via header including the SIP-URI of the SIP proxy PRa is added.

Upon receiving a disconnection response message from the server that is the destination of the disconnection request message, the SIP message processing module 53P analyzes the received message (356), forwards a disconnection request message from which the Via header specifying its own node was eliminated to the disconnection requester (357), and terminates this routine.

Figure 47:
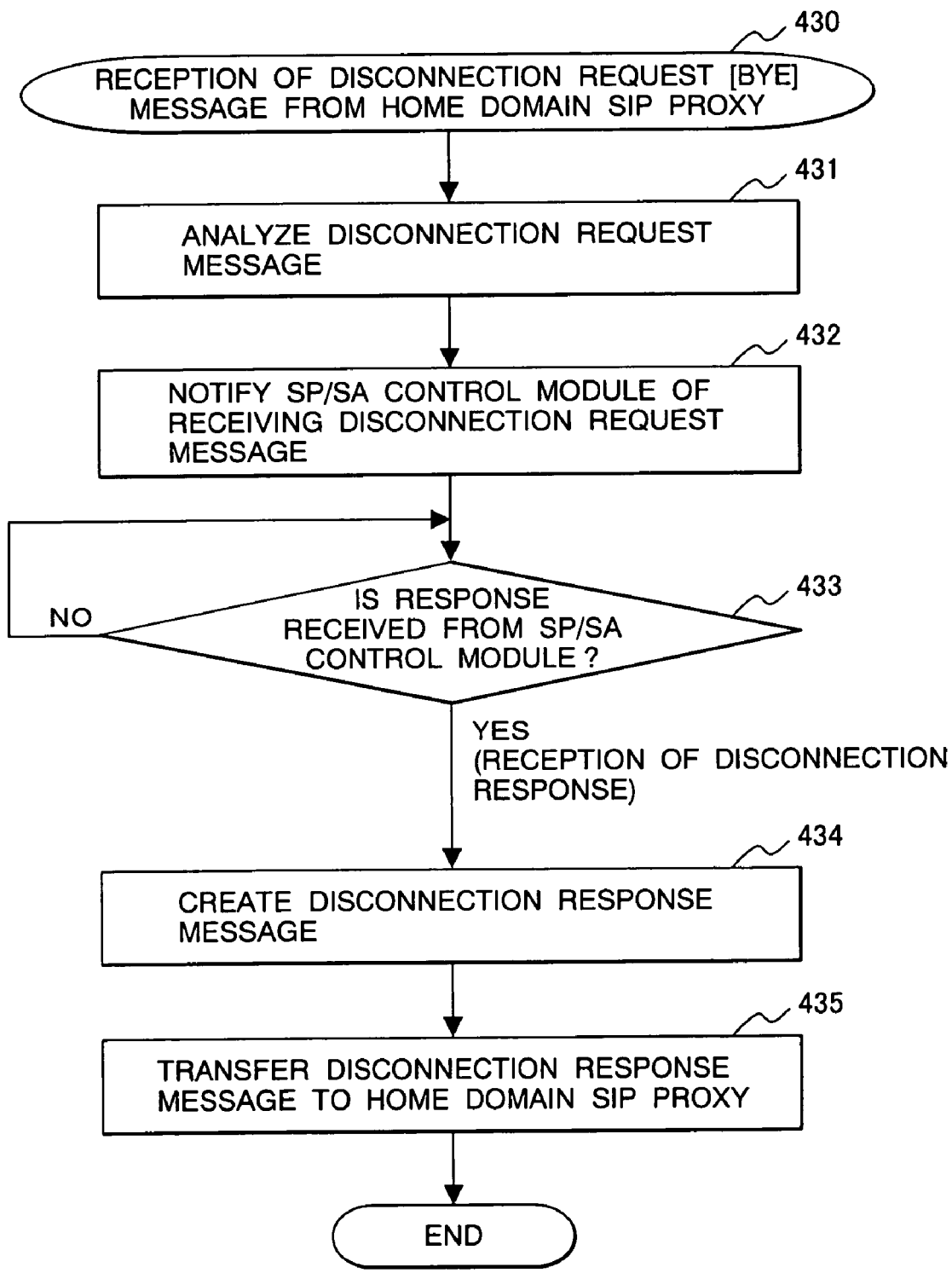
FIG. 47 is a flowchart illustrating control operation to be performed by the SIP message processing module 53S on the server SV1b, when receiving a disconnection request message.

FIG. 47 shows a flowchart of control operation to be performed by the SIP message processing module 53S on the server SV1b, when receiving a disconnection request message M24 from the SIP proxy.

Upon receiving the disconnection request message M24 via the TLS module 52S, the SIP message processing module 53S analyzes the received message (step 431), notifies the SP/SA control module 51S of receiving of the disconnection request message designating identification information of session to be disconnected (e.g., Call-ID) (432), and waits for a response from the SP/SA control module 51S (433). Upon receiving a disconnection response from the SP/SA control module 51S, the SIP message processing module 53S creates a disconnection response message M25 illustrated in FIG. 35 (424), forwards the message M25 to the SIP proxy PRb via the TLS module, TCP/IP module, and NIC module (435), and terminates this routine.

Figure 48:
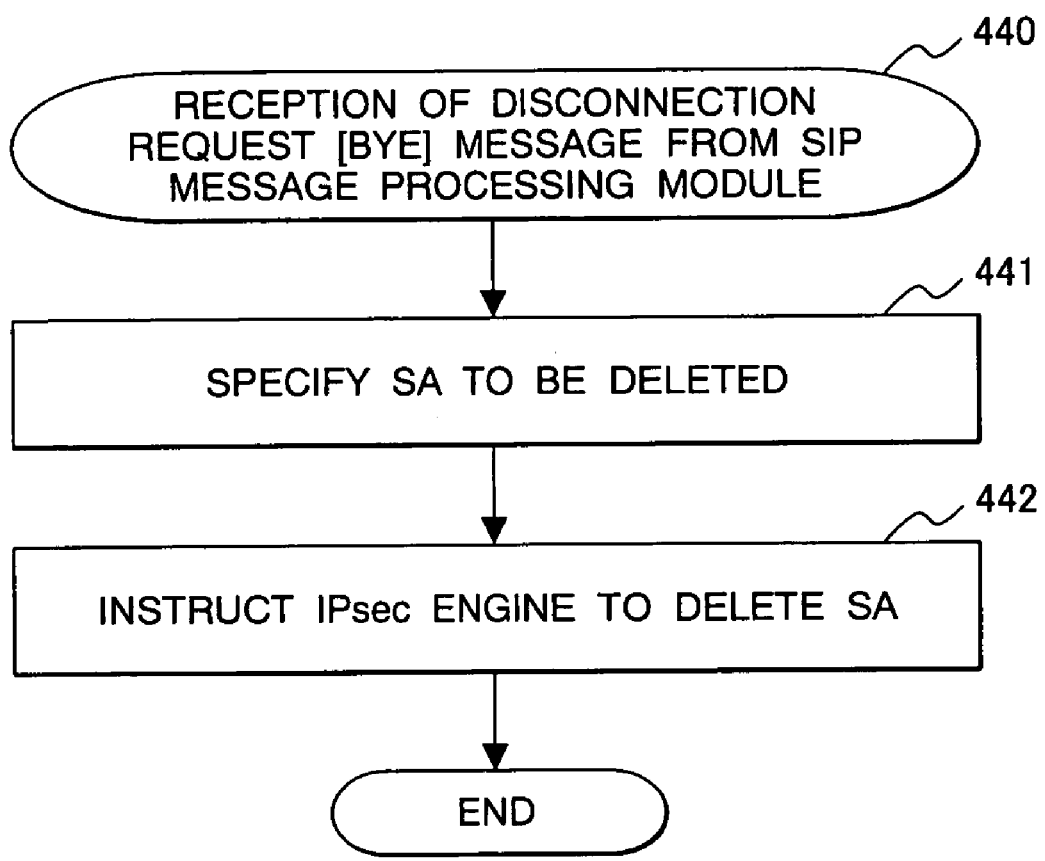
FIG. 48 is a flowchart illustrating control operation to be performed by the SP/SA control module 51S on the server SV1b, when receiving notification of a disconnection request occurring.

FIG. 48 shows a flowchart of control operation to be performed by the SP/SA control module 51S, when receiving the notification of a disconnection request occurring from the SIP message processing module 53S.

The SP/SA control module 51S specifies SA information to be deleted from the SADB 33S, based on the session identification information notified (step 441), instructs the IPsec engine 31S to delete the SA information (442), and terminates this routine.

Next, by referring to FIGS. 49 through 59, a second embodiment of encrypted data communication according to the present invention will be described.

In the first embodiment, when a packet transmission request designating an IP address of the destination server occurs, the SIP message processing module 53C on the client issues an AOR request to get SIP-URI corresponding to the destination IP address and, then, issues a connection request message addressed to a SIP proxy by applying the SIP-URI obtained from the registrar to the destination.

The second embodiment is characterized as follows. When a packet transmission request designating the destination server with an IP address occurs, the client issues a connection request message with the IP address specifying the destination server. Having received the connection request message, the SIP proxy checks the Request-URI specified in the start line in the received message. If the destination is specified by the IP address, the SIP proxy converts it into SIP-URI form and forwards the connection request message to a SIP server located in a domain to which the destination server belongs.

Figure 49:
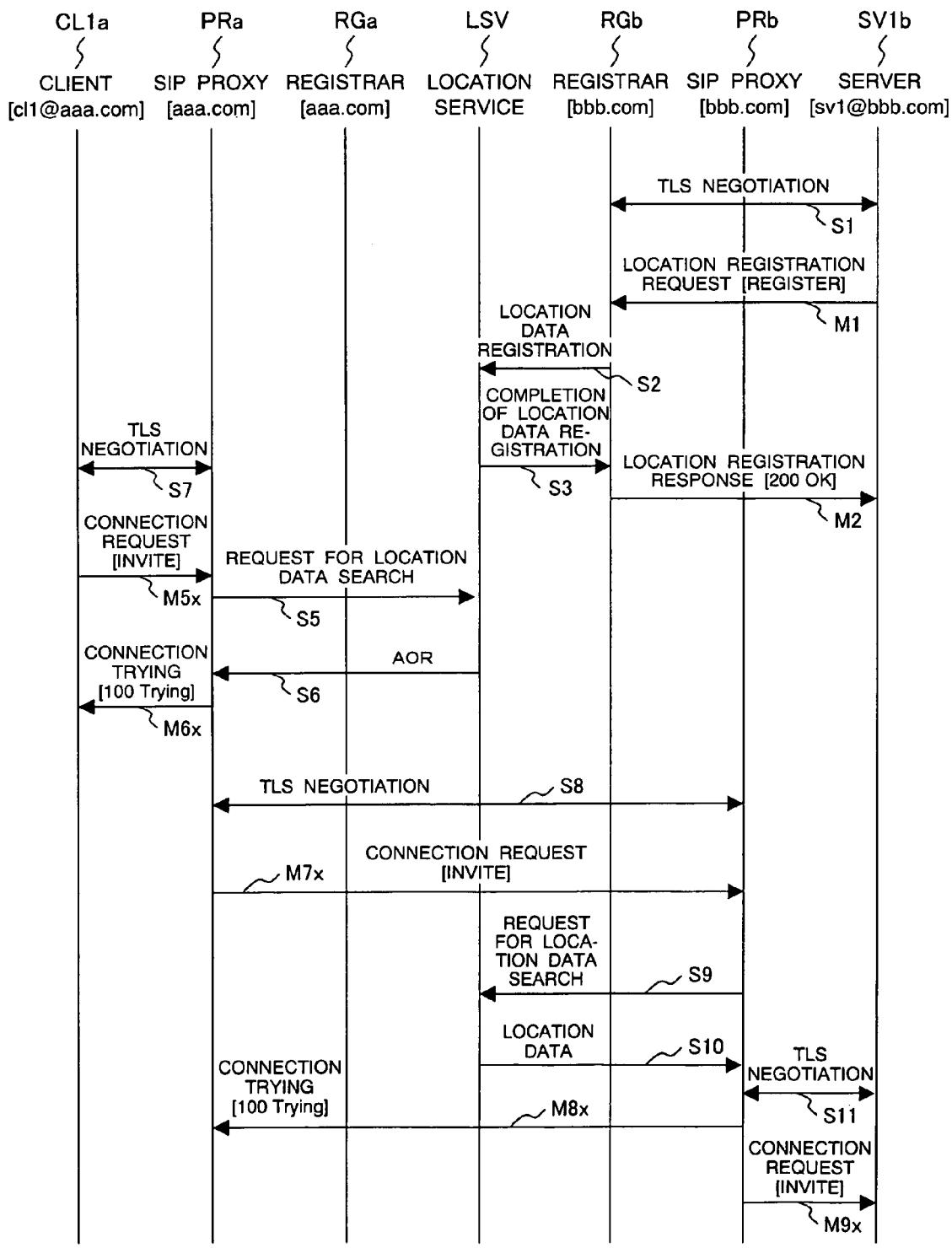
FIG. 49 is a part of a sequence chart for illustrating a second embodiment of encrypted communication according to the present invention.
Figure 50:
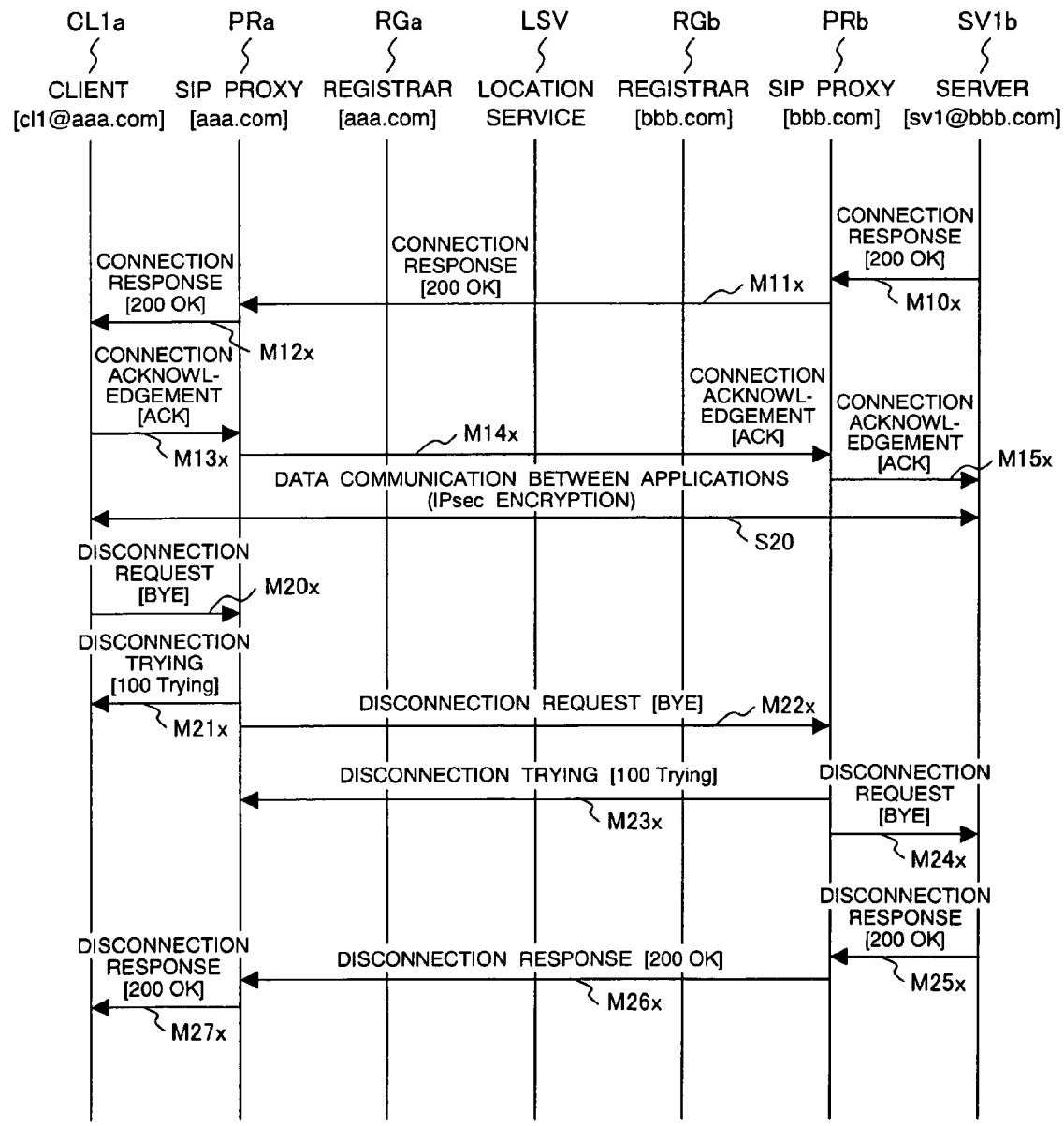
FIG. 50 is the remaining part of the sequence chart for illustrating the second embodiment of encrypted communication according to the present invention.

FIGS. 49 and 50 show a sequence chart illustrating encrypted data communication sequence in the second embodiment of the present invention. As for the steps and messages already described in the first embodiment, to which attached are the same reference symbols as that shown in FIGS. 11 and 12, their redundant descriptions are omitted as possible.

Figure 51:
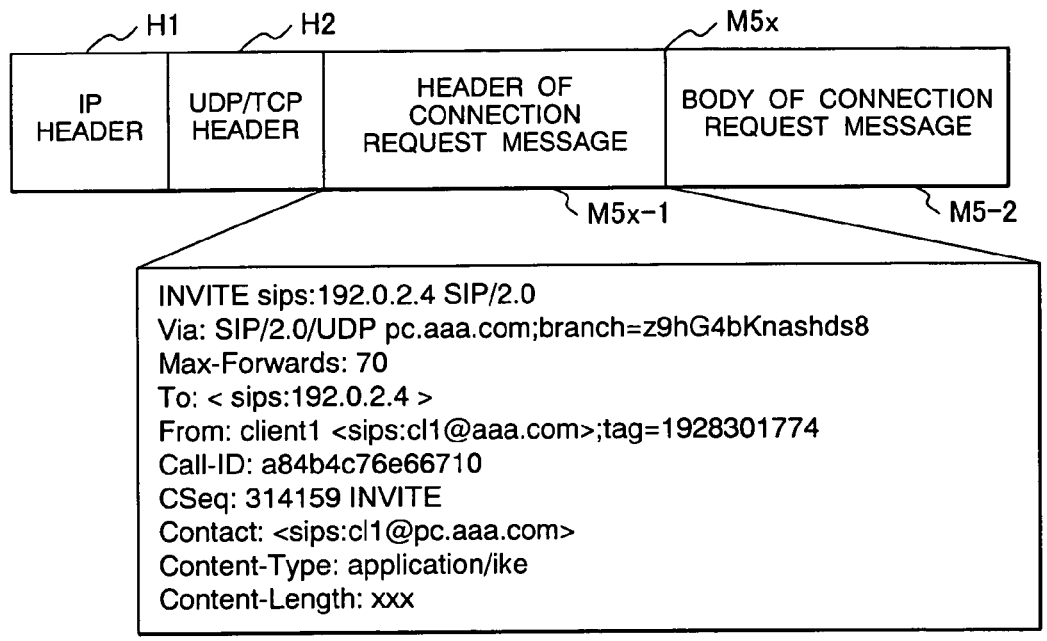
FIG. 51 shows an example of a format of a connection request [INVITE] message M5x shown in FIG. 49.

In the second embodiment of the present invention, when a packet transmission request designating the destination server with an IP address occurs, the client CL1*a* performs TLS negotiation (S7) with the SIP proxy PRa to get authentication of the client and set parameters for encrypted communication. Immediately after that, the client CL1*a* transmits a connection request [INVITE] message M5*x* to the SIP proxy PRa. As shown in FIG. 51, in the connection request message M5*x* transmitted here, each Request-URI in the start line and in the To header in the header part specifies the destination server SV1*b* with the IP address "192.0.2.4". Other header information in the header part M5*x*-1 and the contents of the message body M5-2 are the same as in the connection request message M5 for the first embodiment, shown in FIGS. 17 and 18.

Figure 52:
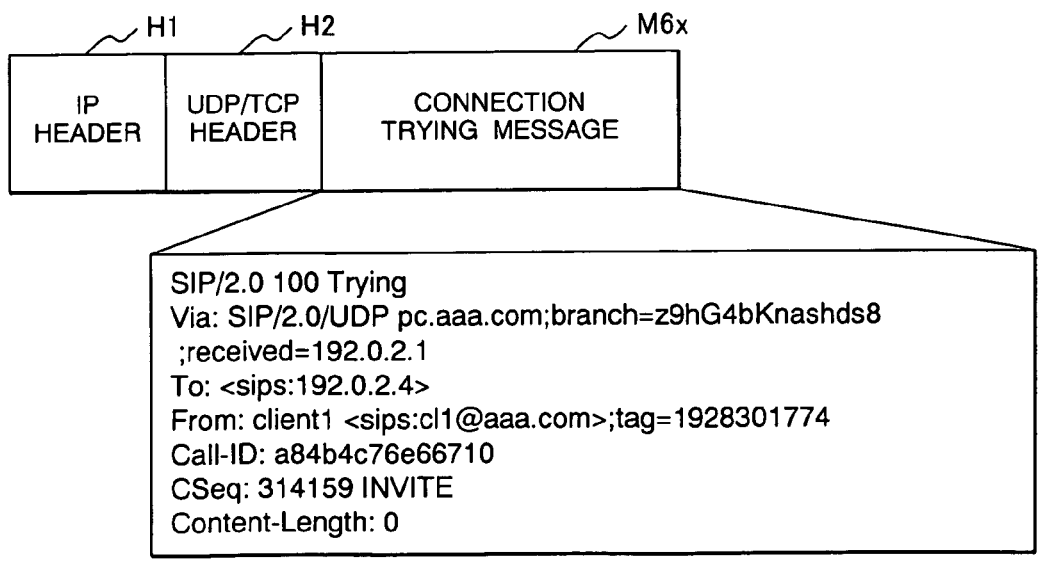
FIG. 52 shows an example of a format of a connection trying [100 Trying] message M6x shown in FIG. 49.

Because the Request-URI specified in the received connection request message M5*x* has a "SIP:IP address" form, the SIP proxy PRa searches for AOR (SIP-URI) corresponding to the IP address "192.0.2.4" from the location service table 60 on the location service DB (S5). When AOR "sv1@bbb.com" is retrieved from the location service table 60 (S6), the SIP proxy PRa transmits a connection trying (100 Trying) message M6*x* which is shown in FIG. 52 to the requester client CL1*a*. After that, the SIP proxy PRa performs TLS negotiation (S8) with the SIP proxy PRb in a domain, to which the destination server SV1*b* belongs, for mutual authentication and setting parameters for encrypted communication. The contents of the connection trying message M6*x* are the same as that of the connection trying message M6 for the first embodiment, shown in FIG. 18, except for the To header in which the destination IP address is specified.

Figure 53:
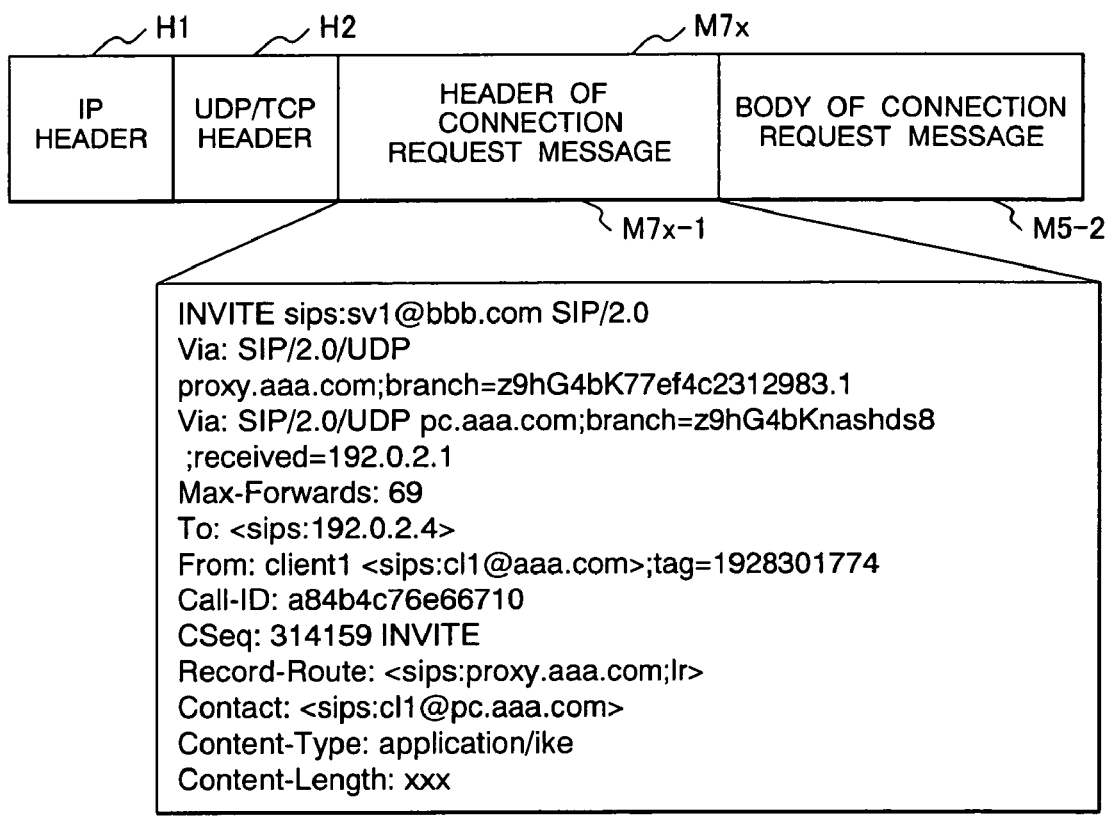
FIG. 53 shows an example of a format of a connection request [INVITE] message M7x shown in FIG. 49.

Upon the completion of the TLS negotiation with the SIP proxy PRb, the SIP proxy PRa transmits a connection request [INVITE] message M7*x* which is shown in FIG. 53 to the SIP proxy PRb. The connection request message M7*x* is obtained by adding a Via header including the SIP-URI of the SIP proxy PRa to the connection request message M5*x* received from the client CL1*a* and changing the IP address "192.0.2.4" for the Request-URI in the start line to SIP-URI "sv1@bbb.com". Subsequently, the same communication sequence as for the first embodiment is performed and an application-to-application data communication state (S20) is established.

A connection trying [100 Trying] message M8*x* which is transmitted from the SIP proxy PRb to the SIP proxy PRa, a connection request [INVITE] message M9*x* which is transmitted from the SIP proxy PRb to the destination server SV1*b*, a connection response [200 OK] message M10*x* which is transmitted from the server SV1*b* to the SIP proxy PRb, a connection response [200 OK] message M11*x* which is transmitted from the SIP proxy PRb to the SIP proxy PRa, a connection response [200 OK] message M12*x* which is transmitted from th SIP proxy PRa to the requester client CL1*a*, a connection acknowledgement [ACK] message M13*x* which is transmitted from the requester client CL1*a* to the SIP proxy PRa, a connection acknowledgement [ACK] message M14*x* which is transmitted from the SIP proxy PRa to the SIP proxy PRb, and a connection acknowledgement [ACK] message M15*x* which is transmitted from the SIP proxy PRb to the server SV1*b* have the same contents as the SIP messages M8 to M15, respectively, illustrated for the first embodiment, except for the To header in which the destination is specified with an IP address.

Figure 54:
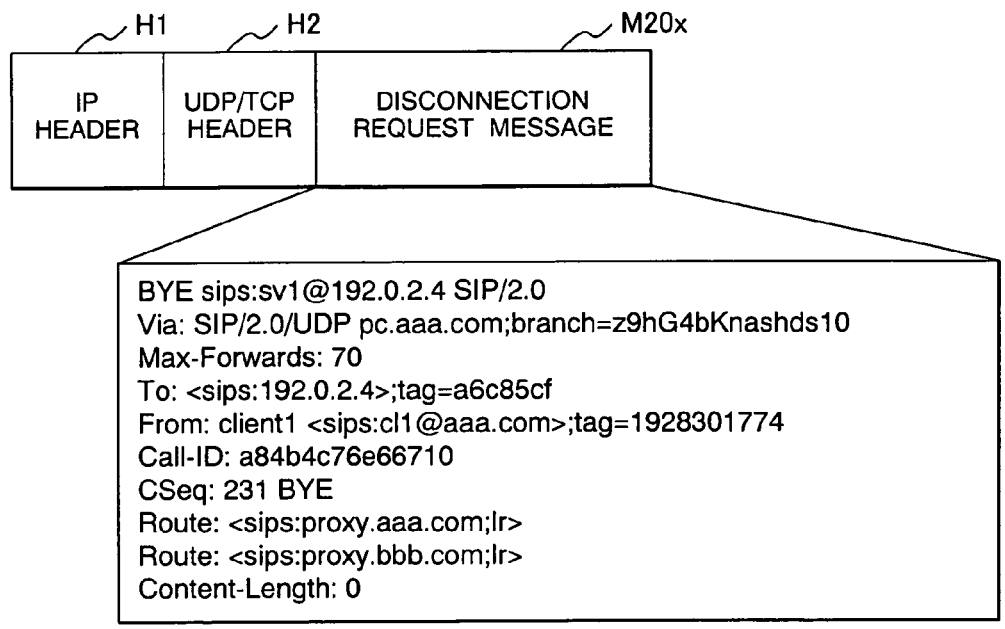
FIG. 54 shows an example of a format of a disconnection request [BYE] message M20x shown in FIG. 50.

When terminating the application for data communication with the server SV1*b*, the client CL1*a* transmits a disconnection request [BYE] message M20*x* which is shown in FIG. 54 to the SIP proxy PRa. In the disconnection request message M20*x*, each Request-URI in the start line and in the To header specifies the server SV1*b* with the IP address "sv1@192.0.2.4". Other header information in the header part is the same as the of the connection request message M5 for the first embodiment, shown in FIGS. 17 and 18.

Figure 55:
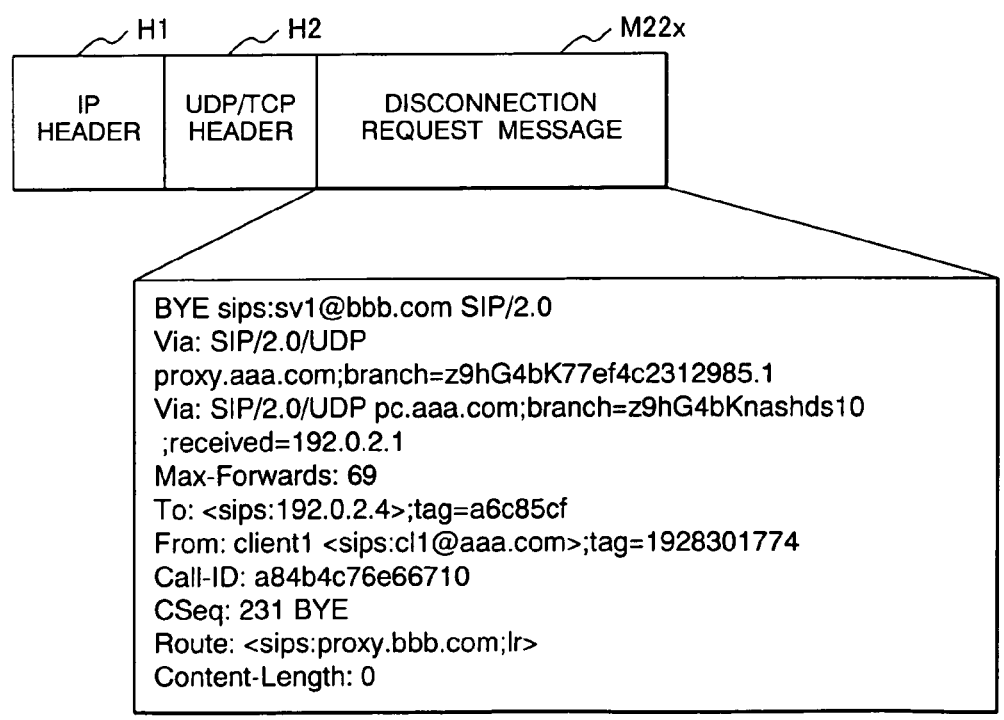
FIG. 55 shows an example of a format of a disconnection request [BYE] message M22x shown in FIG. 50.

Upon receiving the disconnection request message M20*x*, the SIP proxy PRa transmits a disconnection trying [100 Trying] message M21*x* to the requester client VL1*a*, converts the disconnection request message M20*x* into a disconnection request [BYE] message M22*x* which is shown in FIG. 55, and transmits the message M22*x* to the SIP proxy PRb. The disconnection trying message M21*x* has the same contents as the disconnection trying message M21 for the first embodiment, shown in FIG. 31, except for the To header in which an IP address is applied. The disconnection request message M22*x* is created by adding a Via header including the SIP-URI of the SIP proxy PRa to the disconnection request message M20*x* received from the client CL1*a*, eliminating the Route header corresponding to the SIP proxy PRa, and changing the IP address to SIP-URI for the Request-URI in the start line.

Upon receiving the disconnection request message M22*x*, the SIP proxy PRb transmits a disconnection trying [100 Trying] message M23*x* to the SIP proxy PRa, converts the disconnection request message M22*x* into a disconnection request [BYE] message M24*x* by adding a new Via header, eliminating the Route header corresponding to the SIP proxy PRb, and changing the SIP-URI to IP address for the Request-URI in the start line, and transmits the message M24*x* to the server SV1*b*. The disconnection trying message M23*x* and the disconnection request message M24*x* have the same contents as the corresponding SIP messages for the first embodiment, shown in FIGS. 33 and 34, except for the To header in which an IP address is applied.

Upon receiving the disconnection request message M24*x*, the server SV1*b* transmits a disconnection response [200 OK] message M25*x* to the SIP proxy PRb. The disconnection response message M25*x* has the same contents as the corresponding SIP message for the first embodiment, shown in FIG. 35, except for the To header in which an IP address is applied. The disconnection response message M25*x* is converted at the SIP proxy PRb and the SIP proxy PRa in the same way as for the first embodiment and eventually a disconnection response [200 OK] message M27*x* is transmitted to the requester client CL1*a*. Upon receiving the disconnection response message M27*x*, the requester client CL1*a* terminates IPsec encryption/decryption and waits for a new packet transmission request from the same or another application.

Next, by referring to FIGS. 56 through 59, a series of characteristic operations on the client CL1*a* and SIP server SIPa (SIP proxy PRa, registrar RGa) to enable encrypted communication will be described as the second embodiment of the present invention.

Figure 56:
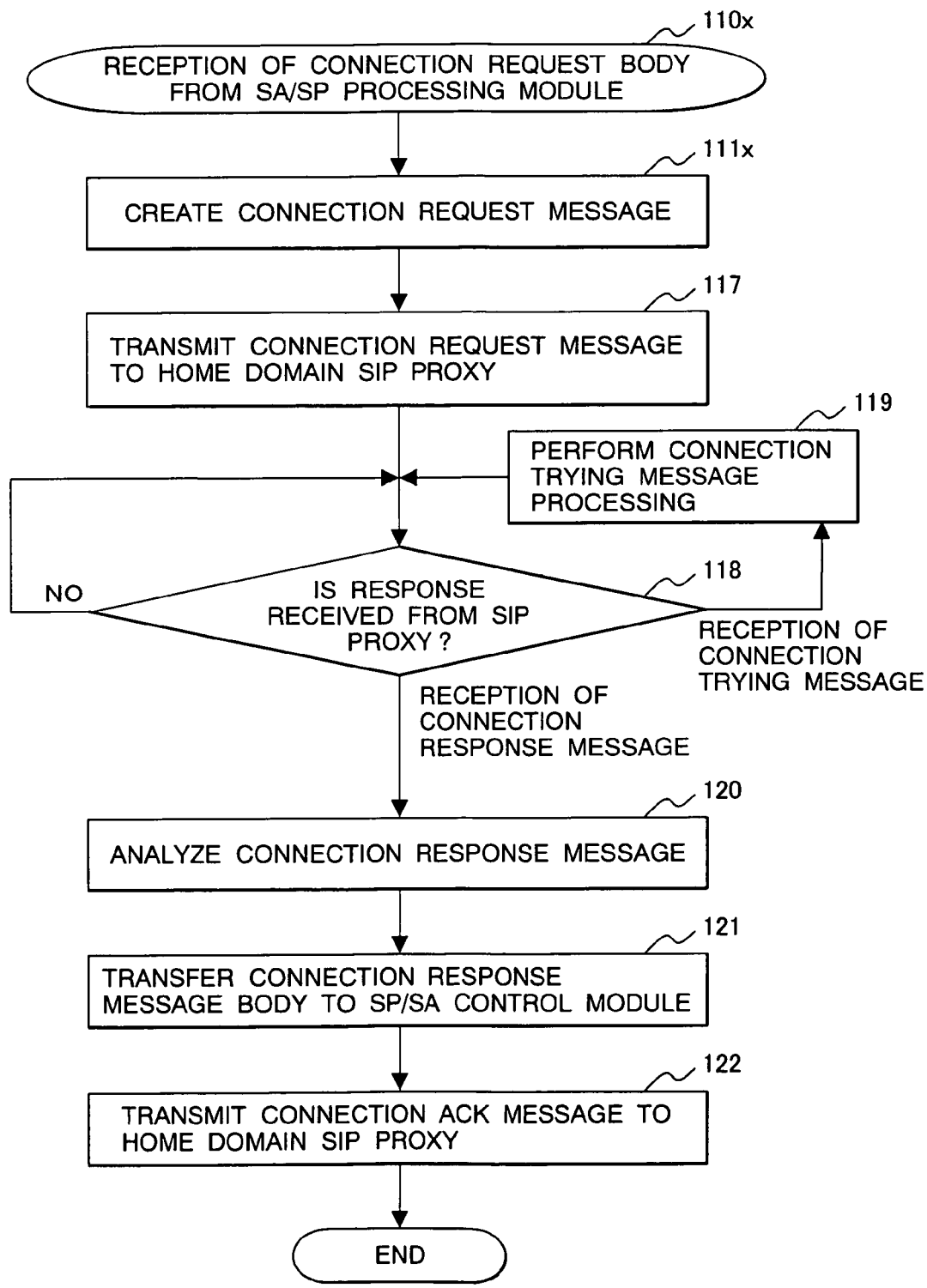
FIG. 56 is a part of flowchart illustrating control operation to be performed by the SIP message processing module 53C on the client CL1a, when receiving the body of a connection request message, according to the second embodiment.

In the second embodiment, the IPsec engine 31C and SP/SA control module 51C on the client CL1*a* have the same functions as in the first embodiment. FIG. 56 shows a flowchart 110*x* of control operation to be performed by the SIP message processing module 53C on the client CL1a, when receiving the connection request message body from the SP/SA control module SIC in the second embodiment.

Upon receiving the connection request message body from the SP/SA control module 51C, the SIP message processing module 53C creates a connection request message M5x illustrated in FIG. 51 comprising the header part M5-1, in which the IP address of the destination server given by ID data in the second ID payload is assigned to the Request-URI in the start line and to the To header, and the message body M5-2 received from the SP/SA control module 51C (111x).

The SIP message processing module 53C transmits the connection request message M5x addressing to the SIP proxy PRa of the SIP server SIPa via the TSL module 52C, TCP/IP module 30C, and NIC module 20C (117) and waits for a response from the SIP proxy PRa (118). Upon receiving a connection trying message M6x from the SIP proxy PRa, the SIP message module 53C performs processing of the connection trying message (119) and waits for a further response from the SIP proxy PRa.

Upon receiving a connection response message M12x from the SIP proxy PRa, the SIP message processing module 53C analyzes the received message (120) and transfers the connection response message body M12-2 illustrated in FIG. 24, extracted from the received message, to the SP/SA control module 51C (121). After that, the SIP message processing module 53C creates a connection acknowledgement message M13x, transmits the message addressing to the SIP proxy PRa via the TSL module 52C, TCP/IP module 30C, and NIC module 20C (122), and terminates this routine.

Figure 57:
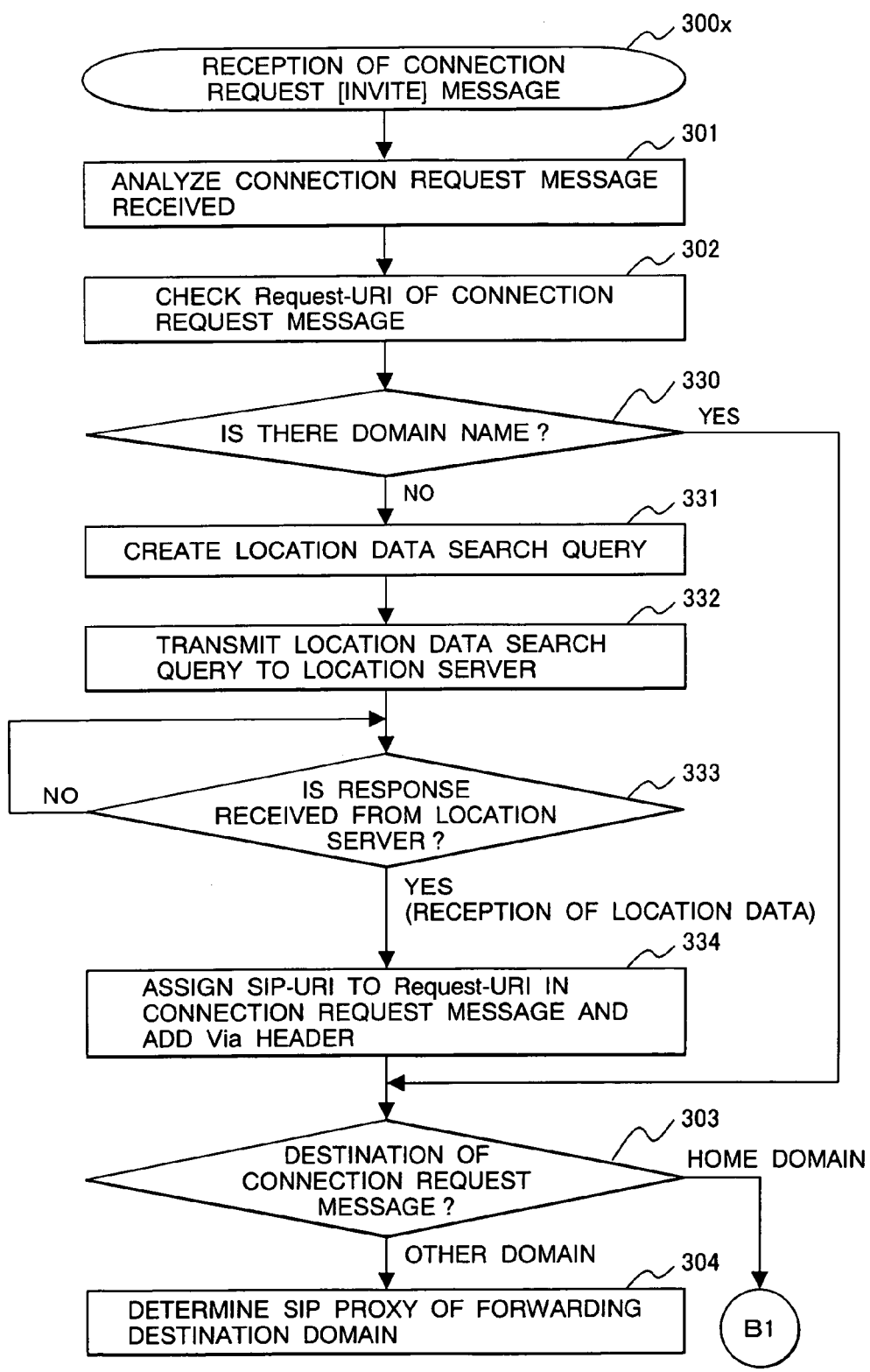
FIG. 57 is a part of flowchart illustrating control operation to be performed by the SIP message processing module 53P on the SIP proxy PRa, when receiving a connection request message, according to the second embodiment.

FIG. 57 shows a characteristic portion of flowchart 300x of control operation to be performed by the SIP message processing module 53P on the SIP proxy PRa, when receiving a connection request message M5x from the client CL1a.

Upon receiving the connection request message M5x from the client CL1a, the SIP message processing module 53P on the SIP proxy PRa analyzes the received message (step 301), checks the Request-URI in the start line of the received message (302), and determines whether the Request-URI includes a domain name (330). If the Request-URI includes a domain name, that is, if it includes a description in the form of "sips;user-name@domain-name", the SIP message processing module 53P determines the forwarding destination of the connection request message from the domain name in the Request-URI at step 303.

If the Request-URI does not include a domain name, that is, if it includes a description in the form of "sips:IP-address", the SIP message processing module 53P creates a location data search query using the IP address of the destination server SV1b given by the Request-URI as a search key (331), transmits the search query to the location server LSV (332) and waits for a response from the location server (333). Upon receiving the SIP-URI of the destination server SV1b as location data from the location server LSV, the SIP message processing module 53P changes the IP address to the SIP-URI for the Request-URI in the connection request message M5x received from the client CL1a, adds a Via header and a Record-Route each including its own SIP-URI to the header part (334), and determines the forwarding destination of the connection request message from the domain name in the Request-URI at step 303. Step 303 and subsequent operation are the same as described for the first embodiment with reference to FIGS. 41A through 41D.

Figure 58:
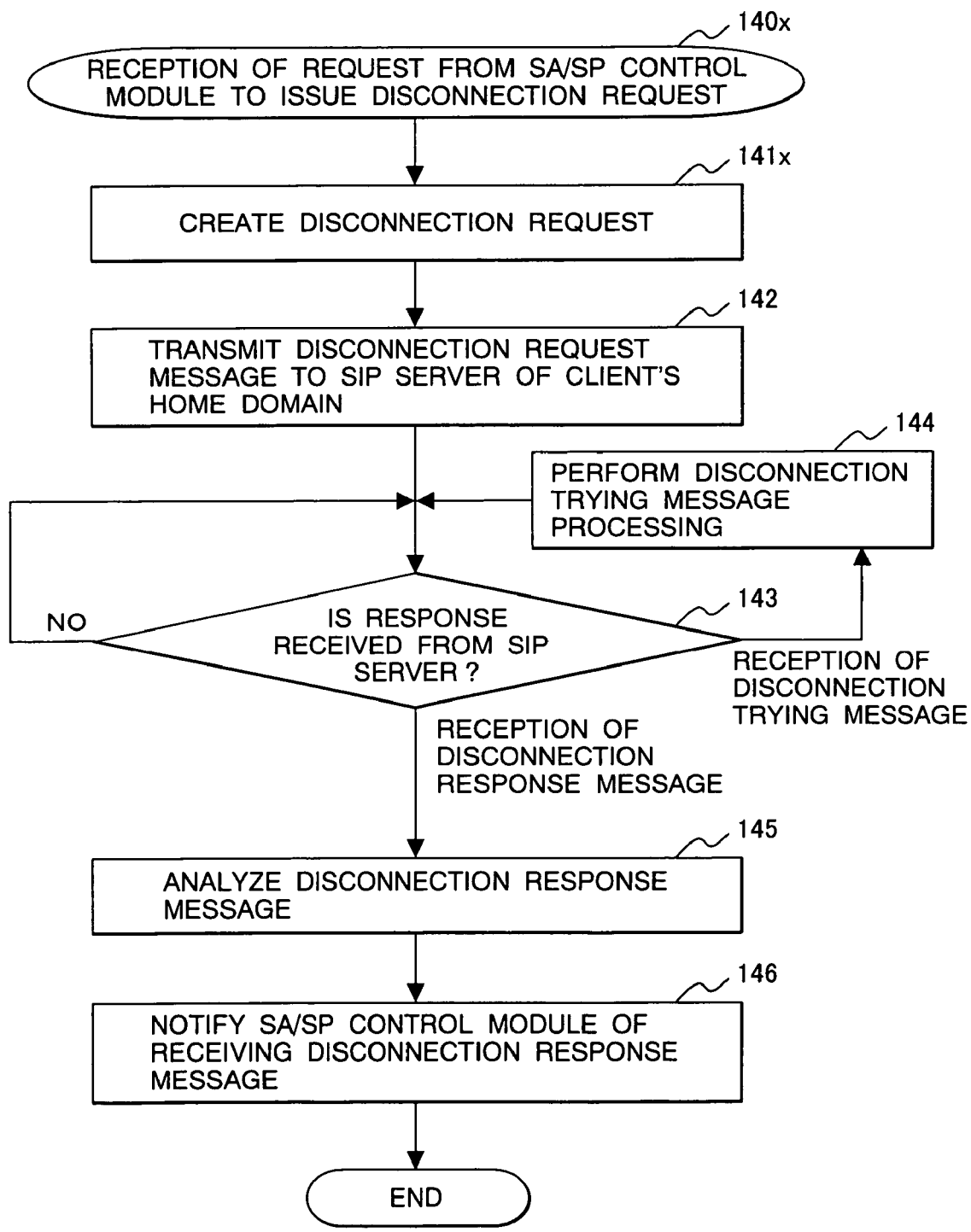
FIG. 58 is a flowchart illustrating control operation to be performed by the SIP message processing module 53C on the client CL1a, when a request to issue a disconnection request message, according to the second embodiment.

FIG. 58 shows a flowchart 140x of control operation to be performed by the SIP message processing module 53C on the client CL1a, when receiving a request to issue a disconnection request message from the SP/SA control module 51C.

Upon receiving the request to issue a disconnection request message from the SP/SA control module 51C, the SIP message processing module 53C creates a disconnection request message M20x illustrated in FIG. 54 in which the IP address "sv1@192.0.2.4" of the server SV1b with which communication is being conducted is assigned to the Request-URI in the start line and to the To header (step 141x) and transmits the message to the SIP server SIPa (SIP proxy PRa) via the TLS module 52C, the IPsec engine 31 in the TCP/IP module 30C, and the NIC module 20C (142).

The SIP message processing module 53C waits for a response from the SIP proxy PRa (143). When a disconnection trying message M21x is received, the message processing module 53C performs processing of the disconnection trying message (144) and waits for the next response form the SIP proxy PRa. Upon receiving a disconnection response message M27x from the SIP proxy PRa, the SIP message processing module 53C analyzes the received message (145), notifies the SP/SA control module 51C of receiving of the disconnection response message (146), and terminates this routine.

Figure 59:
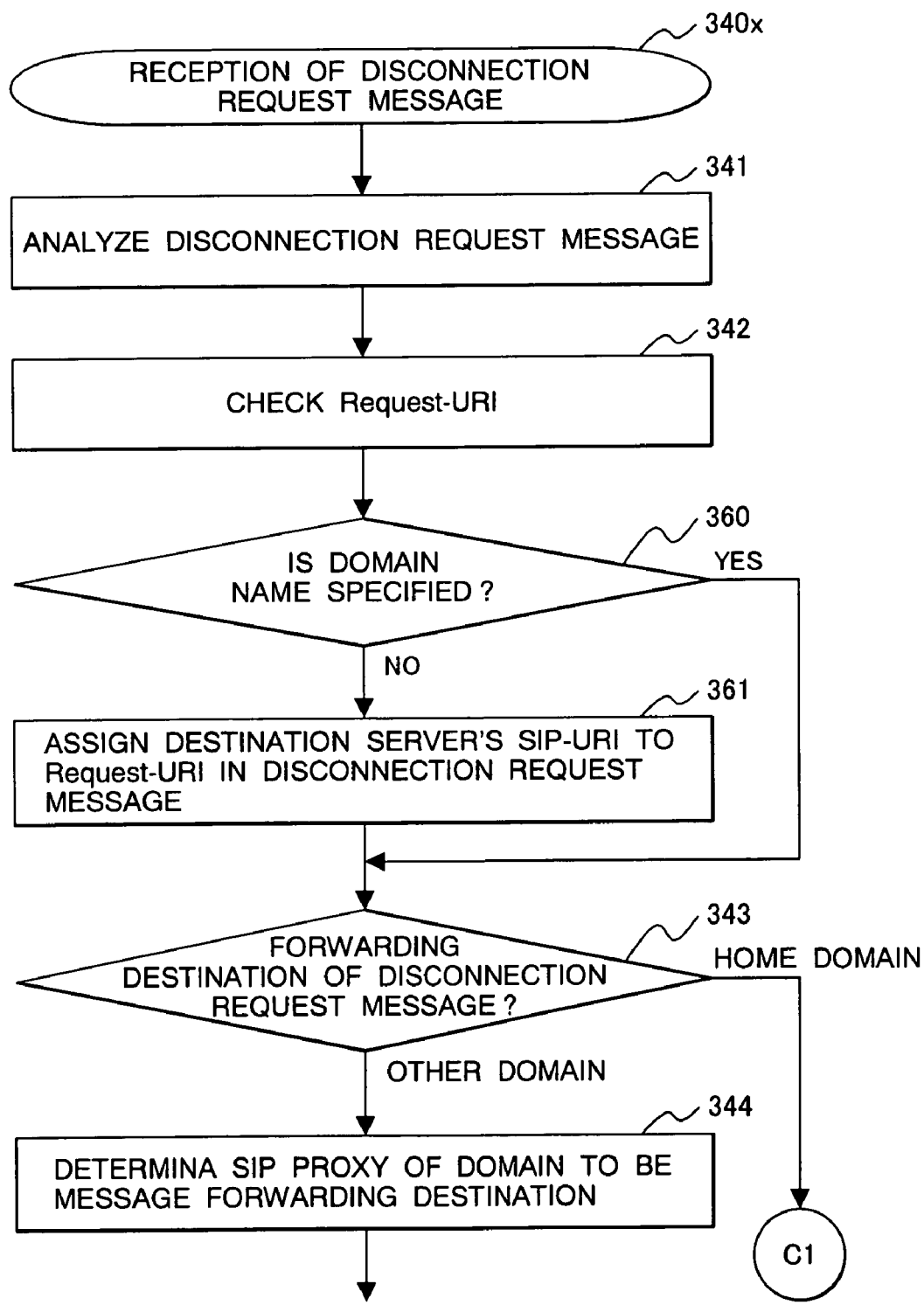
FIG. 59 is a part of flowchart illustrating control operation to be performed by the SIP message processing module 53P on the SIP proxy PRa, when receiving a disconnection request message, according to the second embodiment.

FIG. 59 shows a flowchart 340x of control operation to be performed by the SIP message processing module 53P on the SIP proxy PRa, when receiving a disconnection request message M20x from the client.

The SIP message processing module 53P analyzes the received disconnection request message M20x (step 341), checks the Request-URI in the received message (342), and determines whether the Request-URI includes a domain name (360). If the Request-URI includes a domain name, the SIP message processing module 53P determines the forwarding destination of the received message from the domain name (343). If the Request-URI does not include a domain name, that is, if it includes a description in the form of "sips: IP-address", the SIP message processing module 53P changes the Request-URI in the disconnection request message M20x by applying the SIP-URI of the destination server that has been obtained beforehand in the steps 331 to 333 in FIG. 57 when the connection request message was received (361), and determines the forwarding destination of the received message from the domain name given by the Request-URI (343). Step 343 and subsequent operation are the same as described for the first embodiment with reference to FIGS. 46A through 46C.

As described above, the SIP proxy PRa in the second embodiment is characterized in that the SIP message processing module 53P is provided with the SIP-URI (AOR) search function 54 for converting IP address indicated in the Request-URI of a received SIP message to SIP-URI, as shown in FIG. 9.

Next, by referring to FIGS. 60 through 67, a third embodiment of encrypted data communication according to the present invention will be described.

The third embodiment is characterized as follows. When a packet transmission request designating the destination server with an IP address occurs, the SIP message processing module 53C on the client CL1a sends a query for SIP-URI to the destination server, using the above IP address. After getting SIP-URI from the destination server, the SIP message processing module 53C issues a connection request message in which the SIP-URI is described in the Request-URI so that a SIP proxy having received this message can determine the destination domain from the received message.

Figure 60:
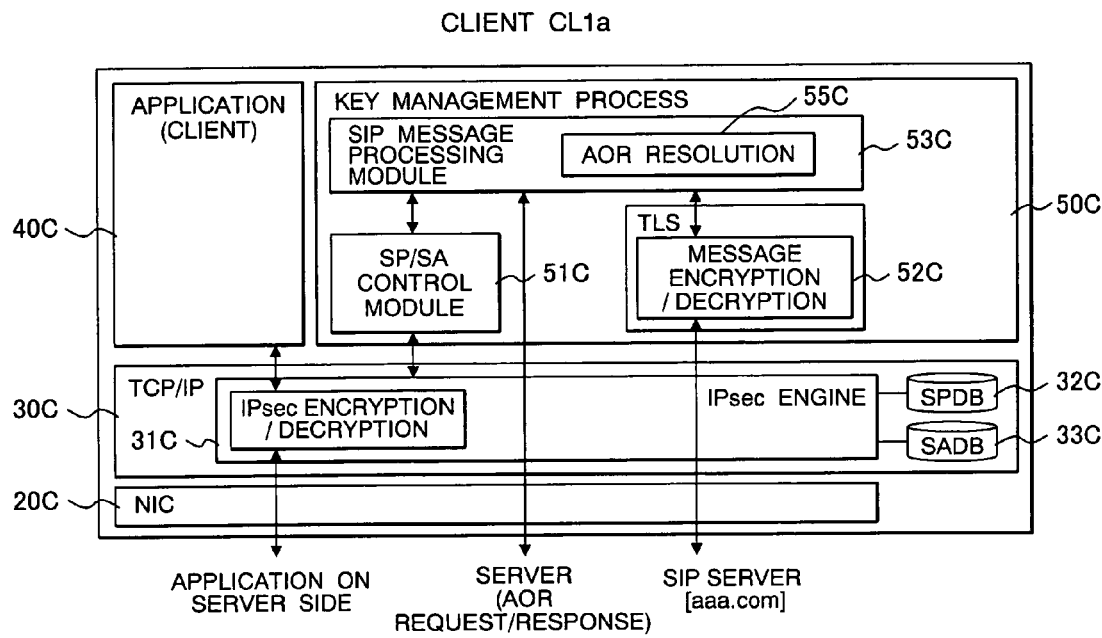
FIG. 60 is a diagram showing a basic configuration of software provided on a client CL1a in a third embodiment of the present invention.
Figure 61:
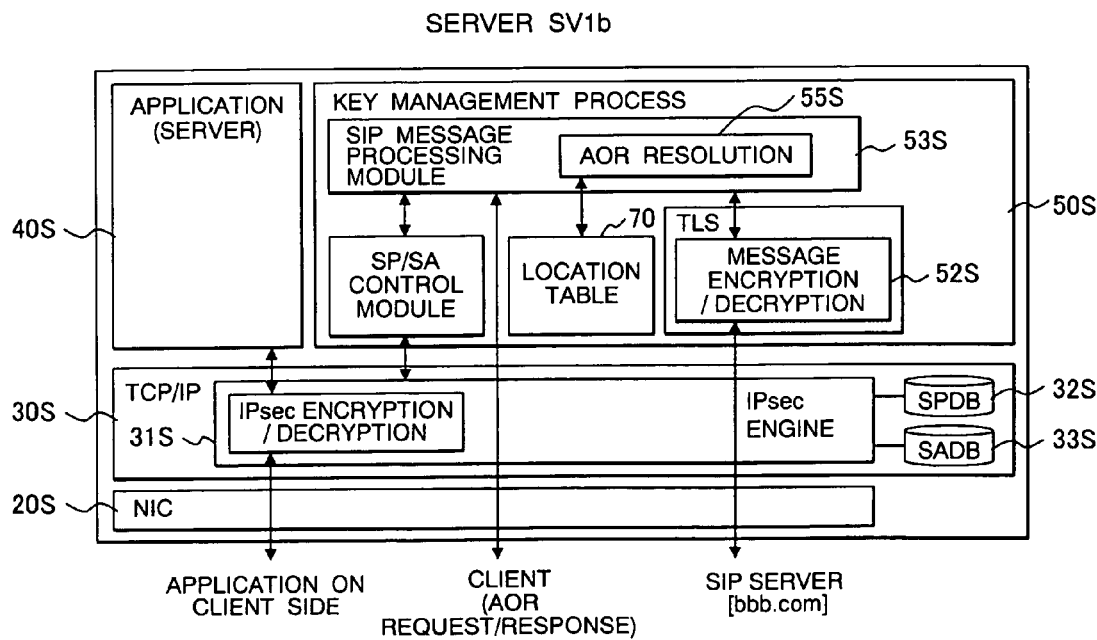
FIG. 61 is a diagram showing a basic configuration of software provided on a server SV1b in the third embodiment of the present invention.

FIG. 60 shows a basic configuration of software of the client CL1a and FIG. 61 shows a basic configuration of software of the destination server SV1b in the third embodiment.

In comparison with FIGS. 7 and 8, the difference from the software configurations for the foregoing embodiments resides in that both the SIP message processing module 53C on the client CL1*a* and the SIP message processing module 53S on the server SV1*b* are provided with AOR resolution functions 55C and 55S, respectively, to exchange SIP-URI request/response messages, and the SIP message processing module 53S on the server SV1*b* is provided with a location table 70 to which the AOR resolution function 55S makes reference. As shown in FIG. 62, the location table 70 indicates the correspondence of the AOR (SIP-URI) 71 of the server SV1*b* to its IP address 72.

Figure 63:
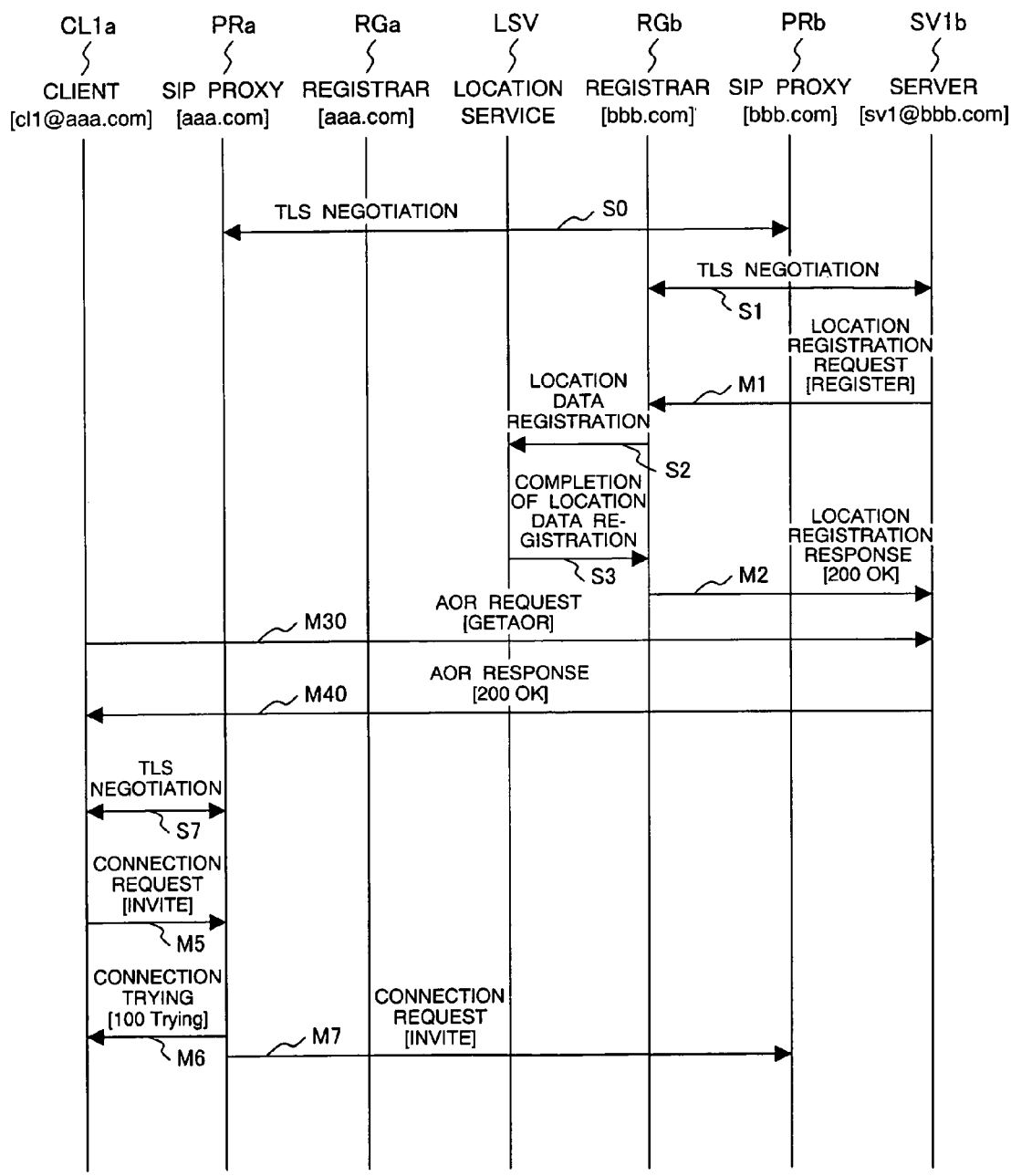
FIG. 63 is a part of sequence chart for illustrating a third embodiment of encrypted communication according to the present invention.

FIG. 63 shows a sequence chart of encrypted data communication of the third embodiment.

Here, it is assumed that, before a connection request is issued from the client CL1*a*, TLS negotiation (step S0) between the SIP proxy PRa which manages the home domain of the client CL1*a* and the SIP proxy PRb which manages the home domain of the destination server SV1*b* has been performed for mutual authentication and setting parameters for encrypted communication, and TLS negotiation (S1) and the location registration procedure between the destination server SV1*b* and the registrar RGb have been performed. However, the TLS negotiation (S1) between both SIP proxies may be performed as required when a connection request occurs from the client CL1*a*, as done in the step S8 for the first and second embodiments.

In the third embodiment, when a connection request specifying the server SV1*b* with its IP address occurs on the client CL1*a*, the SIP message processing module 53C transmits an AOR request message M30 directly addressing to the server SV1*b*. In response to the AOR request message M30, the SIP message processing module 53S on the serer SV1*b* returns an AOR response message M40 in which the SIP-URI "sv1@bbb.com" of the server SV1*b* is specified.

Figure 64:
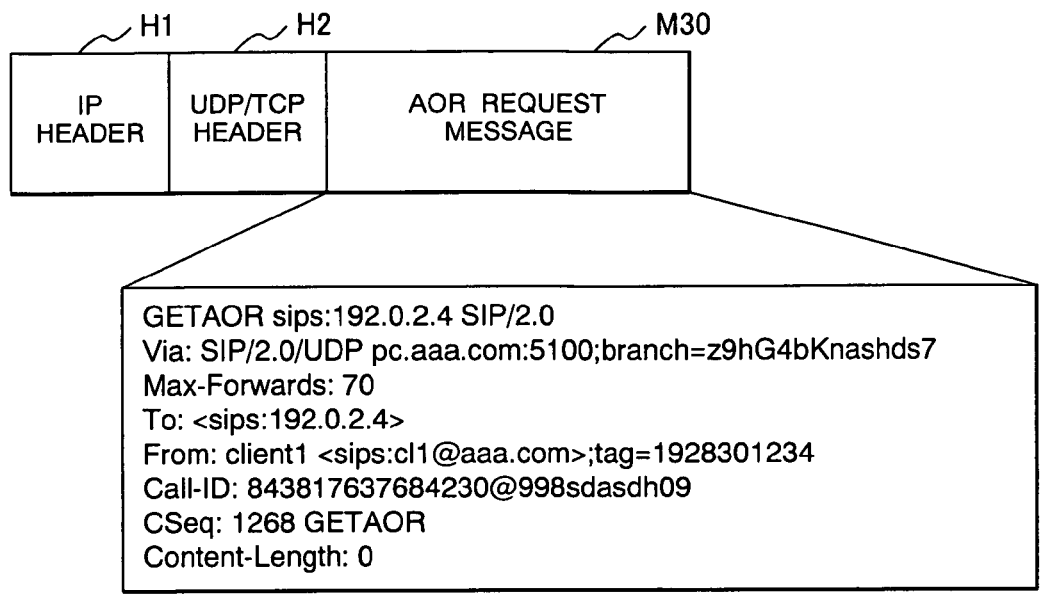
FIG. 64 shows an example of a format of an AOR request [GET AOR] message M30 shown in FIG. 63

As is shown in FIG. 64, in the start line of the AOR request message M30, for example, "GETAOR" as the message type and the IP address "1922.0.2.4" of the server SV1 as the Request-URI are specified. The header part following the start line includes, as header information, a Via header including identification information of the client CL1*a* (SIP message processing module 53C), To header including the IP address of the server SV1*b*, From header including the SIP-URI of the client CL1*a* (SIP message processing module 53C), Cal-ID header, CSeq header, and Content-length header. The AOR request message M30 does not have a message body and Content-Length is set to 0.

Figure 65:
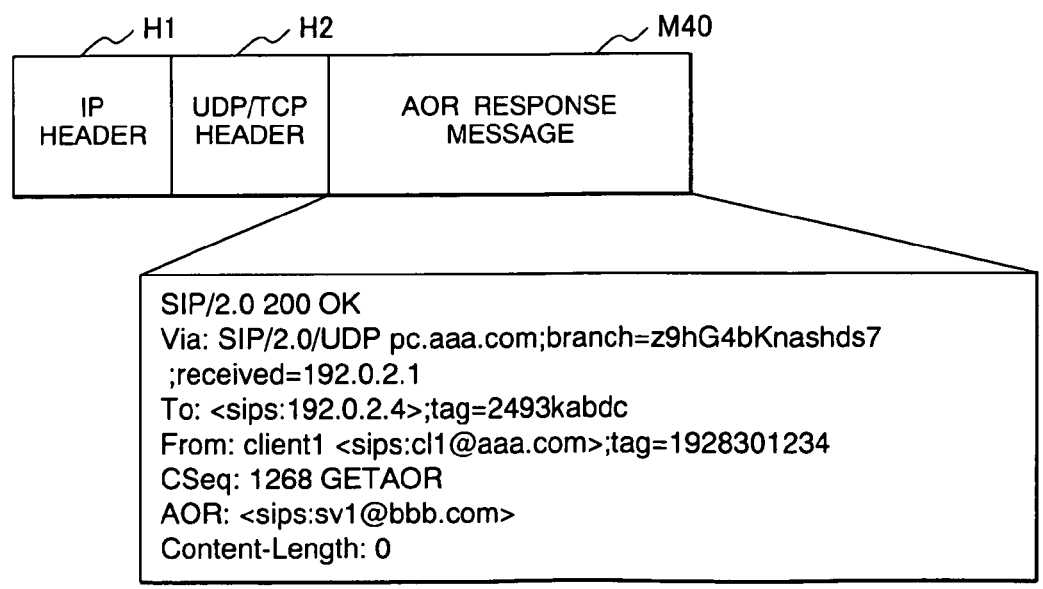
FIG. 65 shows an example of a format of an AOR response message M40 shown in FIG. 63.

As is shown in FIG. 65, the AOR response message M40 begins with the start line including the message type "200 OK" indicating a response. The header part includes, as header information, a Via header, To header, From header, and CSeq having the same contents as those of the AOR request message M30 and the AOR header specifies the SIP-URI value "sv1@bbb.com" of the server SV1*b* as the target AOR.

Upon receiving the AOR response message M40, the SIP message processing module 53C on the client CL1*a* creates a connection request message M5, in which the SIP-URI of the server SV1*b* is assigned to the Request-URI, and transmits the message to the SIP proxy PRa via the TLS module 52C, IPsec engine 30C, and NIC module 20C. At this time, after performing TLS negotiation (S7) with the SIP proxy PRa, the TLS module 52C encrypts the connection request message M5 and transmits it to the SIP proxy PRa.

Upon receiving the connection request message M5, the SIP proxy PRa transmits a connection trying message M6 to the requester client CL1*a* and then transmits a connection request message M7 to the SIP proxy PRb, in similar to the case for the first embodiment. The subsequent procedure is the same as described for the first embodiment with reference to FIG. 12.

Figure 66:
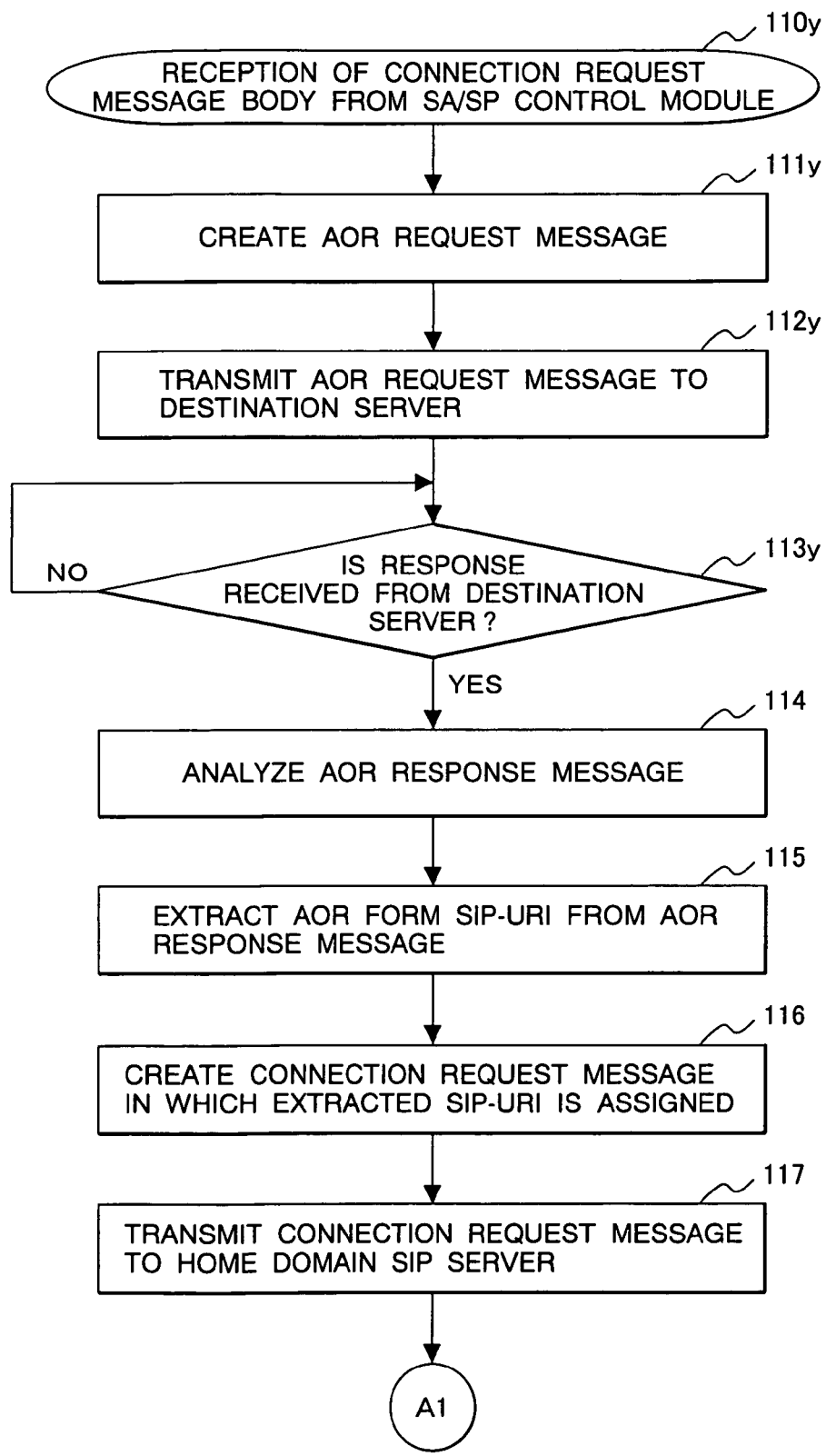
FIG. 66 is a part of flowchart illustrating control operation to be performed by the SIP message processing module 53C on the client CL1a, when receiving the body of a connection request message, according to the third embodiment.

FIG. 66 shows a flowchart 110*y* of control operation to be performed by the SIP message processing module 53C on the client CL1*a*, when receiving the connection request message body from the SP/SA control module 51C, according to the third embodiment.

Upon receiving the connection request message body from the SP/SA control module 51C, the SIP message processing module 53C creates an AOR request message M30 illustrated in FIG. 60 from the IP address of the destination server SV1*b* indicated by ID data in the second ID payload and communication control parameters managed by the SIP message processing module 53C (step 111*y*) and transmits the message M30 to the server SV1*b* via the TCP/IP module 30C and NIC module 20C (112*y*). In this case, because the AOR request message M30 is not passed through the TLS module 52C, TLS negotiation with the server SV1*b* is not performed and the plain text AOR request message M30, not encrypted, is transmitted to the destination server SV1*b*.

The SIP message processing module 53C waits for an AOR response message from the server SV1*b* (113*y*). Upon receiving the AOR response message M40, the SIP message processing module 53C analyzes the received message (114) and extracts the SIP-URI assigned to the destination server from the AOR header (115). After that, the SIP message processing module 53C creates a connection request message M5 illustrated in FIG. 17 comprising the header part 5-1, in which the above SIP-URI is assigned in the start line and in the To header, and the message body M5-2 received from the SP/SA control module 51C (116). The subsequent procedure is the same as described for the first embodiment with reference to FIG. 39.

Figure 67:
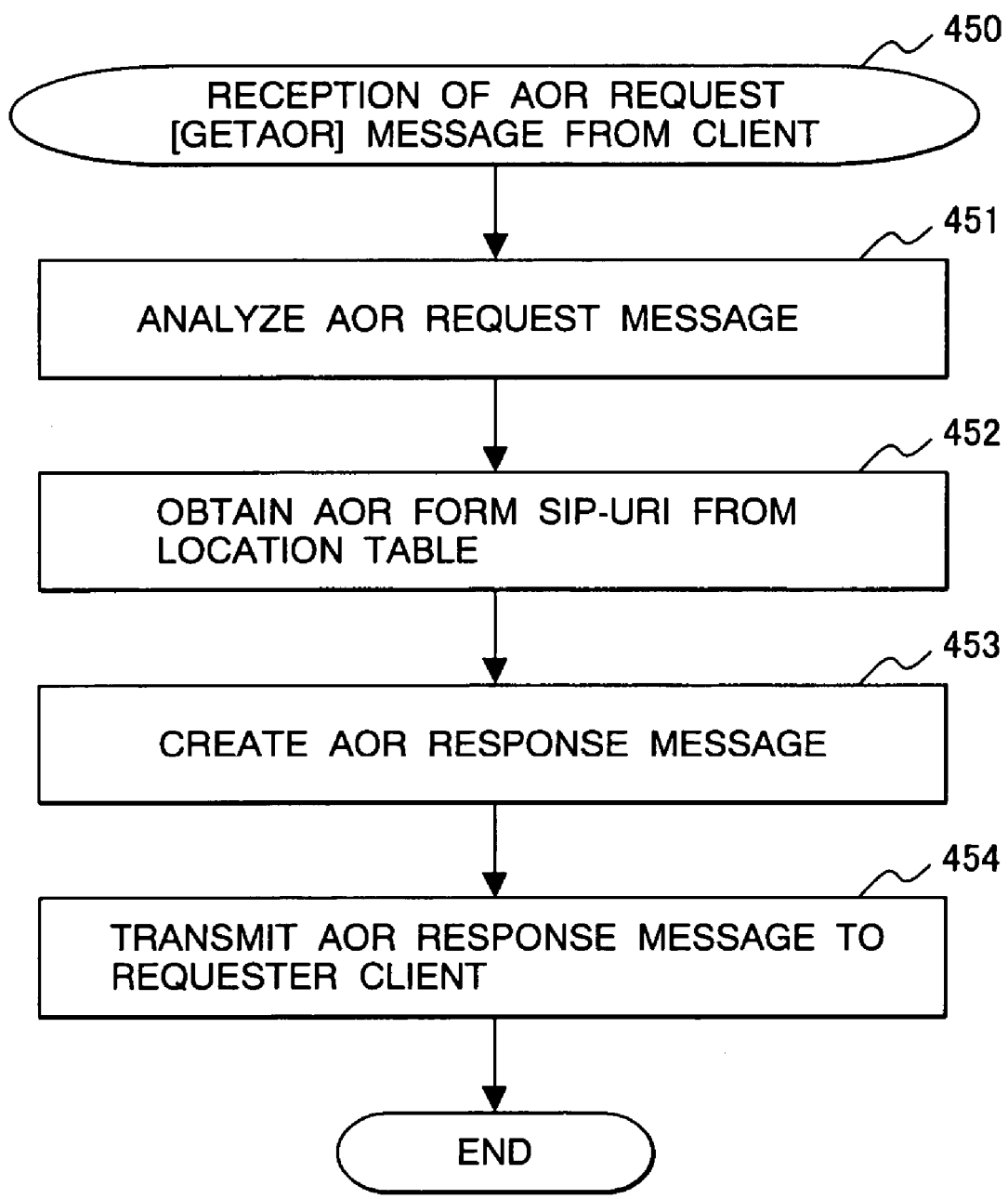
FIG. 67 is a flowchart illustrating control operation to be performed by the SIP message processing module 53S on the server SV1b, when receiving an AOR request message, according to the third embodiment.

FIG. 67 shows a flowchart 450 of control operation to be performed by the SIP message processing module 53S on the server SV1*b*, when receiving an AOR request message M30 from the client.

Upon receiving the AOR request message M30, the SIP message processing module 53S on the server SV1*b* analyzes the received message (step 451) and retrieves from the location table 70 an AOR value (SIP-URI) corresponding to the IP address indicated by the To header in the received message (452). The SIP message processing module 53S creates an AOR response message M40 in which the retrieved AOR value is set in the AOR header (453), transmits this message to the client that is the source of the AOR request message M30 (454), and terminates this routine.

In the communication sequence implemented by the foregoing embodiments, by way of illustration, when terminating encrypted data communication, the client CL1*a* side issues a disconnection request. However, even if the server SV1*b* issues a disconnection request, the same procedure as described for the embodiments will be performed in terms of results, though the messages are transmitted in opposite directions, because the SIP proxy PRb to which the server SV1*b* belongs has the same functionality as the SIP proxy PRa on the client side.

In the communication sequence implemented by the described embodiments, by way of illustration, the client CL1*a* belonging to the first domain issues a connection request to the server SV1*b* belonging to the second domain. In the first embodiment, if the client CL1*a* activates, after terminating communication with the server SV1*b*, an application for communicating with another server, for example, a server SV2*b* (or SV1*a*), the security procedure for setting conditions for encrypted communication has been already completed between the client CL1a and registrar RGa and between the client CL1a and the SIP proxy PRa. Thus, when a data transmission request is issued from the application program, the TLS module 52C can immediately encrypt and transmit an AOR request message or a connection request message received from the SIP message processing module 53C onto the network NW1 without performing TLS negotiation with the SIP server SIPa.

In the described embodiments, an IP address that is assigned to the Request-URI and the To header in an SIP message is assumed to be described in the form like "sips: 192.0.2.4" provided, for example, in FIG. 14 and FIG. 51. In this case, a SIP proxy, registrar, or server having received the SIP message can determine whether the message adopts SIP-URI description or IP address description, by judging whether the character string following the "sips:" in the checked field has an IP address notation in which three or less digits numbers each delimited by a dot are arranged. To ensure the discrimination between SIP-URI description and IP address description, an URI parameter may be appended to clarify that it is a SIP-URI requiring AOR resolution; for example, like "sips:192.0.2.4; id=ipv4". It may be stipulated that if a scheme such as an IPv4 (or IPv6) is detected in the checked field, an IP address always follows thereafter, for example, like "ipv4: 192.0.2.4".

What is claimed is:

1. A data communication method for communication between a client and a destination server via a communication network to which session management servers are connected, comprising:
    a first step of sending from said client to first one of said session management servers a query, in which an IP address of said destination server is specified, to search for a resource identifier including a domain name assigned to the destination server;
    a second step of retrieving by said first one of said session management servers the resource identifier corresponding to the IP address of said destination server from a location table indicating the correspondence of IP addresses to resource identifiers, and notifying said client of the resource identifier;
    a third step of transmitting a connection request message from said client to said first one of said session management servers, the connection request message designating a request resource with the resource identifier of said destination server;
    a fourth step of determining, by said first one of said session management servers having received the connection request message, a forwarding destination of the received message based on a domain name included in the resource identifier specified in the received message, and forwarding the received connection request message to the destination server or second one of said session management servers managing a domain to which the destination server belongs;
    a fifth step of forwarding a connection response message replied from said destination server in response to said connection request message, to said client by said first one of said session management servers having received the connection response message;
    a sixth step of sending an acknowledgement message from said client having received said connection response message to said first one of said session management servers, the acknowledgement message designating a request resource with the resource identifier of said destination server;
    a seventh step forwarding said acknowledgement message to said destination server or said second one of said session management servers by said first one of said session management servers having received the acknowledgement message; and
    an eighth step of performing IP packets communication between said client and said destination server.

2. The data communication method according to claim 1, wherein
    said connection response message replied from said destination server in response to said connection request message includes parameters required for encrypted data communication, and
    each of IP packets to be communicated between said client and said destination server in said eighth step includes data or messages encrypted in accordance with the parameters specified in said connection response message.

3. The data communication method according to claim 2, wherein data or message in each of IP packets to be communicated between said client and said destination server in said eighth step is encrypted according to Internet Protocol Security (IPsec) defined in RFC 2401.

4. The data communication method according to claim 1, wherein said first and second one of said session management servers are Session Initiation Protocol (SIP) servers, and messages to be communicated between said client and said first and second one of said session management servers are encrypted according to Transport Layer Security (TLS) defined in RFC 3261.

5. The data communication method according to claim 1, wherein, said resource identifier is SIP-URI and said destination server has a Session Initiation Protocol (SIP) message processing unit.

6. A data communication method for communication between a client and a destination server via a communication network to which session management servers are connected, comprising:
    a first step of transmitting a connection request message from said client to first one of said session management servers, the connection request message specifying a request resource with an IP address of said destination server;
    a second step of retrieving, by said first one of said session management servers having received said connection request message, a resource identifier corresponding to the IP address of said destination server from a location table indicating the correspondence of IP addresses to resource identifiers;
    a third step of changing by said first one of said session management servers the IP address specifying the request resource in the received connection request message to the resource identifier retrieved from said location table;
    a fourth step of determining by said first one of said session management servers a forwarding destination of the received connection request message based on a domain name included in the resource identifier, and forwarding the received connection request message to the destination server or second one of said session management servers managing a domain to which the destination server belongs;
    a fifth step of forwarding a connection response message replied from said destination server in response to said connection request message, to said client by said first one of said session management servers having received the connection response message;

a sixth step of sending an acknowledgement message from said client having received said connection response message to said first one of said session management servers, the acknowledgement message designating a request resource with the resource identifier of said destination server;

a seventh step forwarding said acknowledgement message to said destination server or said second one of said session management servers by said first one of said session management servers having received the acknowledgement message; and an eighth step of performing IP packets communication between said client and said destination server.

7. The data communication method according to claim 6, wherein said connection response message replied from said destination server in response to said connection request message includes parameters required for encrypted data communication, and each of IP packets to be communicated between said client and said destination server in said eighth step includes data or messages encrypted in accordance with the parameters specified in said connection response message.

8. The data communication method according to claim 7, wherein data or message in each of IP packets to be communicated between said client and said destination server in said eighth step is encrypted according to Internet Protocol Security (IPsec) defined in RFC 2401.

9. The data communication method according to claim 6, wherein said first and second one of said session management servers are Session Initiation Protocol (SIP) servers, and messages to be communicated between said client and said first and second one of said session management servers are encrypted according to Transport Layer Security (TLS) defined in RFC 3261.

10. The data communication method according to claim 6, wherein, said resource identifier is SIP-URI and said destination server has a Session Initiation Protocol (SIP) message processing unit.

11. A data communication method for communication between a client and a destination server via a communication network to which session management servers are connected, comprising:

a first step of sending from said client to said destination server a query for a resource identifier including a domain name assigned to the server, the query specifying an IP address of the server;

a second step of sending the resource identifier from said server to said client;

a third step of transmitting a connection request message from said client to first one of said session management servers, the connection request message designating a request resource with the resource identifier of said destination server;

a fourth step of determining, by said first one of said session management servers having received said connection request message, a forwarding destination of the received connection request message based on a domain name included in said resource identifier specified in the received connection request message, and forwarding the received connection request message to the destination server or second one of said session management servers managing a domain to which the destination server belongs;

a fifth step of forwarding a connection response message replied from said destination server in response to said connection request message, to said client by said first one of said session management servers having received the connection response message;

a sixth step of sending an acknowledgement message from said client having received said connection response message to said first one of said session management servers, the acknowledgement message designating a request resource with the resource identifier of said destination server;

a seventh step forwarding said acknowledgement message to said destination server or said second one of said session management servers by said first one of said session management servers having received the acknowledgement message; and an eighth step of performing IP packets communication between said client and said destination server.

12. The data communication method according to claim 11, wherein said connection response message replied from said destination server in response to said connection request message includes parameters required for encrypted data communication, and each of IP packets to be communicated between said client and said destination server in said eighth step includes data or messages encrypted in accordance with the parameters specified in said connection response message.

13. The data communication method according to claim 12, wherein data or message in each of IP packets to be communicated between said client and said destination server in said eighth step is encrypted according to Internet Protocol Security (IPsec) defined in RFC 2401.

14. The data communication method according to claim 11, wherein said first and second one of said session management servers are Session Initiation Protocol (SIP) servers, and messages to be communicated between said client and said first and second one of said session management servers are encrypted according to Transport Layer Security (TLS) defined in RFC 3261.

15. The data communication method according to claim 11, wherein, said resource identifier is SIP-URI and said destination server has a Session Initiator Protocol (SIP) message processing unit.

16. A session management server for communicating with a client and a destination server via a communication network, comprising:

first means for retrieving, when a connection request message designating a request resource with an IP address of said destination server was received from said client, a resource identifier of said destination server corresponding to the IP address from a location table indicating the correspondence of IP addresses to resource identifiers, and changing the IP address designating the request resource in the received connection request message to said retrieved resource identifier;

second means for determining a forwarding destination of the received connection request message based on a domain name included in said resource identifier, and forwarding the received connection request message to the destination server or another session management server managing a domain to which the destination server belongs; and third means for forwarding a connection response message replied from said destination server in response to said connection request message to said client and an acknowledgement message transmitted from said client in response to said connection response message to said destination server or said second one of said session management servers.

17. The session management server according to claim 16, further comprising:
   a network interface connected to said communication network;
   a message processing module for processing session control messages; and
   a security module for decrypting an encrypted message received from said network interface to transfer a decrypted message to said message processing module and for encrypting a session control message received from said message processing module to output an encrypted message to said network interface,
   wherein said message processing module is provided with the functions of said first means, said second means sand said third means.

18. The session management server according to claim 16, wherein, said resource identifier is SIP-URI and said connection request message, said connection response message and said acknowledgement message are SIP messages.

19. A client terminal for communicating with a session management server and a destination server via a communication network, comprising:
   a network interface connected to said communication network;
   a message processing module for processing session control messages;
   a first security module for encrypting a transmission message generated by an application program and addressed to said destination server to output an encrypted message to said network interface and decrypting an encrypted message received from said network interface to transfer a decrypted message to said application program; and
   a security information control module for outputting, when a request to exchange encryption parameters with the destination server occurs, a connection request message designating said destination server with an IP address to said message processing module and for transferring, when a connection response message replied from said destination server in response to the connection request message was received from said message processing module, encryption parameters extracted from the received connection response message to said first security module,
   wherein said message processing module sends, when the connection request message was received from said security information control module, a query for a resource identifier of said destination server by designating the destination server with the IP address specified in said connection request message, to one of said session management server and said destination server in order to obtain the resource identifier from the session management server or the destination server, and transmits said connection request message in a modified form, in which a request resource is specified with the resource identifier, to said session management server, and
   wherein said message processing module generates, when a connection response message transmitted from said destination server in response to said connection request message was received, an acknowledge message designating a request source with the resource identifier of said destination server and transmits the acknowledge message to said session management server.

20. The client terminal according to claim 19, further comprising
   a second security module for decrypting an encrypted session control message received from said network interface to transfer a decrypted message to said message processing module and encrypting a session control message received from said message processing module to output an encrypted message to said network interface module,
   wherein data and a message to be communicated with said destination server in the form of IP packets are encrypted by said first security module and control messages to be communicated with said session management server are encrypted by said second security module.

21. The client terminal according to claim 19, wherein, the resource identifier is SIP-URI and the destination server is a SIP server.

* * * * *